US 8,244,098 B2

(12) United States Patent
Sato et al.

(10) Patent No.: US 8,244,098 B2
(45) Date of Patent: *Aug. 14, 2012

(54) RECORDING APPARATUS AND METHOD, PLAYBACK APPARATUS AND METHOD, RECORDING MEDIUM, PROGRAM AND COMPUTER-READABLE RECORDING MEDIUM

(75) Inventors: Yasunori Sato, Kawanishi (JP); Noriko Sugimoto, Amagasaki (JP); Hiroshi Hamasaka, Hirakata (JP)

(73) Assignee: Panasonic Corporation, Osaka (JP)

( * ) Notice: Subject to any disclaimer, the term of this patent is extended or adjusted under 35 U.S.C. 154(b) by 1630 days.

This patent is subject to a terminal disclaimer.

(21) Appl. No.: 11/645,613

(22) Filed: Dec. 27, 2006

(65) Prior Publication Data

US 2007/0104458 A1 May 10, 2007

Related U.S. Application Data

(62) Division of application No. 10/060,313, filed on Feb. 1, 2002, now Pat. No. 7,209,643.

(30) Foreign Application Priority Data

Feb. 2, 2001 (JP) .................................. 2001-026413

(51) Int. Cl.
*H04N 9/80* (2006.01)

(52) U.S. Cl. ........................................ 386/248; 386/262

(58) Field of Classification Search .................. 386/248, 386/262, 332–336
See application file for complete search history.

(56) References Cited

U.S. PATENT DOCUMENTS

| 6,385,389 B1 | 5/2002 | Maruyama et al. |
| 6,400,893 B1 | 6/2002 | Murase et al. |
| 6,519,410 B1 | 2/2003 | Okada et al. |
| 7,010,801 B1 | 3/2006 | Jerding et al. |
| 2002/0006269 A1 | 1/2002 | Kageyama et al. |

FOREIGN PATENT DOCUMENTS

| EP | 0 971 535 | 1/2000 |
| EP | 0 978 994 | 2/2000 |
| EP | 1 035 546 | 9/2000 |
| EP | 1 041 565 | 10/2000 |
| JP | 07-319957 | 12/1995 |
| JP | 09-160666 | 6/1997 |
| JP | 11215471 | 8/1999 |
| JP | 2000-324429 | 11/2000 |
| JP | 3169368 | 3/2001 |
| JP | 2002-032976 | 1/2002 |

OTHER PUBLICATIONS

R. Oba et al., "Video Camera Recording Using Small-Size DVD-RAM", IEEE Transactions on Consumer Electronics, IEEE Inc. New York, US, vol. 46, No. 3, Aug. 2000, pp. 572-577.

*Primary Examiner* — Thai Tran
*Assistant Examiner* — Nigar Chowdhury
(74) *Attorney, Agent, or Firm* — Wenderoth, Lind & Ponack, L.L.P.

(57) ABSTRACT

A recording apparatus contains a timer that measures the current time based on a time zone. When writing a VOB onto a DVD, the recording apparatus refers to TM_ZONE recorded on the DVD, and judges whether the time zone which the timer is based on matches the time zone that the TM_ZONE specifies. If the two time zones do not match, the recording apparatus operates as follows. First, the recording apparatus obtains VOB_REC_TM that indicates the recording date/time of the VOB based on TM_ZONE. The recording apparatus then writes the VOB onto the DVD together with VOBI that is information of the VOB and contains (a) the obtained VOB_REC_TM; (b) LOCAL_TZ_TY indicating that the two time zones do not match and (c) LOCAL_TZ specifying the time zone which the timer is based on.

3 Claims, 42 Drawing Sheets

VOB_REC_TM(2001/11/01_10:00.00)

FIG.6

| b39 | b38 | b37 | b36 | b35 | b34 | b33 | b32 |
|-----|-----|-----|-----|-----|-----|-----|-----|
| \multicolumn{8}{c}{Year[13.6]} |

| b31 | b30 | b29 | b28 | b27 | b26 | b25 | b24 |
|-----|-----|-----|-----|-----|-----|-----|-----|
| Year[5.0] | | | | | | Month[3.2] | |

| b23 | b22 | b21 | b20 | b19 | b18 | b17 | b16 |
|-----|-----|-----|-----|-----|-----|-----|-----|
| Month[1.0] | | Day[4.0] | | | | | Hour[4] |

| b15 | b14 | b13 | b12 | b11 | b10 | b9 | b8 |
|-----|-----|-----|-----|-----|-----|-----|-----|
| Hour[3.0] | | | | Minute[5.2] | | | |

| b7 | b6 | b5 | b4 | b3 | b2 | b1 | b0 |
|----|----|----|----|----|----|----|----|
| Minute[1.0] | | Second[5.0] | | | | | |

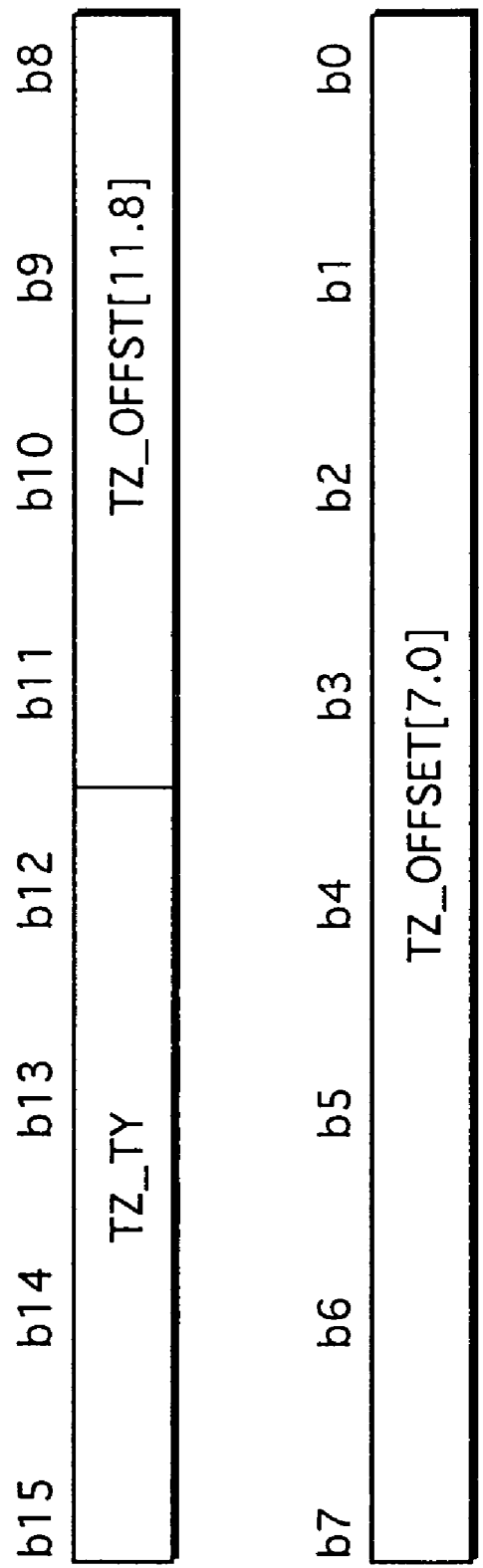

RECORDING APPARATUS AND METHOD, PLAYBACK APPARATUS AND METHOD, RECORDING MEDIUM, PROGRAM AND COMPUTER-READABLE RECORDING MEDIUM

This application is a divisional application of Ser. No. 10/060,313, filed Feb. 1, 2002 now U.S. Pat. No. 7,209,643.

BACKGROUND OF THE INVENTION (1) Field of the Invention

The present invention relates to a recording apparatus for recording picture data and date/time information onto a recording medium such as an optical disc, a playback apparatus, and a recording medium.

(2) Description of the Related Art

Recording picture data onto a recording medium together with the date/time information is meaningful. The date/time information helps the user recall details of the pictures more clearly.

The date/time information is based on a time measured by a timer in the recording apparatus that captures images and records them as picture data. The time measured by the timer is based on a standard time for the region where the recording apparatus is used. Such geographic regions on earth to which standard times are assigned are called "time zones". A timer in a recording apparatus measures the current time based on the standard time of the time zone in which the recording apparatus is used.

When picture data is recorded onto a recording medium in a time zone, the date/time information in the recording medium is based on the same standard time. However, when picture data captured in two or more different time zones is to be recorded onto a recording medium, it is necessary to select a standard time on which the date/time information should be based.

Suppose a user moves from Japan to Country A taking a video-camera type recording apparatus, and that the time differential between Japan and the Country A is 12 hours. Here, if the user takes pictures during daytime hours in the Country A with the timer being set to the Japanese standard time, the date/time information recorded on the recording medium indicates the nighttime hours due to the time differential. When this happens, the date/time information looses its meaning.

The above problem can be solved if the user sets the timer of the recording apparatus to be based on the standard time of the Country A. Actually, the user can set the timer every time he/she arrives in a different time zone. In this case, however, a problem arises concerning the chronological order of a plurality of pieces of picture data that are based on different standard times. For example, suppose further that the user took a picture in Japan immediately before he/she went to the Country A and recorded the picture data onto the recording medium, then it may happen that the date/time information for the picture appears to be later than that for the picture taken in the Country A. This is because the time differential of 12 hours is not taken into account. If these pieces of picture data are sorted in chronological order, they will be arranged in an improper order. This also makes the date/time information meaningless.

SUMMARY OF THE INVENTION

It is therefore the object of the present invention to provide a recording apparatus that provides credibility of the date/time information even if the recording apparatus is used in a plurality of time zones.

The above object is fulfilled by a recording apparatus that writes a video object onto a recording medium on which basic time zone information specifying a basic time zone is written, the recording apparatus comprising: a timer operable to measure a time based on a predetermined time zone; a converting unit operable to, if the basic time zone does not match the predetermined time zone, convert the time measured by the timer into a time based on the basic time zone; and a writing unit operable to, if the two time zones do not match, write management information for the video object onto the recording medium, the management information containing a flag indicating that the two time zones do not match, recording time information showing the conversion-result time, and local time zone information specifying the predetermined time zone as a local time zone.

With the above-described construction, if the recording apparatus and the recording medium are based on different time zones, the recording apparatus generates date/time information based on the time zone for the recording medium and records the generated date/time information onto the recording medium. As a result, even if two or more video objects are recorded on the recording medium, the corresponding date/time information is based on the same time zone. When the two or more video objects are sorted in chronological order of the recording date/time, they are correctly arranged in the order. Also, if the recording apparatus and the recording medium are based on different time zones, local time zone information specifying the time zone for the recording apparatus as a local time zone is recorded onto the recording medium. By using the local time zone information to display the date/time when a corresponding a video object is played back, a discrepancy between the contents of the video object (e.g. captured during daytime hours) and the displayed recording date/time (e.g. indicating nighttime hours) does not happen, keeping the credibility of the date/time information.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 6 shows the format of VOB_REC_TM;

FIG. 15 shows the format of TM_ZONE;

DESCRIPTION OF THE PREFERRED EMBODIMENT

Embodiment 1

Figure 1:
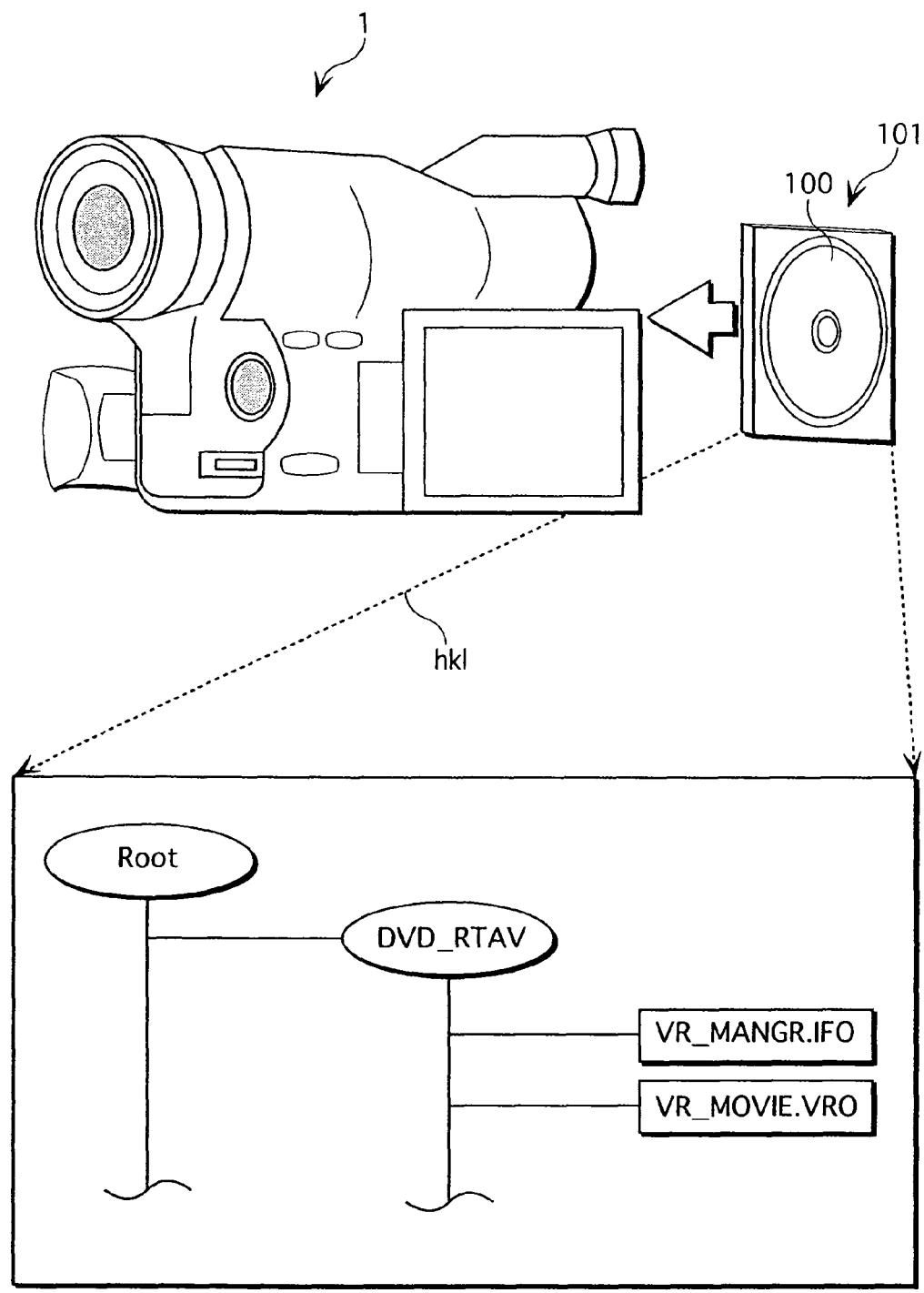
FIG. 1 shows a DVD 100 in Embodiment 1 and a recording apparatus 1.

The following describes a recording medium as an embodiment of the present invention. It is supposed that the recording medium in Embodiment 1 is a DVD-RAM (hereinafter referred to as DVD) in which moving-picture data can be recorded in accordance with the DVD-VIDEO RECORDING standard. FIG. 1 shows a DVD 100 in Embodiment 1 and a recording apparatus 1.

The recording apparatus 1 of a camcorder-type captures moving pictures and records the moving-picture data onto the DVD 100 which is housed in a cartridge 101. The DVD 100 has layers such as a physical layer, a file system layer, and an application layer. The file system of the DVD 100 is shown in FIG. 1, as indicated by a leader line hk1. First, the file structure of the DVD will be described supposing that only one time zone is used. As shown in FIG. 1, the file structure includes a DVD_RTAV (RealTime Recording Audio Video) directory that is arranged directly under a ROOT directory, and an AV file "VR_MOVIE.VRO" containing VOBs and a management file "VR_MANGR.IFO" containing various types of management information are arranged under the DVD_RTAV directory, where "VR" is an abbreviation of Video Recording.

Figure 2:
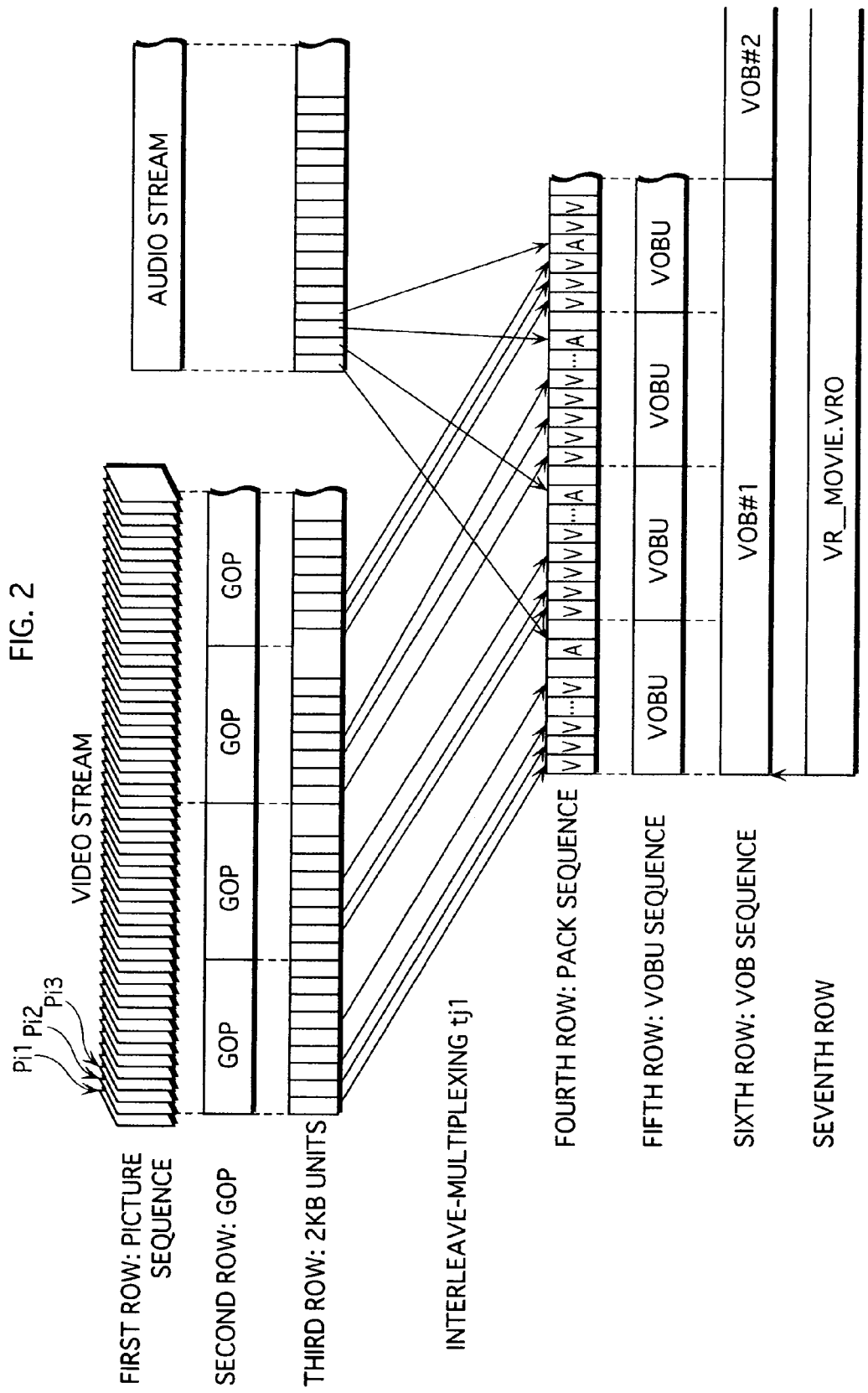
FIG. 2 shows the hierarchical structure of VOBs that are contained in VR_MOVIE.VRO.

FIG. 2 shows the hierarchical structure of VOBs that are contained in the "VR_MOVIE.VRO" file. The "VR_MOVIE.VRO" file is shown in the seventh (lowest) row in FIG. 2.

The sixth row in FIG. 2 includes the VOBs contained in the "VR_MOVIE.VRO" file. FIG. 2 indicates that at least two VOBs, namely VOB #1 and VOB #2 are contained in the "VR_MOVIE.VRO" file. Each VOB is a program stream conforming to the ISO/IEC13818-1 standard in which a video stream and an audio stream are multiplexed. The program streams of the VOBs differ from general-purpose program streams in that they do not need to have "program_end_code" at their ends, while it is indispensable for the general-purpose program streams. The video stream is a sequence of a plurality of pieces of picture data pi1, pi2, pi3, . . . as shown in the first row of the drawing. The picture data is displayed in units of video frames. In the NTSC system, one video frame corresponds to a display period of approximately 33 msec (more accurately, 1/29.97 sec), and in the PAL system, one video frame corresponds to a display period of 40 msec. The picture data is divided into Bidirectionally Predictive Picture (B-Picture), Predictive Picture (P-Picture), and Intra Picture (I-Picture). The B-pictures are compressed using correlation with images to be played back before and after the B-pictures (i.e., in the past and future directions). The P-pictures are compressed using correlation with images to be played back before the P-pictures (i.e., in the past direction). The I-pictures are compressed using the spatial frequency response for one frame, without using the above correlations.

The smallest unit used in decoding the video streams is GOP (Group Of Picture). Each GOP contains at least one I-Picture, and is a group of pieces of picture data that corresponds to a playback time ranging from 0.4 to 1.0 seconds. For this reason, in FIG. 2, the video stream shown in the first row is divided into a plurality of GOPs shown in the second row. The picture data is compressed/encoded by the variable-length coding. Therefore, each GOP has a different data length. When the GOP sequence of the second row is to be recorded onto a DVD, the GOP sequence is divided into a plurality of units each having approximately 2 kilobytes regardless of the length of each GOP, as shown in the third row. The units are also referred to as video packs which are interleave-multiplexed (indicated by "interleave-multiplexing tj1" in FIG. 2) with audio packs having the same size to form the pack sequence shown in the fourth row. From the pack sequence, the VOBUs (Video Object Units) shown in the fifth row are formed.

Each VOBU contains at least one GOP and audio data. The VOBU is the smallest access unit of VOBs and is an arranged sequence of video and audio packs conforming to the MPEG standard. From the VOBU sequence, the VOBs shown in the sixth row are formed.

Figure 3:
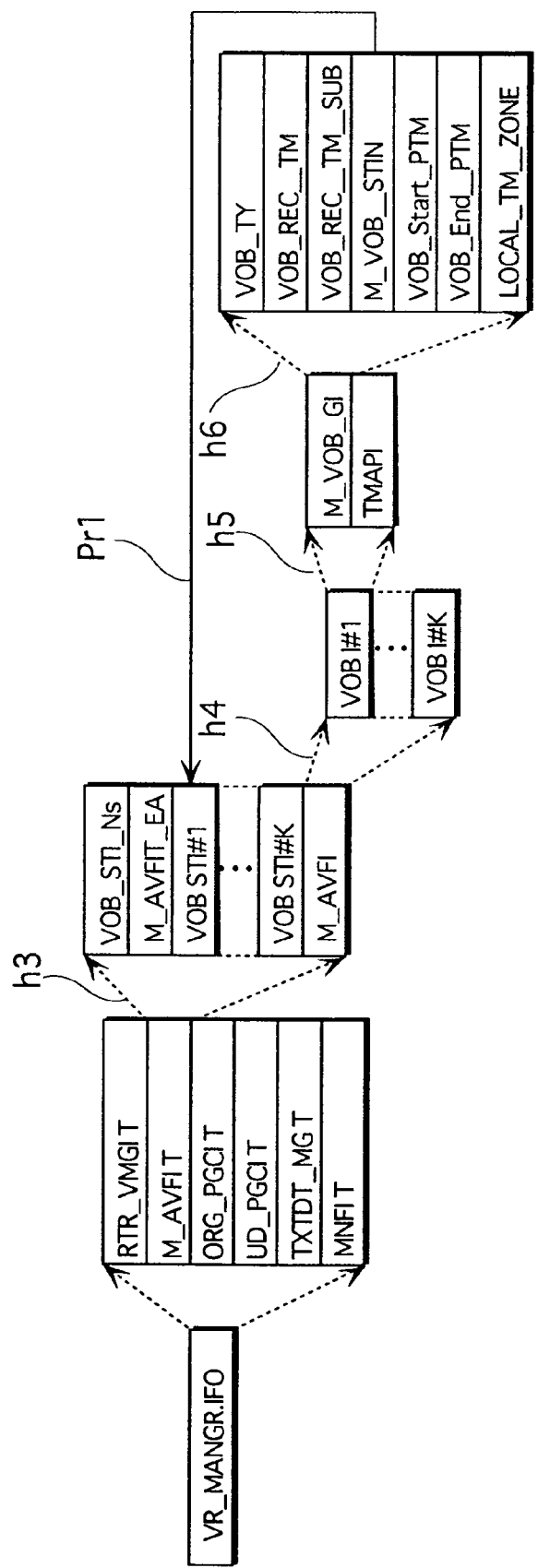
FIG. 3 shows the internal structure of VR_MANGR.IFO.

Now, the internal structure of the management file "VR_MANGR.IFO" will be described. FIG. 3 shows the internal structure of the management file "VR_MANGR.IFO". As shown in FIG. 3, the management file "VR_MANGR.IFO" includes RTR_VMGI table (RTR_VMGIT), M_AVFI table (M_AVFIT), ORG_PGCI table (ORG_PGCIT), UD_PGCI table (UD_PGCIT), TXTDT_MG table (TXTDT_MGT), and MNFI table (MNFIT).

The M_AVFI (Motion AV File Information) table is a table used to manage VOBs and includes, as the leader line h3 indicates: VOB_STI_Ns indicating the number of VOB STIs contained in the M_AVFIT; M_AVFIT_EA (Effective Address) indicating the effective length of the M_AVFIT; VOB STI (Stream Information) #1, . . . VOB STI #K being attribute information of VOBs; and M_AVFI. The VOB_STI indicates the video attributes of the picture data (e.g. coding mode, aspect ratio, NTSC/PAL, and line 21 information) and audio attributes of the audio data (e.g. coding mode, the number of channels, and frequency) in each VOB.

The M_AVFI includes VOBI #1, . . . VOBI #L, as the leader line h4 indicates. The VOBI (Video Object Information) is playback control information unique to each VOB, and includes, as the leader line h5 indicates: M_VOB_GI (General Information); and TMAPI (Time MAP Information) for each VOBU constituting the VOB. The M_VOB_GI includes, as the leader line h6 indicates: VOB_TY indicating the type of the VOB; VOB_REC_TM (VOB Recording TiMe) indicating the year, month, day, hour, minute, second when the first piece of picture data of the VOB was recorded; VOB_REC_TM_SUB indicating a fraction of the picture data recording date/time in a unit that is smaller than second and a video frame; M_VOB_STIN (Stream Information Number) that specifies one of the VOB STI #1, . . . VOB STI #K, as indicated by the arrow Pr1; VOB_Start_PTM (Presentation TiMe) indicating the time when the presentation of the first piece of picture data of the VOB starts; VOB_End_PTM indicating the time when the presentation of the last piece of picture data of the VOB ends; and LOCAL_TM_ZONE.

Figure 4:
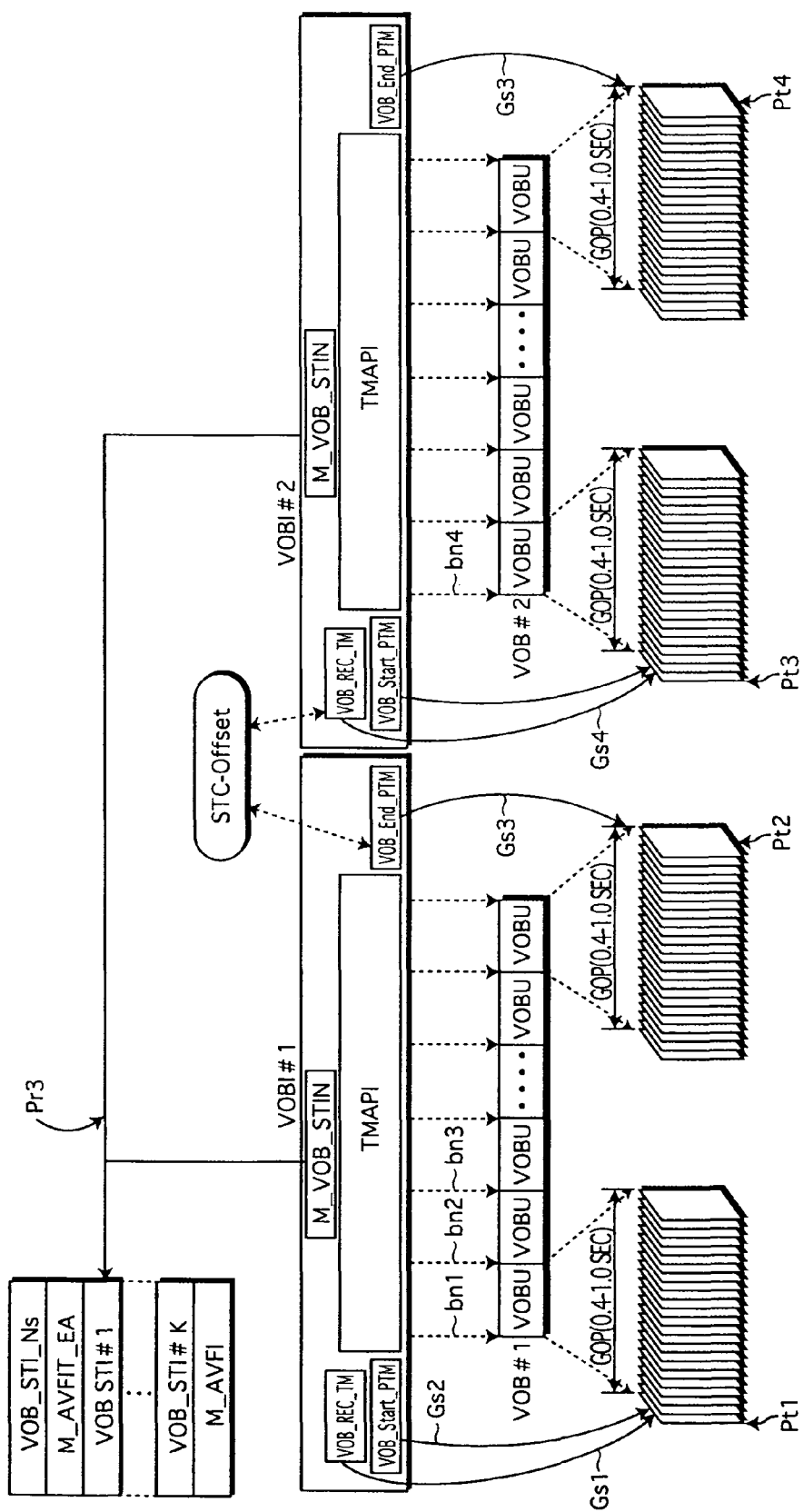
FIG. 4 shows correspondence between VOBs and VOBIs.

FIG. 4 shows correspondence between VOBs and VOBIs. As shown in FIG. 4, a VOB and a VOBI corresponding to each other have the same serial number such as #1 and #2. The arrow Pr3 indicates that VOBI #1 and VOBI #2 shares stream attribute information "VOB STI #1", which indicates that VOB #1 corresponding to VOBI #1 and VOB #2 corresponding to VOBI #2 have the same image attribute. The VOB_Start_PTMs of the VOBI #1 and VOBI #2 indicate, respectively, the times when the presentations of the picture data Pt1 and Pt3 which are to be displayed first in the first GOPs of VOBs #1 and #2 start, respectively. The VOB_End_PTMs of the VOBI #1 and VOBI #2 indicate, respectively, the times when the presentations of the picture data Pt2 and Pt4 which are to be displayed lastly in the last GOPs of VOBs #1 and #2 end, respectively. A difference between the VOB_End_PTM of VOBI #1 and the VOB_Start_PTM of VOBI #2 is referred to as STC-Offset. The STC(System Time Clock)-Offset is used for the seamless presentation of the two continuous VOBs.

The VOB_REC_TMs of VOBI #1 and VOBI #2 indicate the year, month, day, hour, minute, second when the first pieces of picture data, pt1 and pt3, of VOB #1 and VOB #2 were recorded, respectively. It should be noted here that in the present embodiment, the pieces of picture data are presented in the order of recording. This is done for the convenience of users. When moving-picture data is compressed using correlation between frames, a mismatch between the recording order and the presentation order occurs. Also, since the picture data is recorded onto the DVD after it is stored in a buffer, a piece of picture data that was recorded first may not necessarily be presented first. If the VOB_REC_TM was set strictly in accordance with the order in which the picture data was recorded onto the DVD, the user would feel difficulty in presenting the recorded data. Taking this into consideration, in the present embodiment, the VOB_REC_TM is set to the current date/time measured by a timer in a recording apparatus being a camcorder when a capturing unit of the same recording apparatus starts capturing an image.

Figure 5A:
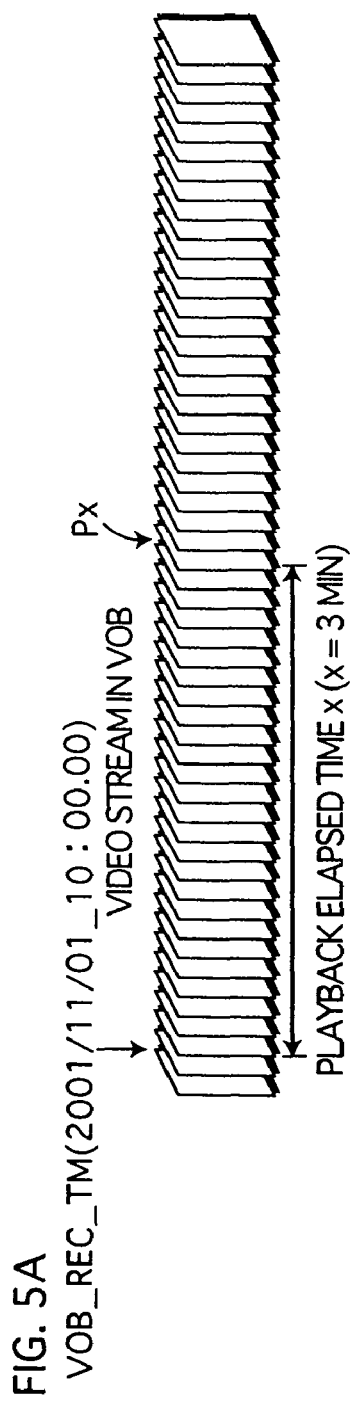
FIGS. 5A and 5B show how the recording date/time KHx of picture data Px is obtained.
Figure 5B:

The VOB_REC_TM will be further described in detail here. The VOB_REC_TM is used to present the recording date/time of picture data to the user. FIGS. 5A and 5B show how the recording date/time is presented to the user by the recording apparatus using the DVD in the present embodiment. In FIGS. 5A and 5B, "KHx" represents the recording date/time of picture data Px that was recorded after time x elapsed from the recording start time. The recording start time equals to the VOB_REC_TM of the VOB. In this example, it is supposed that the elapsed time x is 3 minutes. It is also supposed that the recording elapsed time is equal to the presentation elapsed time, and actually the presentation elapsed time which is obtained from the time indicated by the timer is used for the calculation. In the present example, the VOB_REC_TM is "2001.11/1 10:00.00". Accordingly, the recording date/time KHx "2001.11/1 10:03.00" obtained by adding 3 minutes to the VOB_REC_TM is superimposed on presentation image GPx corresponding to the picture data Px and is presented to the user, as shown in FIG. 5B. In this way, the recording date/time KHx is obtained and presented for each piece of picture data. This achieves presentation of recording date/time similar to the presentation of recording data for each image that is provided by a camcorder using video cassette tape as the recording medium.

FIG. 6 shows the format of VOB_REC_TM. As shown in FIG. 6, 6 bits from bit 0 to bit 5 are assigned to "second" (Second [5.0]), 6 bits from bit 6 to bit 11 are assigned to "minute" (Minute [1.0], Minute [5.2]), 5 bits from bit 12 to bit 16 are assigned to "hour" (Hour [4], Hour [3.0]), 5 bits from bit 17 to bit 21 are assigned to "day" (Day [4.0]), 4 bits from bit 22 to bit 25 are assigned to "month" (Month [1.0], Month [3.2]), and 14 bits from bit 26 to bit 39 are assigned to "year" (Year [5.0], Year [13.6]). A fraction of the picture data recording date/time that cannot be shown by this format of the VOB_REC_TM is indicated by the VOB_REC_TM_SUB in a unit that is smaller than second and a video frame.

The LOCAL_TM_ZONE will be described later for the case where it is utilized when data is recorded onto the DVD in two or more time zones.

Figure 7:
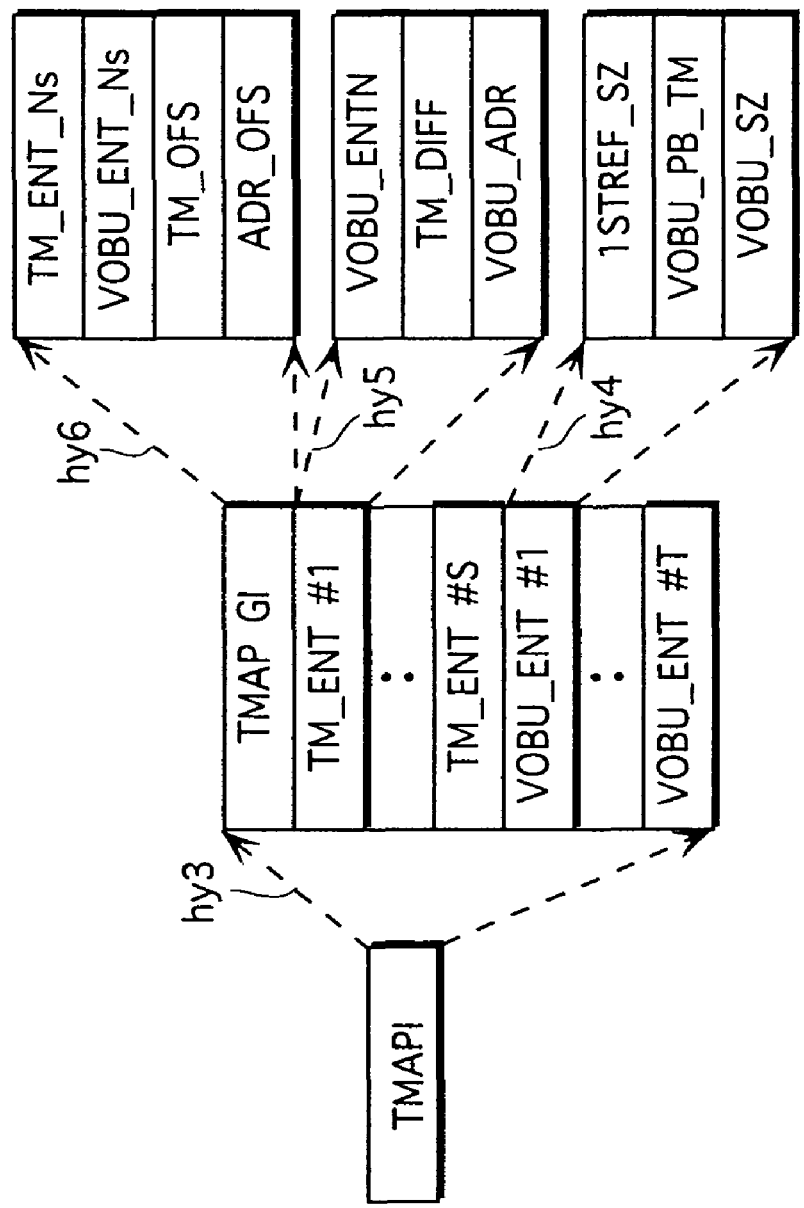
FIG. 7 shows the construction of TMAPI.

Now, TMAPI will be described. The TMAPI is a table that shows the correspondence between VOBU addresses and presentation times. FIG. 7 shows the construction of the TMAPI. The TMAPI includes, as the dotted arrow hy3 indicates, TMAP_GI (General Information), TM_ENT (Time ENTry) #1-#S, and VOBU_ENT (VOBU ENTry) #1-#T. Each VOBU_ENT is information corresponding to a different VOBU and includes, as the dotted arrow hy4 indicates: 1STREF_SZ (firST REFerence SiZe) indicating the size of the first I-Picture of the corresponding VOBU; VOBU_PB_TM (VOBU_PlayBack_TiMe) indicating a playback time of the order of 0.4 seconds to 1.0 seconds required to play back the corresponding VOBU; and VOBU_SZ (SiZe) indicating the size of the corresponding VOBU. Even if the size or the playback time is different for each VOBU due to the adoption of the variable-length coding, it is possible to access a picture in a VOBU corresponding to any playback time by referring to the "VOBU_ENT".

The "TM_ENT" is information that indicates the location of a time entry every 10 seconds. The "TM_ENT" includes, as the dotted arrow hy5 indicates: "VOBU_ENTN" that indicates a VOBU containing the time entry; "TM_DIFF" that indicates an offset time between the start of the VOBU shown in the "VOBU_ENTN" and the time entry; and "VOBU_ADR" that indicates an offset between the start of the VOB and the start of the VOBU shown in the "VOBU_ENTN". The "TM_ENT" enables a picture in a VOBU to be accessed at a high speed every 10 seconds.

The "TMAP_GI (TimeMap General Information)" is information that is used to manage the TMAPI as a whole and includes, as the dotted arrow hy6 indicates: "TM_ENT_Ns" that indicates the number of time entries set in the VOB; "VOBU_ENT_Ns" that indicates the number of VOBU_ENTs contained in the TMAPI; "TM_OFS" that indicates an offset between the start of the VOB and one time entry; and "ADR_OFS" that indicates an offset between the start of "VR_MOVIE.VRO" and the start of the VOB.

Figure 8:
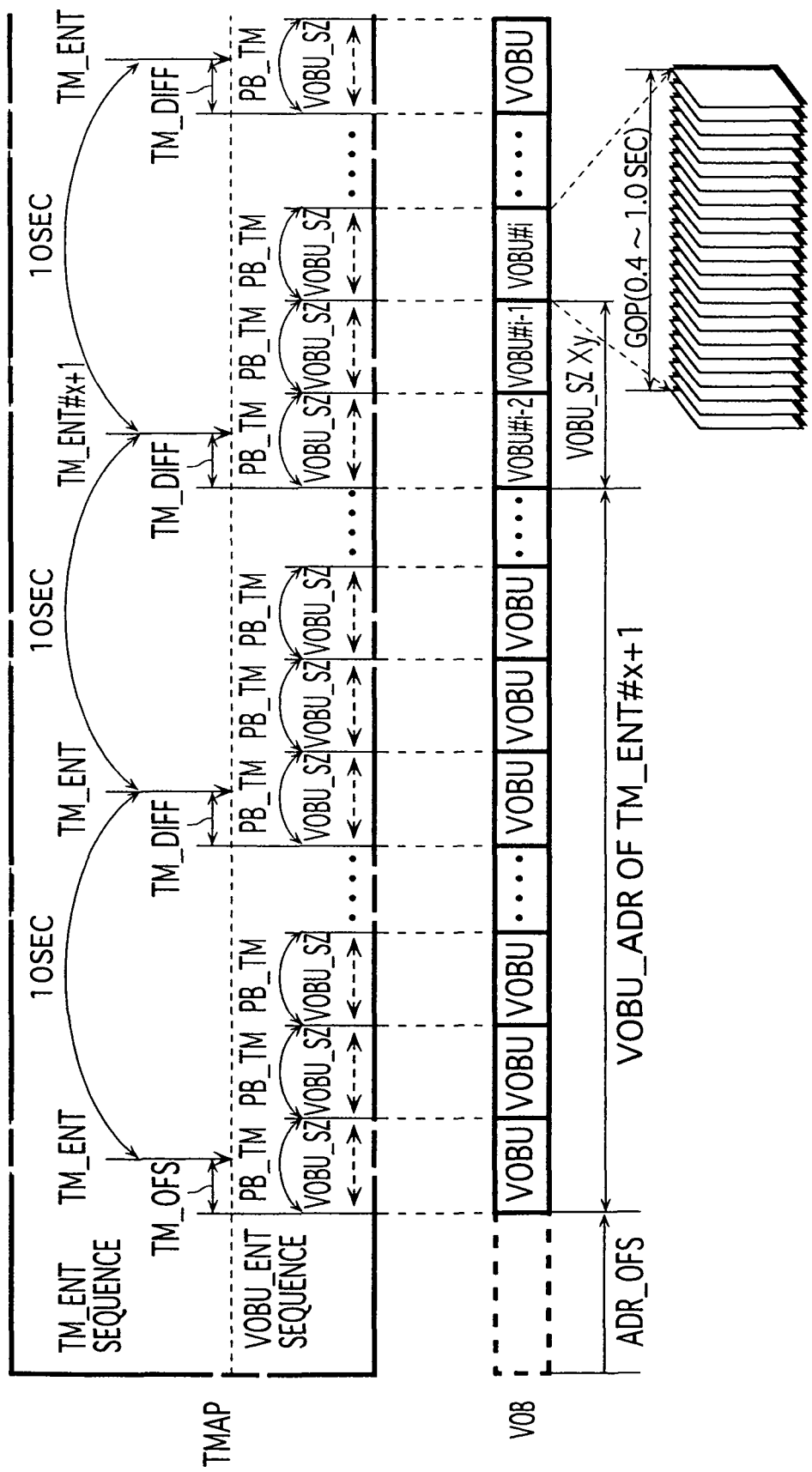
FIG. 8 shows the relationship between TMAPI and VOBU.

FIG. 8 shows the relationship between TMAPI and VOBU. In FIG. 8, the playback time and the size of each VOBU are indicated by each combination of a VOBU_PB_TM (represented as "PB_TM" in FIG. 8) and a VOBU_SZ. The "TM_DIFF" in TM_ENT indicates a time differential between the start of the VOBU and the start of the time entry. With the TMAPI of the above construction, it is possible to identify a VOBU corresponding to a given time code.

When a relative time Tx from the start of the VOB is specified for a picture to be played back, values for "x", "y", "z" satisfying the following Formula 1 are obtained from FIG. 8, the obtained values for x and y are substituted into the following Formula 2 to obtain an address of VOBU #i corresponding to the relative time Tx, the VOBU #i is read from the obtained address on the DVD, and a picture at a location after a time "z" from the playback start time of the VOBU #i is played back as the picture for the specified relative time Tx.

Relative time $Tx$ for specified picture=10 seconds×$x$−
  TM_DIFF for (TM_ENT #$x$+1)+TM_OFS+
  ΣVOBU_PB_TM+$z$  Formula 1

In the above formula, ΣVOBU_PB_TM represents a total sum of the first VOBU_PB_TM to the $y^{th}$ VOBU_PB_TM.

Address of VOBU #$i$=ADR_OFS+VOBU_ADR for
  (TM_ENT #$x$+1)+ΣVOBU_SZ  Formula 2

In the above formula, ΣVOBU_SZ represents a total sum of the first VOBU_SZ to the $y^{th}$ VOBU_SZ.

Even when a specified picture is accessed using the TMPI and played back, the recording date/time shown in FIG. 5B is displayed. In this case, the recording date/time of the specified picture is obtained by adding the relative time Tx to the VOB_REC_TM of the VOB.

Figure 9:
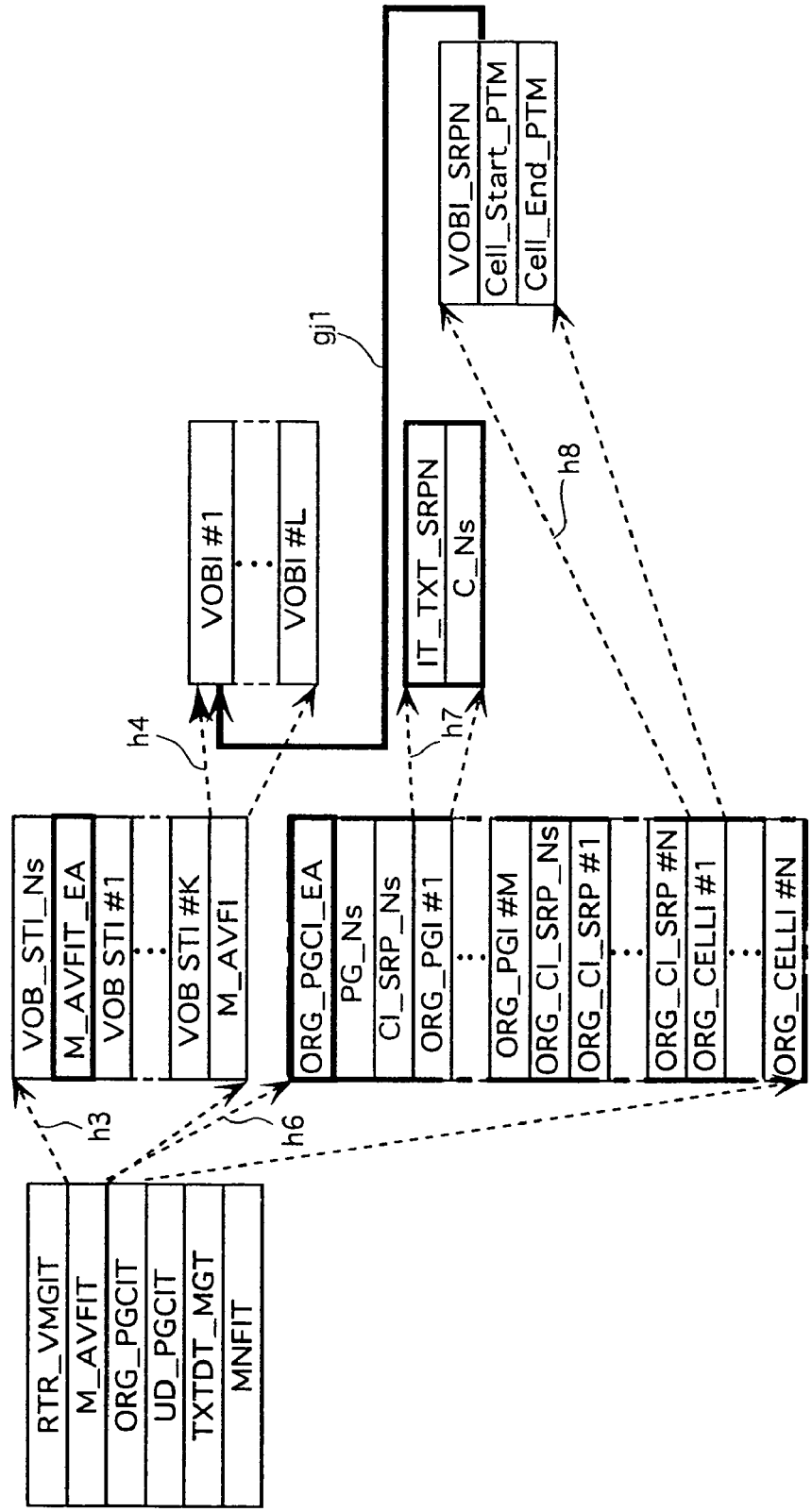
FIG. 9 shows the internal structure of VR_MANGR.IFO.

Up to now, "M_AVFIT" has been described. From now on, the other tables of VR_MANGR.IFO will be described with reference to FIG. 9. FIG. 9 shows the internal structure of VR_MANGR.IFO. FIG. 9 differs from FIG. 3 in that it shows the internal structure of the ORG_PGCI table.

The ORG_PGCI (Original Program Chain Information) table is used manage a plurality of VOBs recorded on a DVD so that the VOBs can be played back as in a reel of video tape. More specifically, the ORG_PGCI table arranges the plurality of VOBs recorded in a DVD to be connected in series in a playback order called "Original Program Chain". With this arrangement, users can regard the DVD as a reel of video tape. In this arrangement, VOB_REC_TM in each VOBI is referred to and VOBs are arranged in order of time shown in VOB_REC_TM. Here, the relationships between ORG_PGCI and VOB will be described. The VOBs belong to a logical hierarchy "PG-CELL-VOB". The ORG_PGCI is the PGs (programs) in the highest hierarchy level that have been arranged into a series. The ORG_PGCI table (ORG_PGCIT) is defined so that the logical hierarchy "PG-CELL-VOB" can be achieved. As indicated by the dotted arrow h6 in FIG. 9, the ORG_PGCIT is composed of: ORG_PGCI_EA (Effective Address) showing the effective length of the ORG_PGCI table; PG_Ns showing the number of PGs connected in series in the ORG_PGC; CI_SRP_Ns showing the number of search pointers corresponding to CELLI (CI); ORG_PGI #1 . . . ORG_PGI #M which are information corresponding to the plurality of PGs contained in ORG_PGC; ORG_CI_SRP #1 . . . ORG_CI_SRP #N which are search pointers corresponding to the plurality of CELLIs; and ORG_CELLI #1 . . . ORG_CELLI #N.

The ORG_CELLI is information that indicates a logical playback section by a combination of time codes, and as the dotted arrow h8 indicates, is composed of: VOBI_SRPN being a pointer that points to one among the plurality of VOBIs contained in the M_AVFIT that corresponds to the CELLI, as indicated by the arrow gj1; and CELL_Start_PTM and CELL_End_PTM that are time codes as a pair specifying a section in the VOB as a playback section (referred to as CELL).

Figure 10:
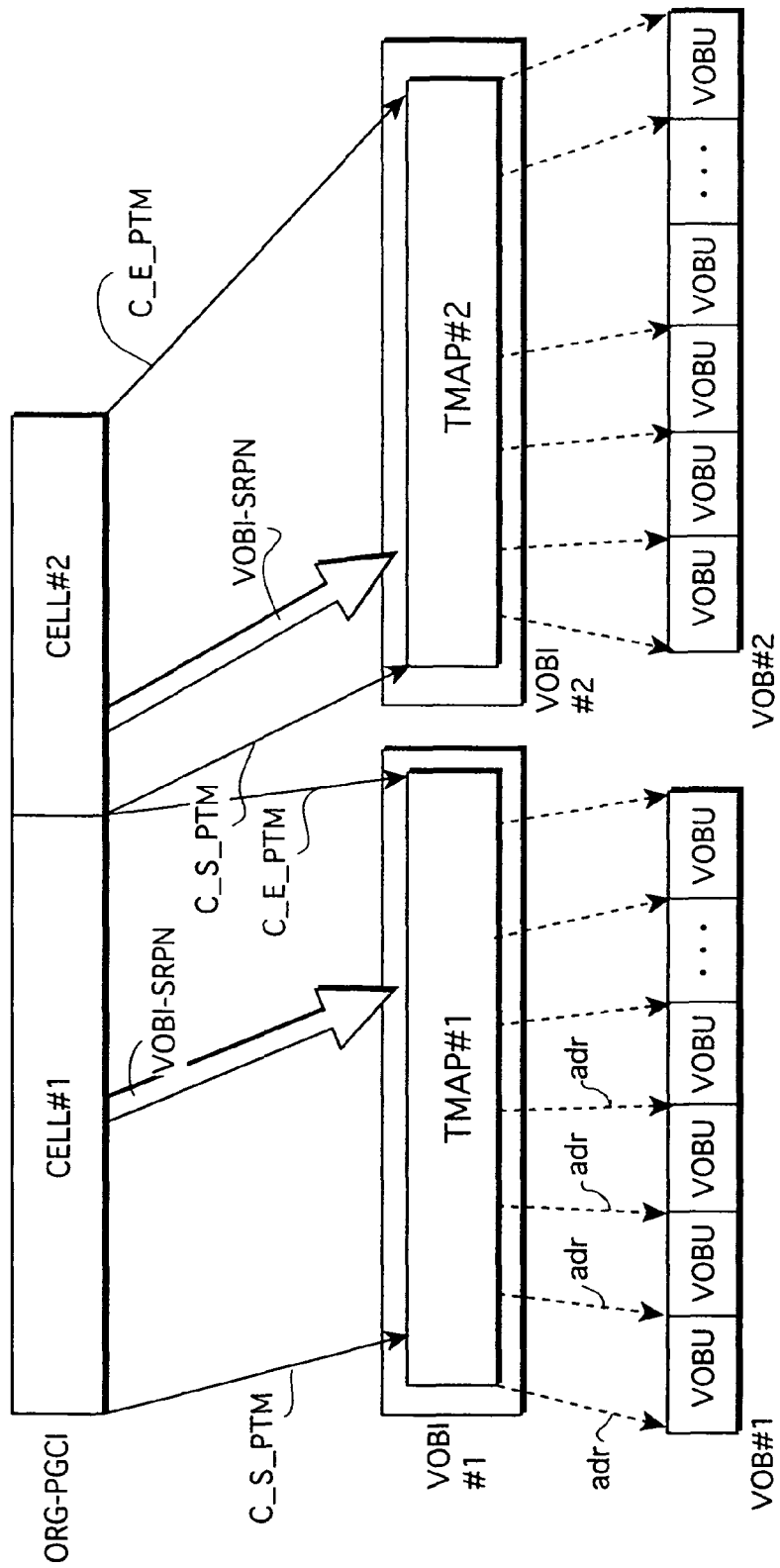
FIG. 10 shows relationships between CELLs and VOBs contained in ORG_PGCI.

FIG. 10 shows relationships between CELLs and VOBs contained in ORG_PGCI. As shown in FIG. 10, correspondence between each CELL and each VOBI is indicated by VOBI_SRPN. A given section constituting a VOB is specified as a CELL by two VOBU addresses which are obtained as a result of conversion, through the TMAPI, from a pair of CELL_Start_PTM (C_S_PTM in FIG. 10) and CELL_End_PTM (C_E_PTM in FIG. 10) contained in the CELL.

The ORG_PGI (Original Program Information) is composed of, as the dotted arrow h7 indicates: IT_TXT_SRPN specifying one of a plurality of pieces of text data contained in TXTDT_MG that corresponds to the PG; and CNs indicating the number of CELLIs contained in the PG.

Figure 11:
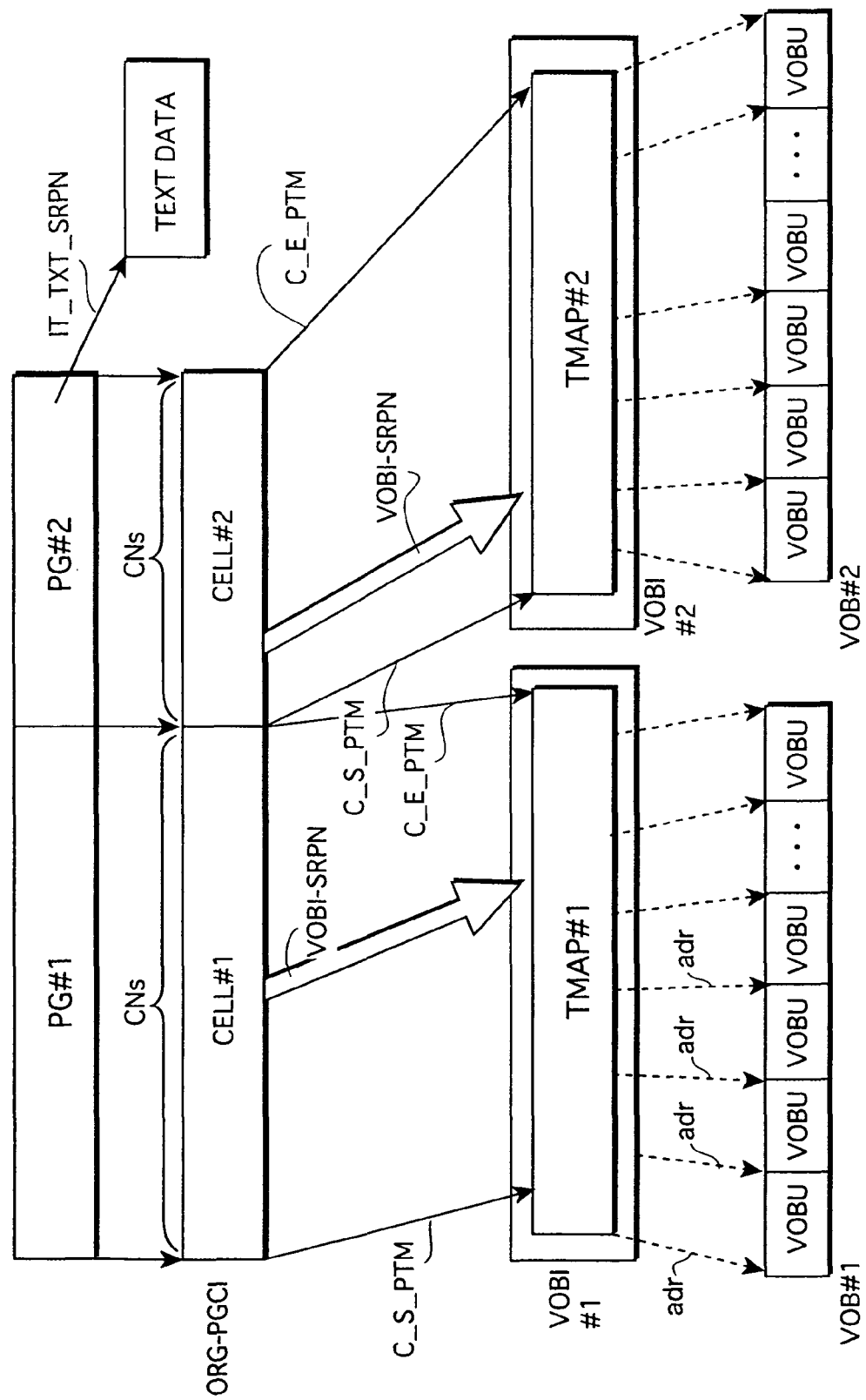
FIG. 11 shows how the CELLs shown in FIG. 9 are assigned to PGs.

FIG. 11 shows how the CELLs shown in FIG. 9 are assigned to PGs. As shown in FIG. 11, the CNs contained in the PGI indicates the portions of CELL #1 through CELL #2 that are contained in PG #1 and PG #2, respectively. Furthermore, the IT_TXT_SRPN contained in the PG indicates the text data corresponding to the PG.

Figure 12:
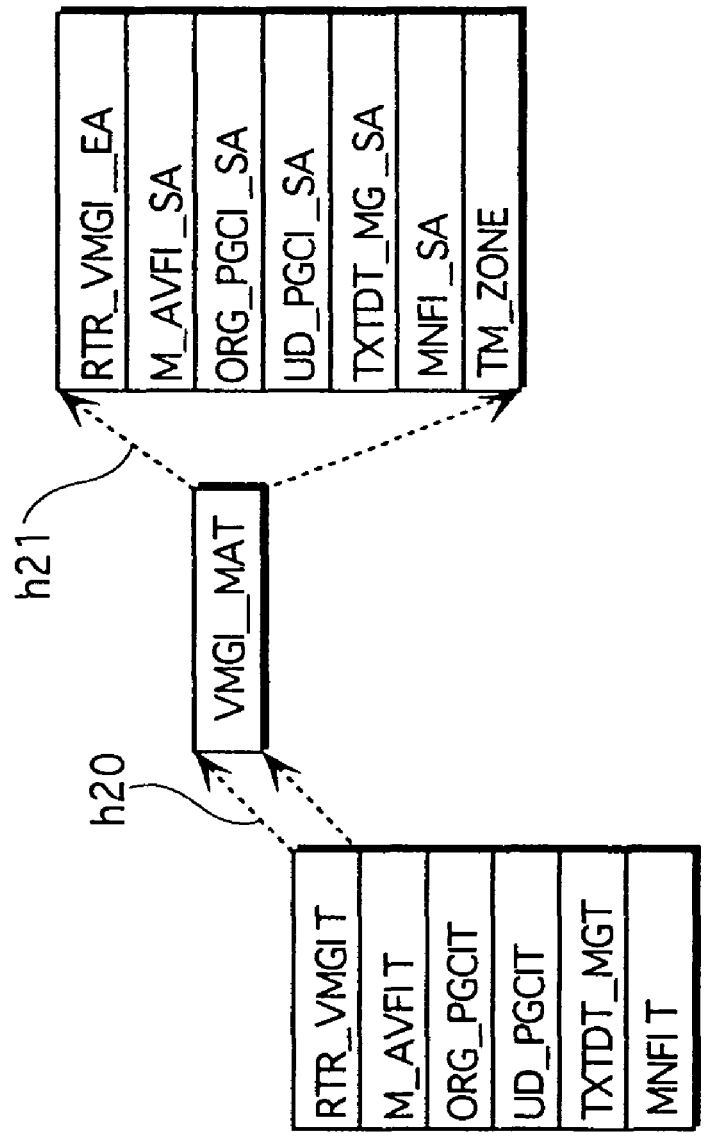
FIG. 12 shows RTR_VMGI contained in the management file VR_MANGR.IFO.

Up to now, the ORG_PGCI has been described. From now on, the internal structure of the other tables will be described with reference to FIG. 12.

The UD_PGCIT (User-Defined Program Chain Table) is a table that defines combinations of playback sections (referred to as PlayList) set by users at will.

The TXTDT_MGT (Text Data Manager Table) contains a plurality of pieces of text data defined by users at will, such as broadcast program names, scene names or the like.

The MNFI table is a table in which information unique to each maker of recording apparatuses is written.

The RTR_VMGIT (Real Time Recording Video Management General Information Table) includes, as the dotted line h20 indicates, VMGI_MAT (Video Management General Information Map Table). The VMGI_MAT is composed of, as the dotted arrow h21 indicates: RTR_VMGI_EA being an effective length of the RTR_VMGIT; and M_AVFIT_SA, ORG_PGCI_SA, UD_PGCI_SA, TXTDT_MG_SA, MNFI_SA, and TM_ZONE.

Figure 13:
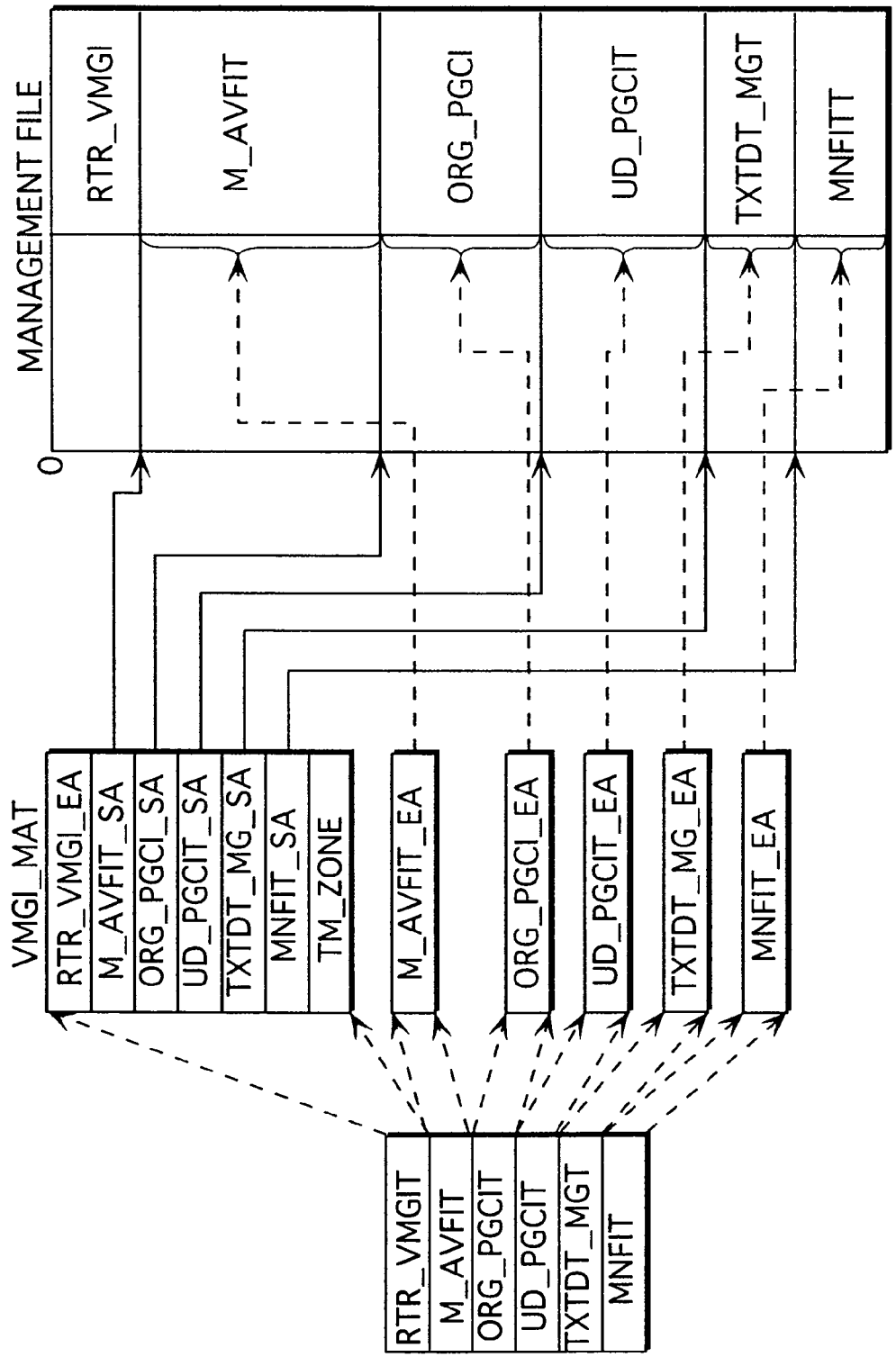
FIG. 13 shows how areas in the management file assigned to the management tables are specified by the start addresses (M_AVFIT_SA through MNFIT_SA) written in the VMGI_MAT and the effective lengths (M_AVFIT_EA through MNFIT_EA) written in the management tables.

FIG. 13 shows how areas in the management file assigned to the management tables are specified by the start addresses (M_AVFIT_SA through MNFIT_SA) written in the VMGI_MAT and the effective lengths (M_AVFIT_EA through MNFIT_EA) written in the management tables. The sign "{" shown on the right-hand side of FIG. 13 indicates the areas in the management file assigned to the management tables that are identified by M_AVFIT_SA through MNFIT_SA and M_AVFIT_EA through MNFIT_EA.

The start addresses (M_AVFIT_SA through MNFIT_SA) of the management tables written in the VMGI_MAT are actually offsets between the start of VR_MANGR.IFO and the management tables. The M_AVFIT_EA through MNFIT_EA are effective lengths of the management tables. As a result, the end addresses of the management tables are obtained by adding the start addresses written in the VMGI_MAT of RTR_VMGI to the effective lengths written in the management tables.

Now, TM_ZONE will be described. The TM_ZONE indicates a time zone that is used as a standard time zone for recording date/time information such as VOB_REC_TM onto the DVD. Whenever date/time information is recorded in any table in the management file VR_MANGR.IFO, the time zone indicated by the TM_ZONE must be used as the standard time zone. The specification of the time zone by the TM_ZONE is effective in the entire DVD. As a result, the TM_ZONE is sometimes referred to as "volume offset". The VOB_REC_TM for each VOB is also based on the time zone specified by the TM_ZONE. Therefore, the display of the recording date/time shown in FIG. 5 and sorting of VOBs constituting ORG_PGCI are both based on the time zone specified by the TM_ZONE.

Figure 14:
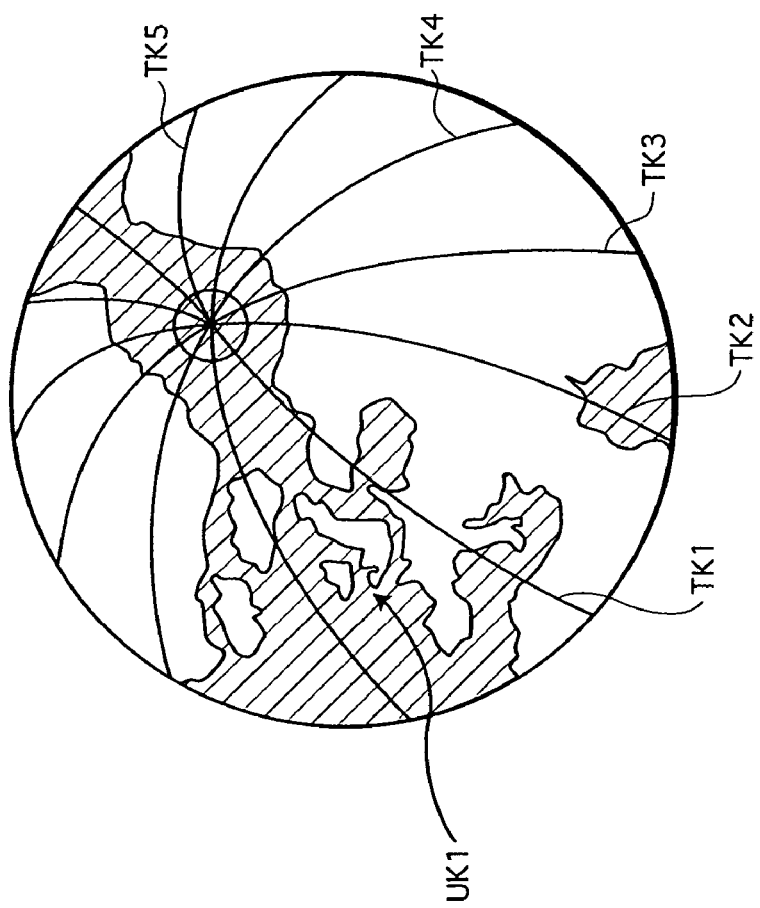
FIG. 14 shows time zones for different regions on the earth.

The standard time is divided into (1) Greenwich Mean Time which is the universal time, and (2) standard times for different regions. The TM_ZONE has a format that can conform to any of the above standard times on which the date/time information is based. FIG. 14 shows time zones for different regions on the earth. The longitude lines TK1 to TK5 in FIG. 14 are demarcations between time zones. The time zones have different standard times that are mean solar times based on the Greenwich Mean Time of the United Kingdom (UK1 in FIG. 14).

FIG. 15 shows the format of TM_ZONE. As shown in FIG. 15, TM_ZONE has 16 bits. Of these, 12 bits of bits 0 to 11 are assigned to TZ_OFFSET, and 4 bits of bits 12 to 15 are assigned to TZ_TY. The TZ_TY indicates that the date/time information is based on the universal time when it is "0000", and that the date/time information is based on another standard time when it is "0001". When the TZ_TY is set to "0001", the TZ_OFFSET indicates a time differential between the Greenwich Mean Time and the standard time of the time zone in units of minutes.

Figure 16A:
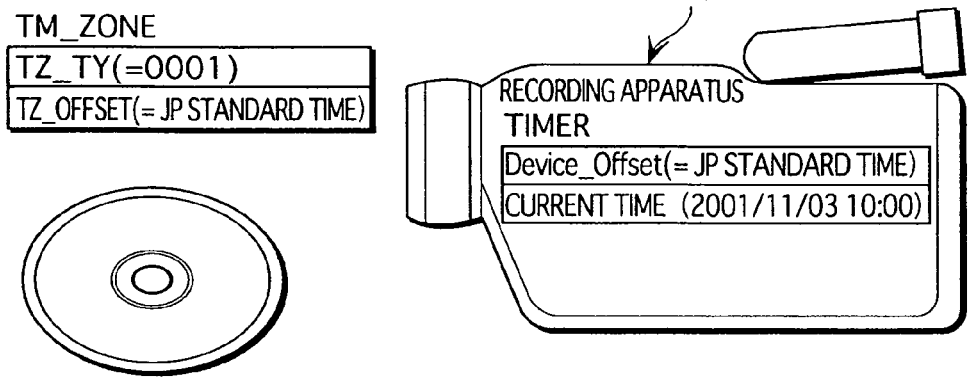
FIGS. 16A, 16B, and 16C show in what timing TM_ZONE is referred to and how VOB_REC_TM is set by the recording apparatus 1a in Japan.
Figure 16B:
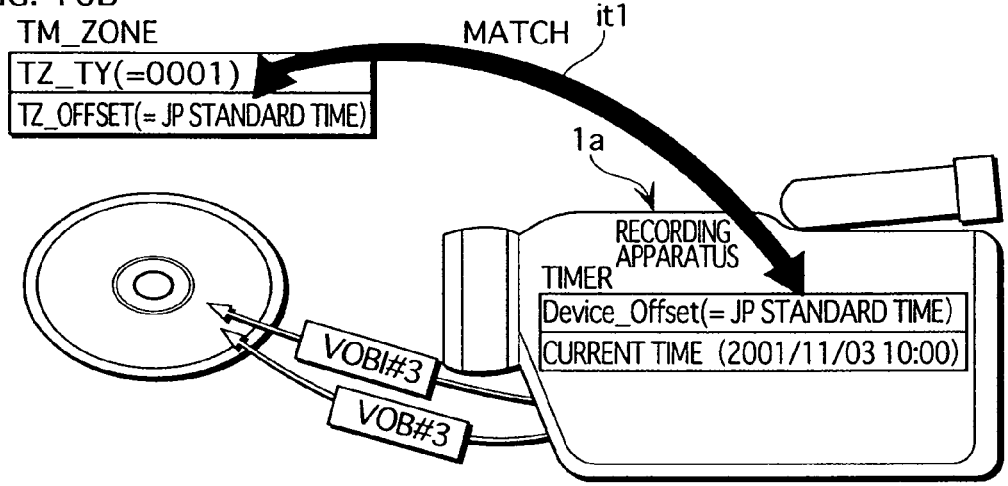
Figure 16C:
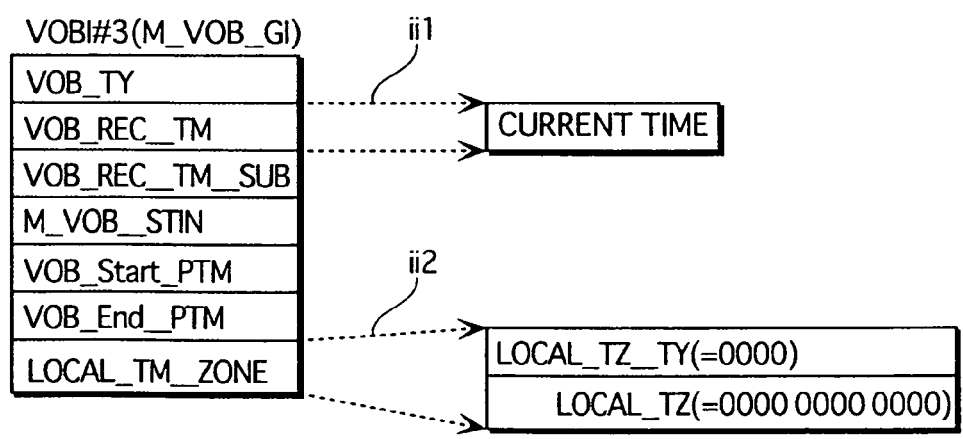

FIGS. 16A, 16B, and 16C show in what timing TM_ZONE is referred to and how VOB_REC_TM is set by the recording apparatus 1a in Japan. Since the recording apparatus 1a is in Japan, the timer of the recording apparatus 1a measures the current time based on the Japanese Standard Time. The Device_Offset has a time differential from which the standard time (and the time zone) which the timer of the recording apparatus is based on can be identified. The Device_Offset is different from TZ_OFFSET contained in DVDs. As shown in FIG. 16B, the recording apparatus 1a is attempting to write a new VOB (i.e. VOB #3) and corresponding VOBI #3 onto a DVD, and as a result of a judgment, it is judged that TZ_OFFSET in TM_ZONE matches the Device_Offset in the recording apparatus 1a, as indicated by the arrow it1. This leads to the setting of VOBI #3 shown in FIG. 16C. As indicated by the arrow ii1, VOB_REC_TM of VOBI #3 is set to the current time measured by the timer of the recording apparatus 1a, and as indicated by the arrow ii2, LOCAL_TM_ZONE is set to "0000 0000 0000".

In the above DVD, all date/time information including VOB_REC_TM is based on TZ_OFFSET in TM_ZONE, which means all kinds of date/time information are unified.

Figure 17:
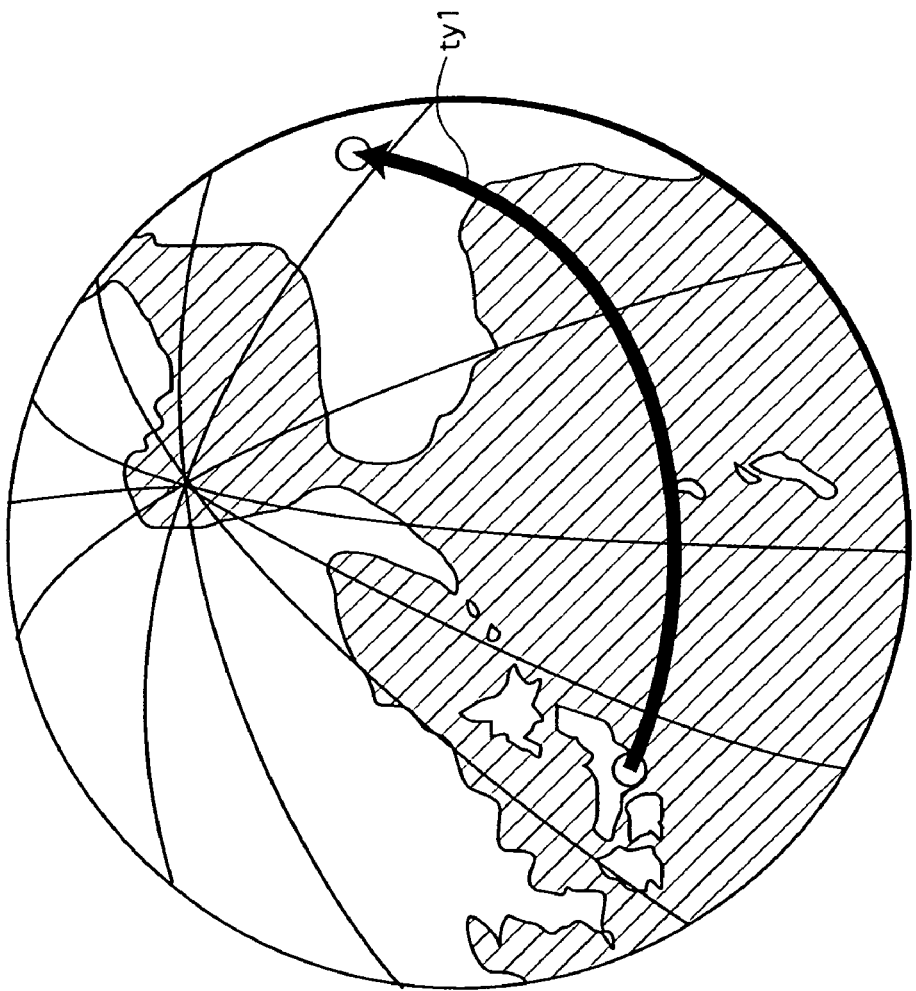
FIG. 17 shows a transfer from Japan to U.S.A.

In the description so far, it was supposed that the DVD is used in the same time zone as the recording apparatus. The following will describe the case where the DVD is used in a different time zone and in what formats a recording apparatus records the VOBs and VOBIs in the time zone. In the sample case, it is supposed that the DVD that has been used in Japan is taken to U.S.A. by the user. FIG. 17 shows a transfer from Japan to U.S.A., the transfer being indicated by the arrow ty1. Suppose that in U.S.A., the user uses a recording apparatus 1b that is based on a standard time in U.S.A. In this case, when a new VOB is to be recorded onto the DVD, the date/time information in the new VOB may be based on TM_ZONE of the DVD or the standard time of the recording apparatus 1b. In the present embodiment, the date/time information in the new VOB is based on TM_ZONE of the DVD. In addition, LOCAL_TM_ZONE in VOBI is set to Device_Offset in the recording apparatus 1b.

Figure 18:
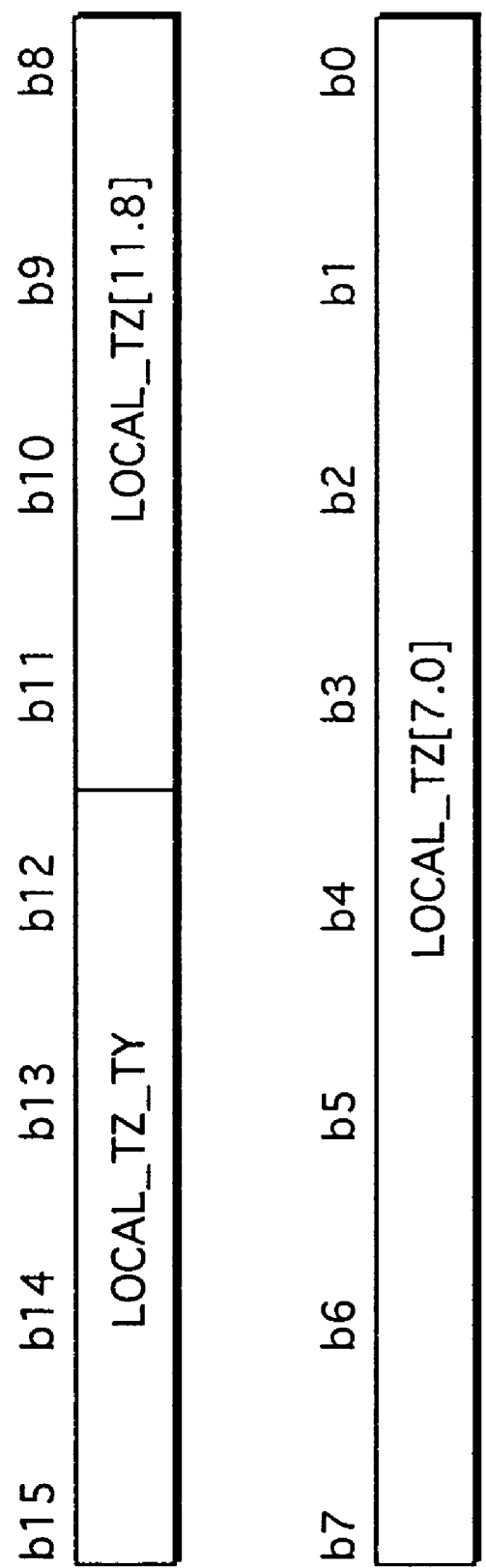
FIG. 18 shows the format of LOCAL_TM_ZONE.

Here, the LOCAL_TM_ZONE in VOBI will be described. The LOCAL_TM_ZONE becomes effective when a VOB is recorded in a time zone that is different from the time zone specified by TM_ZONE. The LOCAL_TM_ZONE specifies the different time zone as a local time zone unique to the VOB. FIG. 18 shows the format of LOCAL_TM_ZONE. As shown in FIG. 18, LOCAL_TM_ZONE has 16 bits. Of these, 12 bits of bits 0 to 11 are assigned to LOCAL_TZ, and 4 bits of bits 12 to 15 are assigned to LOCAL_TZ_TY. The LOCAL_TZ_TY indicates, when it is set to "0000", that it does not specify a local time zone, and that the time zone specified in TM_ZONE is used. That is to say, "0000" in the LOCAL_TZ_TY indicates that the VOB corresponding to the VOBI has been written by a recording apparatus having a timer that is based on the time zone specified by the TM_ZONE.

The LOCAL_TZ_TY indicates, when it is set to "0001", that it specifies a local time zone unique to the VOB. That is to say, "0001" in the LOCAL_TZ_TY indicates that the VOB corresponding to the VOBI has been written by a recording apparatus having a timer that is based on a time zone different from that specified in TM_ZONE. When LOCAL_TZ_TY is set to "0001", LOCAL_TZ contains a "local offset" that is a time differential between the Greenwich Mean Time and the standard time of the local zone, represented in units of minutes.

Figure 19A:
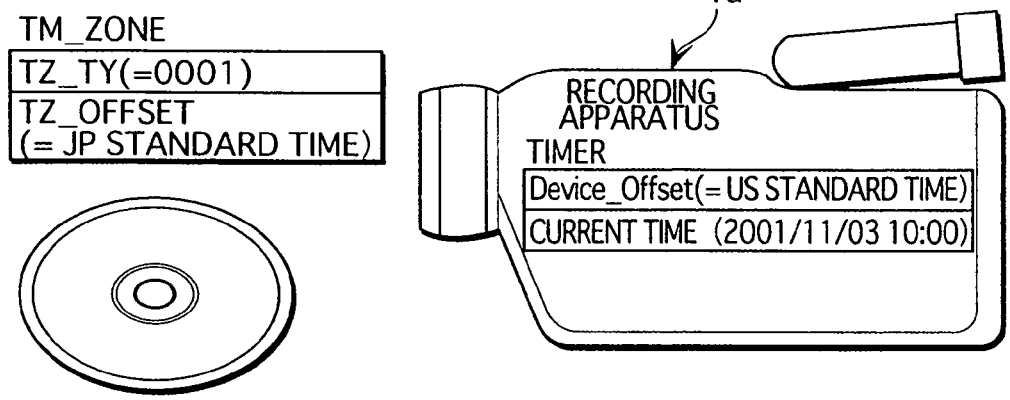
FIGS. 19A, 19B, and 19C show how the recording apparatus 1b in U.S.A. sets VOB_REC_TM and TM_ZONE.
Figure 19B:
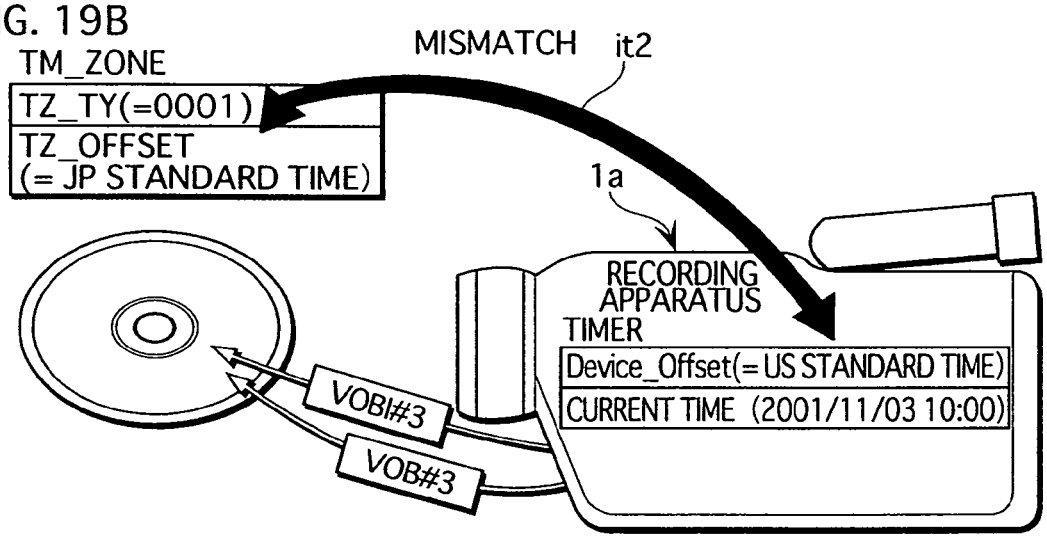
Figure 19C:
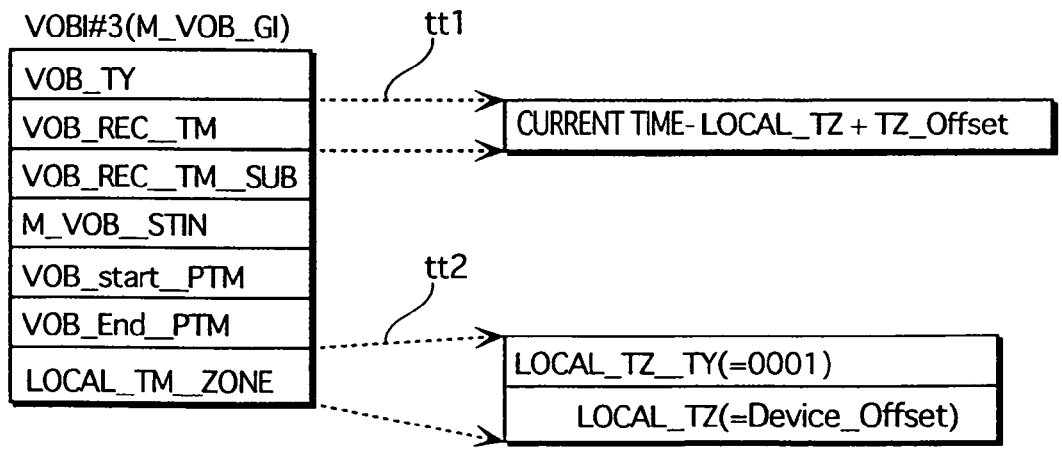

The following will describe how the recording apparatus 1b in U.S.A. writes a new VOB onto the DVD that has the format shown in FIGS. 16A to 16C. FIGS. 19A, 19B, and 19C show how the recording apparatus 1b in U.S.A. sets VOB_REC_TM and TM_ZONE. Since the recording apparatus 1b is in U.S.A., the Device_Offset of the recording apparatus 1b indicates a standard time of a time zone in U.S.A. as shown in FIG. 19A. On the other hand, the TM_ZONE is set to the Japanese standard time, as is the case with FIGS. 16A to 16C. As shown in FIG. 19B, the recording apparatus 1b is attempting to write a new VOB (i.e. VOB #3) and corresponding VOBI #3 onto the DVD, and as a result of a judgment, it is judged that TZ_OFFSET in TM_ZONE does not match the Device_Offset in the recording apparatus 1b, as indicated by the arrow it2. This leads to the setting of VOBI #3 shown in FIG. 19C. As indicated by the dotted arrow tt2, LOCAL_TZ_TY in LOCAL_TM_ZONE is set to "0001", and LOCAL_TZ is set to the Device_Offset of the recording apparatus 1b.

As indicated by the dotted arrow tt1, VOB_REC_TM is obtained by a calculation: current date/time−LOCAL_TZ+ TM_ZONE. In this calculation, the "current date/time" is based on the standard time of the time zone specified in the LOCAL_TM_ZONE. First, a date/time in the Greenwich Mean Time is obtained by subtracting a time differential shown in the LOCAL_TZ from the "current date/time". Then, VOB_REC_TM is obtained by adding TM_ZONE to the obtained date/time in the Greenwich Mean Time. This indicates that VOB_REC_TM is based on TZ_OFFSET in TM_ZONE.

This will be considered using an example in which TM_ZONE is written as "+540(=9.0 H)", and the VOB_REC_TM is to be set to a current date/time "Jan. 11, 2001, 21 (hour): 30 (minutes)" in a time zone having a time differential "−2.0 H" from the Greenwich Mean Time. In this case, the LOCAL_TZ in the above formula has a time differential "−120(=−2.0 H)". First, a date/time in the Greenwich Mean Time is obtained by subtracting the LOCAL_TZ (−2.0 H) from the "current date/time". Then, VOB_REC_TM is obtained by adding TM_ZONE (+9.0 H) to the obtained date/time in the Greenwich Mean Time ("Jan. 11, 2001, 23 (hour): 30 (minutes)"). As a consequence, VOB_REC_TM is set to "Jan. 12, 2001, 8 (hour): 30 (minutes)".

If the VOB_REC_TM is desired to be represented by the standard time of the time zone specified in the LOCAL_TM_ZONE, the recording date/time to be displayed is obtained by the following formula:

recording date/time=VOB_REC_TM−TM_ZONE+ LOCAL_TM_ZONE

In this case, the date/time in VOB_REC_TM is based on the standard time of the time zone indicated by TM_ZONE. First, therefore, a date/time in the Greenwich Mean Time is obtained by subtracting a time differential shown in the TM_ZONE from VOB_REC_TM. Then, the recording date/time by the local standard time is obtained by adding a time differential shown in LOCAL_TM_ZONE to the above result.

This will be considered using an example in which TM_ZONE in a VR_MANGR.IFO is written as "+540 (=9.0 H)" and the VR_MANGR.IFO contains an M_VOB_GI that contains LOCAL_TM_ZONE written as "−120 (=−2.0 H)" and VOB_REC_TM written as "Jan. 12, 2001, 8 (hour): 30 (minutes)". First, a date/time in the Greenwich Mean Time is obtained by subtracting a time differential (9.0 H) shown in the TM_ZONE from VOB_REC_TM (Jan. 12, 2001, 8 (hour): 30 (minutes)). Then, a time differential (−2.0 H) shown in LOCAL_TM_ZONE is added to the above result. As a consequence, "Jan. 11, 2001, 21 (hour): 30 (minutes)" is obtained as the recording date/time by the local standard time.

As described above, the present embodiment secures that VOB_REC_TM is set based on TZ_OFFSET specified in TM_ZONE, regardless of the time zone in which the VOB is recorded. More specifically, if a VOB is recorded on a DVD by a recording apparatus that is based on a standard time different from that defined for the DVD, VOB_REC_TM is set based on TZ_OFFSET specified in TM_ZONE. This means that all date/time information written in VOB_REC_TMs are unified, namely based on TZ_OFFSET specified in TM_ZONE. This provides an effect that even if VOBs, which have been recorded by various recording apparatuses based on different standard times, are sorted in the order of recording date/time into one ORG_PGCI, VOBs are always properly arranged. The present embodiment provides another effect that the recording date/time can be displayed by the local time by converting standard times using LOCAL_TZ in LOCAL_TM_ZONE, not by the recording date/time shown in VOB_REC_TM. This allows the user to feel normal when he/she views the played back images and the displayed recording date/time together.

Embodiment 2

Figure 20:
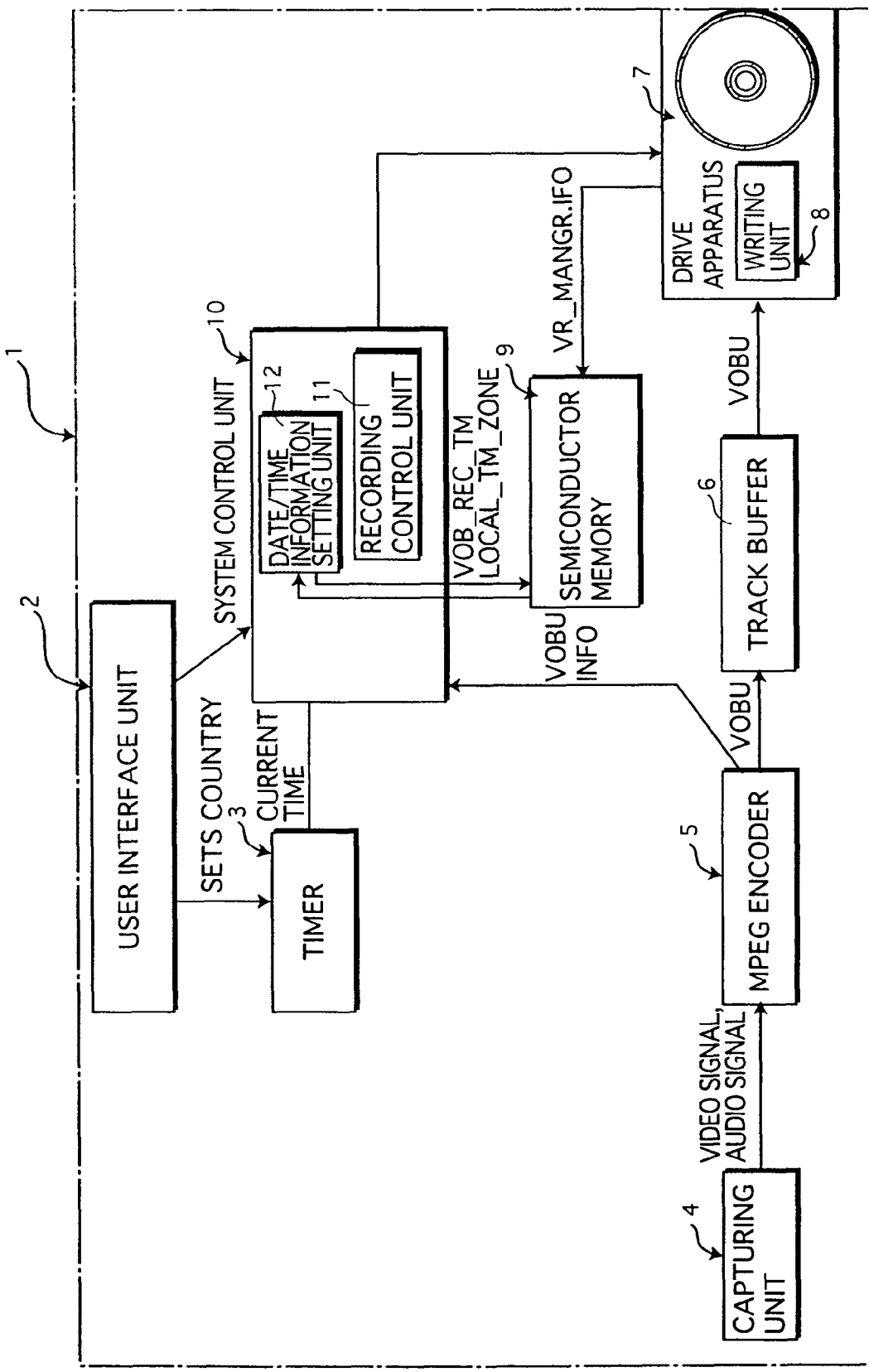
FIG. 20 shows the internal structure of the recording apparatus 1 in Embodiment 2.

Embodiment 2 discloses a recording apparatus 1 of a camcorder type for achieving the DVD shown in Embodiment 1. FIG. 20 shows the internal structure of the recording apparatus 1 in Embodiment 2. As shown in FIG. 20, the recording apparatus 1 includes a user interface unit 2, a timer 3, a capturing unit 4, an MPEG encoder 5, a track buffer 6, a drive apparatus 7, a writing unit 8, a semiconductor memory 9, a system control unit 10, a recording control unit 11, and a date/time information setting unit 12.

The user interface unit 2 receives various inputs from the user via a panel, a remote controller, a display or the like. The inputs received by the user interface unit 2 in Embodiment 2 includes a specification of a country, a recording start instruction, and a recording end instruction.

The timer 3 measures the current time. The current time measured by the timer 3 is based on the standard time of the country in which the recording apparatus 1 is used. It should be noted here that in the present document, for the sake of convenience, it is presumed that one country has one standard time. The timer 3 holds, in correspondence with a plurality of countries, a plurality of time differentials from which standard times can be identified. The timer 3 determines a time differential corresponding to a country specified by an input that the user interface unit 2 receives from the user. This enables the user to change the standard time on which the recording apparatus 1 is based when the user goes to a different country with the recording apparatus 1.

The capturing unit 4 includes a lens, an iris diaphragm, an image pickup device for receiving incoming light, and an amplifying circuit for amplifying an output of the image pickup device and outputting the amplified outcome. The capturing unit 4 outputs video signals and audio signals. Each video signal is composed of a plurality of video frames, and each audio signal is composed of a plurality of audio frames. The capturing unit 4 sequentially outputs the video and audio frames to the MPEG encoder 5.

The MPEG encoder 5 generates picture data by video-encoding the video frames input from the capturing unit 4, and at the same time generates audio data by audio-encoding the audio frames input from the capturing unit 4.

The MPEG encoder 5 interleave-multiplexes the generated picture data and audio data into VOBUs, and sequentially stores the VOBUs in the track buffer 6. Every time it completes system encoding of VOBUs, the MPEG encoder 5 notifies the system control unit 10 of information on the VOBUs (VOBU information). The VOBU information is divided into the following information:

VOBU Start PTM (a time to start playing back video frames of a VOBU)
Reference Picture Size (a size of the first I-Picture of a VOBU, where the VOBU start is regarded as "0")
VOBU_Size (a size of a VOBU)
VOBU_PB_Time (a playback time of a VOBU)

The above information are used to create VOBU_ENT in TMPI. Whenever the system control unit 10 receives such VOBU information from the MPEG encoder 5, it creates VOBU_ENT using the received information.

The track buffer 6 is used to adjust a difference between the speed at which the drive apparatus 7 writes VOBUs onto a DVD and the speed at which the MPEG encoder encodes picture data.

The drive apparatus 7 accesses a DVD and includes a base on which the DVD is set, a spindle motor for clamping the set DVD and driving the DVD for rotation, an optical pickup for reading out signals recorded on the DVD, and an actuator for the optical pickup. The drive apparatus 7 contains the writing unit 8.

The writing unit 8 records VOBUs stored in the track buffer 6 onto a DVD each time the track buffer 6 is filled with VOBUs encoded by the MPEG encoder 5.

The semiconductor memory 9 is a storage area for storing the management file "VR_MANGR.IFO" as a resident file, where the file "VR_MANGR.IFO" is to be recorded onto a DVD set on the recording apparatus 1. The management file "VR_MANGR.IFO" is allowed to stay resident in the semiconductor memory 9 to avoid a conflict between a disc access for recording a VOBU and a disc access for updating the management file.

The system control unit 10 includes a CPU, a main storage, and a ROM, and also includes the recording control unit 11 and the date/time information setting unit 12.

The recording control unit 11 sets parameters, which are received by the user interface unit 2 at the recording start, into the MPEG encoder 5, where the parameters relate to a video compression method, a system bit rate or the like. The recording control unit 11 also creates prototypes for VOB STI, VOBI, and CellI in VR_MANGR.IFO, and requests the MPEG encoder 5 to encode video and audio frames. Each time a system encoding of a VOBU is completed, the recording control unit 11 receives the VOBU information from the MPEG encoder 5, and updates VR_MANGR.IFO in accordance with the received VOBU information. After receiving a recording end instruction input by the user and being informed of completion of an encoding from the MPEG encoder 5, the recording control unit 11 records all the VOBUs and the management file stored in the track buffer 6 onto the DVD via the drive apparatus 7, and ends the recording process.

Figure 21:
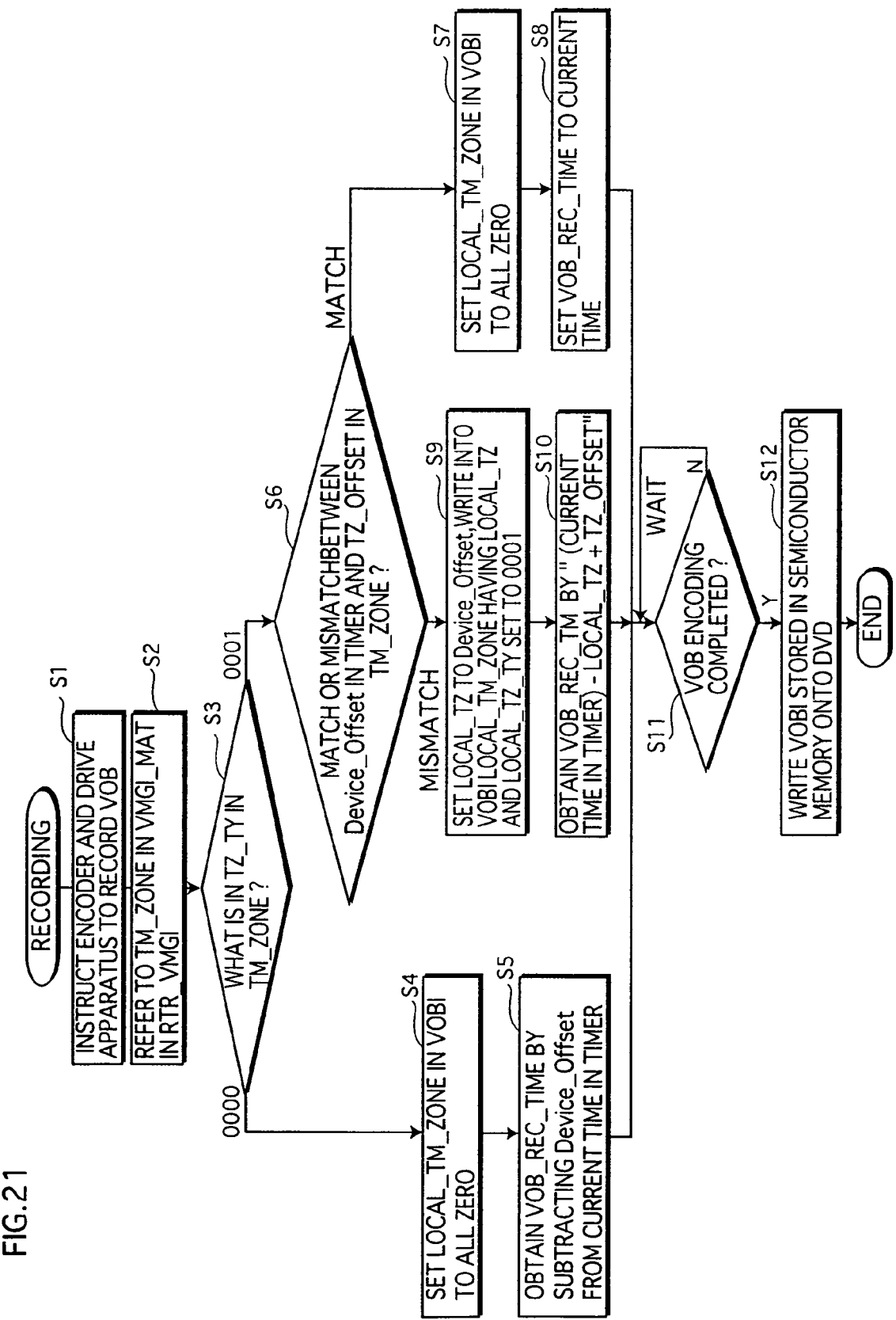
FIG. 21 is a flowchart showing the operation procedure of the date/time information setting unit 12.

The date/time information setting unit 12 sets VOB_REC_TM and LOCAL_TM_ZONE in VOBIs when a VOB is recorded. Now, the procedure of the operation performed by the date/time information setting unit 12 will be described with reference to the flowchart shown in FIG. 21. The flowchart focuses on how VOB_REC_TM and LOCAL_TM_ZONE are set. The setting has three patterns: steps S4-S5, steps S7-S8, and steps S9-S10. In the procedure, one of the setting patterns is selected in accordance with the results of judgments performed in steps S3 and S6.

The MPEG encoder 5 and the drive apparatus 7 are instructed to record a VOB onto a DVD (step S1). The TM_ZONE in VMGI_MAT in RTR_VMGI is referred to (step S2). It is judged whether TZ_TY in TM_ZONE is "0000" or "0001" (step S3). When TZ_TY is "0000", steps S4 and S5 are performed. The fact that TZ_TY is "0000" indicates that the date/time information in the DVD is based on the universal time.

The LOCAL_TM_ZONE in a VOBI is set to "0" (that is to say, all bits are set to 0) (step S4). The VOB_REC_TIME by the universal time is calculated by subtracting Device_Offset from the current time measured by the timer 3 (step S5).

Step S6 is performed only when it is judged in step S3 that TZ_TY in TM_ZONE is "0001". The fact that TZ_TY is "0001" indicates that the date/time information in the DVD is based on a standard time for a time zone other than the universal time. In this case, it matters whether the recording apparatus 1 and the DVD are based on the same standard time. This is judged in step S6. That is to say, in step S6, the value of TZ_OFFSET in TM_ZONE in RTR_VMGI in the DVD is compared with the value of Device_Offset in the timer 3 to judge whether they match. When they match, the LOCAL_TM_ZONE in the VOBI is set to "0" (step S7). The VOB_REC_TIME is set to the current time measured by the timer 3 (step S8). When it is judged that the TZ_OFFSET does not match the Device_Offset in step S6, the LOCAL_TZ is set to the Device_Offset, and LOCAL_TM_ZONE containing the LOCAL_TZ and LOCAL_TZ_TY set to "0001" are written into the VOBI (step S9). The VOB_REC_TM is obtained by performing the calculation: "(current time of timer 3)-LOCAL_TZ+TZ_OFFSET" (step S10).

The VOB_REC_TM and LOCAL_TM_ZONE have been set in the above steps. Completion of a VOB encoding is waited (step S1). After it is judged in step S11 that the VOB encoding is completed, the VOBI stored in the semiconductor memory 9 is written onto the DVD (step S12).

As described above, according to the present embodiment, a conventional recording apparatus 1 can set the VOB_REC_TM and LOCAL_TM_ZONE to generate the DVD described in Embodiment 1. It is expected therefore that the present embodiment will enhance wider use of the DVD of Embodiment 1.

Here, the following should be noted. In the present embodiment, when TZ_TY in TM_ZONE is "0000" (indicating that the date/time in DVD is based on the universal time), LOCAL_TM_ZONE is also set to "0" (all zero). However, if TZ_TY in TM_ZONE is "0000", LOCAL_TM_ZONE may be set to a value indicating a standard time for a time zone in which the recording apparatus is used. To achieve this setting, the judgment in step S3 is omitted, and it is judged in step S6 whether TZ_OFFSET matches Device_Offset. If it is judged in step S6 that TZ_OFFSET does not match Device_Offset, LOCAL_TM_ZONE is set to Device_Offset, and TZ_OFFSET set to "0" is applied to step S10 to obtain VOB_REC_TM.

Embodiment 3

Figure 22:
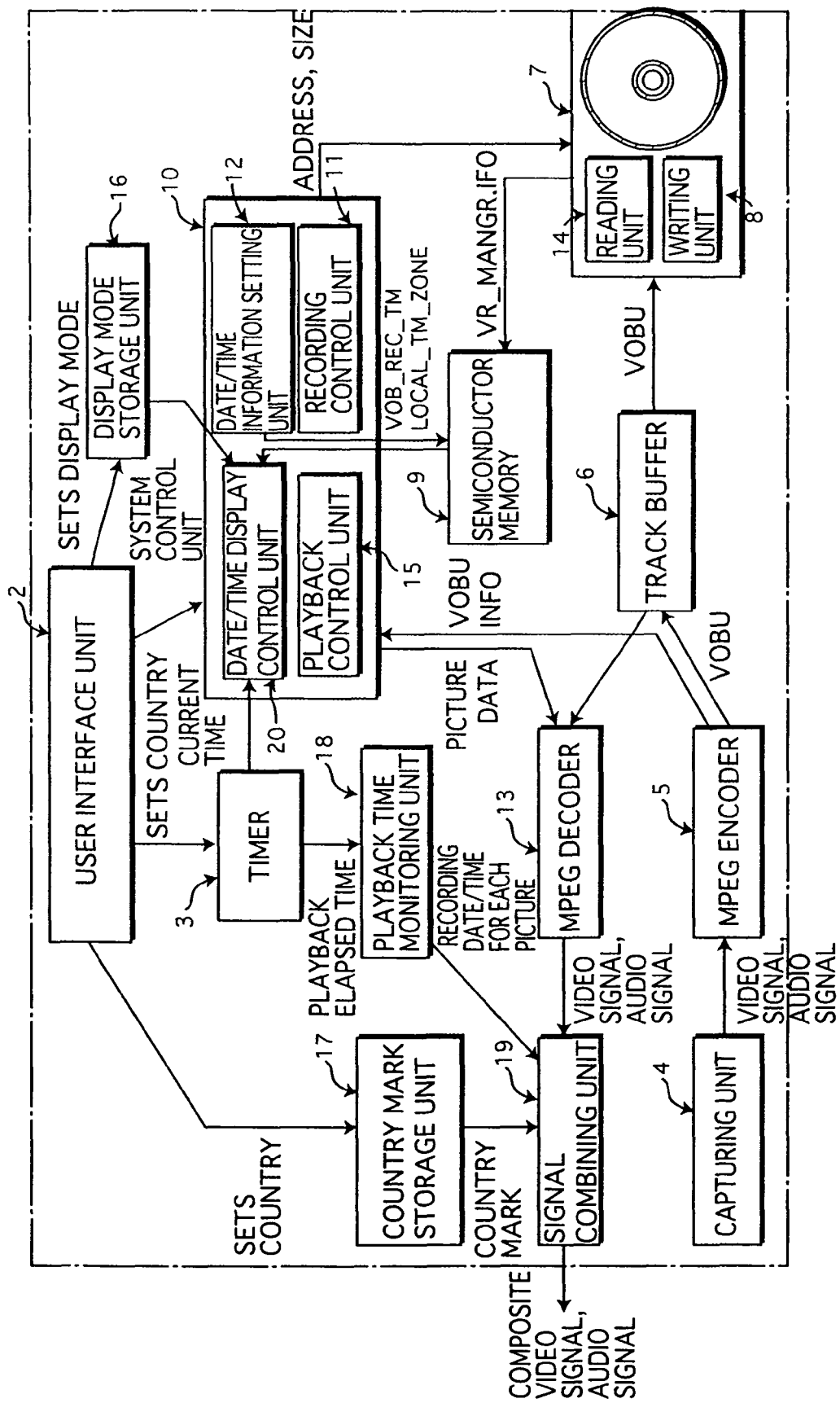
FIG. 22 shows the internal structure of the playback apparatus in Embodiment 3.

Embodiment 3 relates to a playback apparatus for playing back the DVD disclosed in Embodiment 1. FIG. 22 shows the internal structure of the playback apparatus in Embodiment 3. As understood from FIG. 22, the internal structure of the playback apparatus is based on that of the recording apparatus 1 in Embodiment 2. As a result, the playback apparatus in Embodiment 3 has functions of both the recording and playback apparatuses. As shown in FIG. 22, the playback apparatus includes an MPEG decoder 13, a reading unit 14, a playback control unit 15, a display mode storage unit 16, a country mark storage unit 17, a playback time monitoring unit 18, a signal combining unit 19, and a date/time display control unit 20 in addition to the components of the recording apparatus 1 shown in FIG. 20. The components having the same reference numbers as those of the recording apparatus 1 are not described in detail here since they have the same functions. The following description focuses on the newly added components.

The MPEG decoder 13, when receiving a decoding request from the playback control unit 15, decodes a VOBU, which has been read from a DVD and stored in the track buffer 6, to obtain a video signal, and outputs the obtained video signal to the signal combining unit 19.

The reading unit 14 is contained in the system control unit 10 in Embodiment 3. When the DVD is played back, the reading unit 14 accesses the DVD and reads VOBUs from the DVD and sequentially stores the read VOBUs into the track buffer 6. The reading and storing of VOBUs is continued until the track buffer 6 is filled with VOBUs. After the track buffer 6 is filled with VOBUs, the reading unit 14 waits until a free space is generated in the track buffer 6. After a free space is generated, the reading unit 14 newly reads out data from the DVD and writes the data into the track buffer 6, taking care on underflow.

The playback control unit 15 refers to pieces of CELL information in ORG_PGCI one by one, obtains the address and size of each VOBU from CELL_Start_PTM and CELL_End_PTM written in the read pieces of CELL information, instructs the drive apparatus to read the identified VOBUs from the DVD one by one, and instructs the MPEG decoder 13 to decode the VOBUs so that the VOBUs corresponding to the ranges specified by CELL_Start_PTM and CELL_End_PTM are played back.

Figure 23:
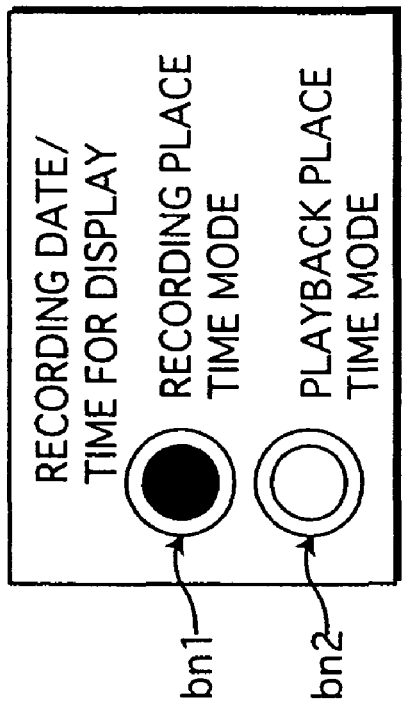
FIG. 23A shows a menu screen on which the user can select either the recording place time mode or the playback place time mode via the user interface unit 2.
FIG. 23B shows the information stored in the country mark storage unit 17.

The display mode storage unit 16 stores a display mode in which the recording date/time is displayed. In the present embodiment, two display modes are provided: recording place time mode; and playback place time mode. As described in Embodiments 1-3, the date/time information is based on the standard time of the time zone specified by either (a) TZ_OFFSET in TM_ZONE or (b) LOCAL_TZ in LOCAL_TM_ZONE. When the recording place time mode is selected by the user, the display mode storage unit 16 is set to the recording place time mode, and the date/time information based on either (a) or (b) above is used. However, the user may take the playback apparatus into a time zone that is neither the time zone identified by TM_ZONE nor the time zone identified by LOCAL_TM_ZONE. This may happen quite often since use of portable playback apparatuses has become widespread recently. In this case the user can select the playback place time mode to play back a VOB. With this selection, the display mode storage unit 16 is set to the playback place time mode. FIG. 23A shows a menu screen on which the user can select either the recording place time mode or the playback place time mode via the user interface unit 2. The user selects one of the buttons bn1 and bn2 that correspond to the recording place time mode and the playback place time mode, respectively.

The country mark storage unit 17 stores a plurality of time differential values that are set to either TZ_OFFSET or LOCAL_TZ, and also stores a corresponding plurality of marks that indicate countries including the UK with the universal time. FIG. 23B shows the information stored in the country mark storage unit 17. As shown in FIG. 23B, the value "0.0 H" corresponds to the mark indicating the UK providing the universal time; the value "9.0 H" indicating the time differential between the universal time and the Japanese standard time corresponds to the mark indicating Japan; and the value "−8.0 H" indicating the time differential between the universal time and the U.S.A. standard time corresponds to the mark indicating U.S.A.

The playback time monitoring unit 18, after a playback of a VOB is started, monitors the playback elapse time. More specifically, every time a piece of picture data to be displayed changes, the playback time monitoring unit 18 adds the playback elapse time up to the preceding piece of picture data to the displayed recording date/time of the first piece of picture data of the VOB, so that the sum can be displayed as the recording date/time of the new piece of picture data.

The signal combining unit 19 obtains a composite video signal by superimposing (a) a mark stored in the country mark storage unit 17 and (b) a character sequence representing a date/time for a piece of picture data obtained by the playback time monitoring unit 18 onto the image corresponding to the piece of picture data.

Figure 24:
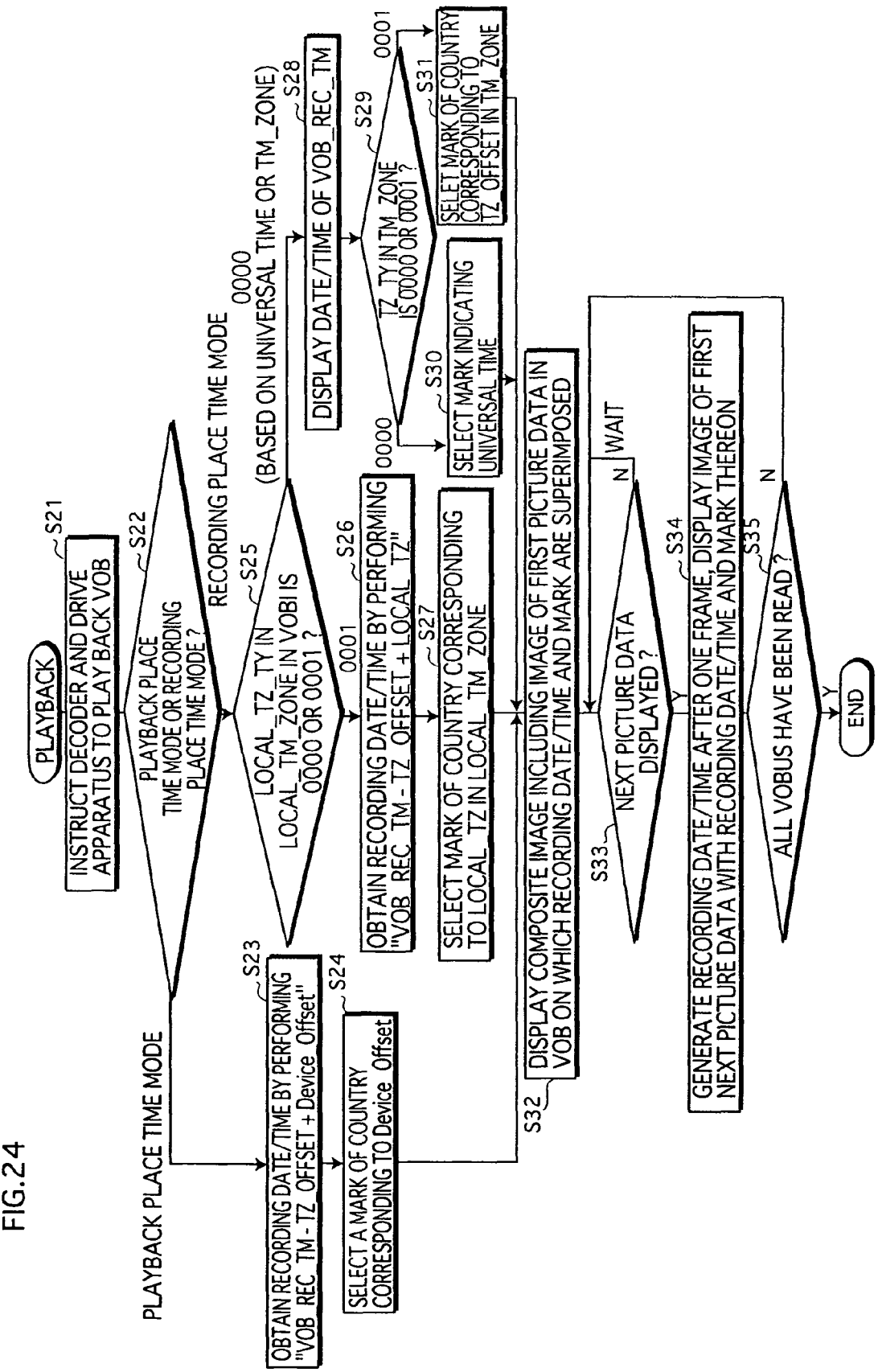
FIG. 24 is a flowchart showing the operation procedure of the date/time display control unit 20.

The date/time display control unit 20 calculates a recording date/time to be superimposed on a playback image corresponding to picture data, and selects a mark to be displayed together with the recording date/time. Now, the procedure of the operation performed by the date/time display control unit 20 will be described with reference to the flowchart shown in FIG. 24. The flowchart focuses on how the recording date/time to be superimposed on the playback image is calculated, and how the mark to be displayed together with the recording date/time is selected. This process includes three patterns: steps S23-S24, steps S26-S27, and steps S28-S31. In the procedure, one of the setting patterns is selected in accordance with the results of judgments performed in steps S22-S25.

The drive apparatus 7 and the MPEG decoder 13 are instructed to play back a VOB (step S21). It is judged whether the display mode stored in the display mode storage unit 16 is the recording place time mode or the playback place time mode. When it is judged that the playback place time mode is stored, the control goes to step S23 in which the recording date/time is obtained by performing a calculation "VOB_REC_TM−TZ_OFFSET+Device_Offset". A mark indicating the country corresponding to the Device_Offset is then selected from the country mark storage unit 17 (step S24). When it is judged that the recording place time mode is stored, the control goes to step S25 in which it is judged whether LOCAL_TZ_TY in LOCAL_TM_ZONE is "0000" or "0001". When LOCAL_TZ_TY is "0000", the control goes to step S28. The fact that LOCAL_TZ_TY is "0000" indicates that VOB_REC_TM is based on the universal time or the standard time specified by TZ_OFFSET in TM_ZONE. In step S28, the date/time shown in VOB_REC_TM is displayed as it is. It is then judged whether TZ_TY in TM_ZONE is "0000" or "0001" (step S29). When TZ_TY is "0000", the mark indicating the universal time is selected (step S30). When TZ_TY is "0001", a mark corresponding to the country specified by TZ_OFFSET in TM_ZONE is selected (step S31).

When it is judged in step S25 that LOCAL_TZ_TY is "0001", the control goes to step S26. The fact that LOCAL_TZ_TY is "0001" indicates that LOCAL_TZ in LOCAL_TM_ZONE is set to an effective value. In step S26, the recording date/time is obtained by performing a calculation "VOB_REC_TM−TZ_OFFSET+LOCAL_TZ". A mark indicating the country corresponding to TZ_OFFSET in TM_ZONE is then selected from the country mark storage unit 17 (step S27).

Figure 25:
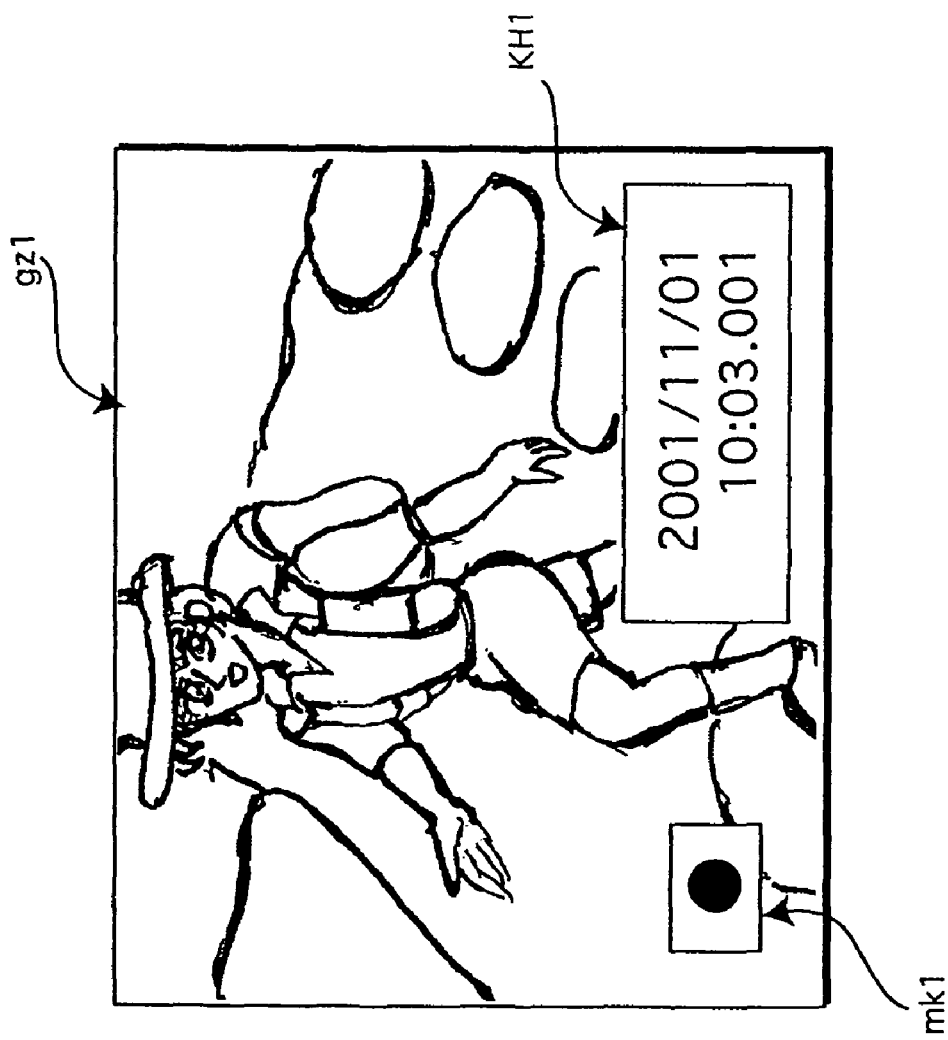
FIG. 25 shows an example of the screen displayed by the date/time display control unit 20.

After a recording date/time and a mark are determined in one of the above three patterns, the control goes to step S32 in which the signal combining unit 19 is instructed to obtain a composite video signal by superimposing the obtained mark and recording date/time onto the image of the first piece of picture data in the VOB, and output the composite video signal. It is judged in step S33 whether the next piece of picture data has been displayed. When it is judged that the next piece of picture data has been displayed, the control goes to step S34 in which the playback elapse time is obtained from the playback time monitoring unit 18, and a recording date/time after one frame is generated by adding the playback elapse time to VOB_REC_TM, and the signal combining unit 19 is instructed to obtain and output a composite video signal by superimposing the mark and recording date/time onto the image of the displayed image. FIG. 25 shows an example of the screen displayed by the above procedure, the screen containing an image on which a recording date/time and a mark obtained by the date/time display control unit 20. Back to the above procedure, in step S35, it is judged whether all VOBUs have been read. The steps S33 to S35 are repeatedly performed while the drive apparatus 7 continues to read VOBUs. After the VOBU reading completes, it is judged in step S35 that all VOBUs have been read, and the process of the present flowchart ends. As shown in FIG. 25, a recording date/time KH1 and a mark mk1 obtained in one of the three patterns (steps 23-S24, steps 25-S27, and steps 28-S31) by the date/time display control unit 20 are superimposed on a playback image gz1 of picture data in the VOB.

As described above, the present embodiment enables a conventional playback apparatus to display a recording date/time based on LOCAL_TM_ZONE. This increases the chances of using the DVD disclosed in Embodiment 1.

Embodiment 4

Embodiment 4 relates to a playback apparatus that displays a list of recorded contents when three VOBs are recorded onto one DVD in three different time zones.

Figure 26:
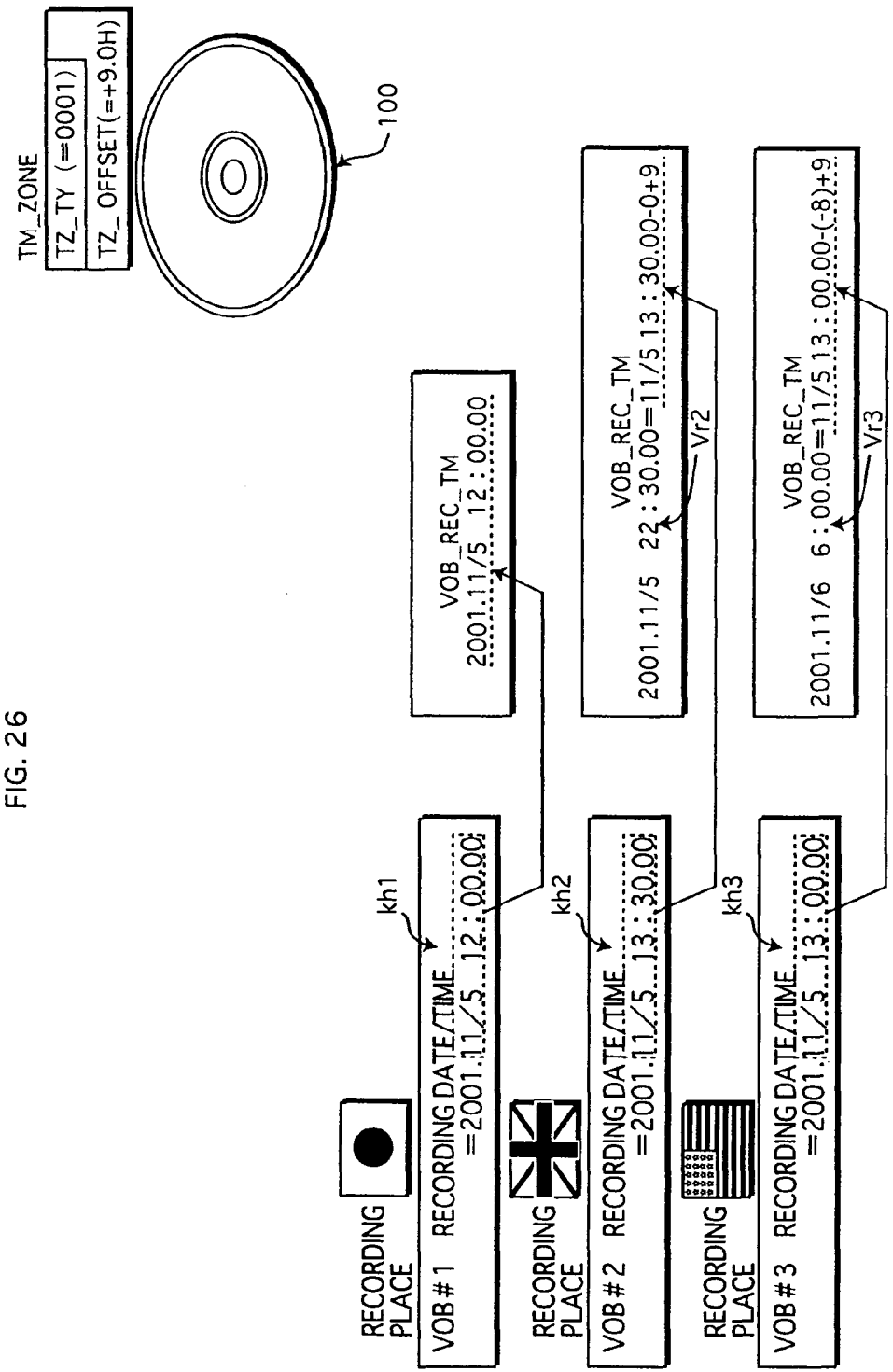
FIG. 26 shows three VOBs recorded in three different time zones: Japan, UK, and U.S.A.

The following describes how VOB_REC_TM and LOCAL_TM_ZONE are set when three VOBs are recorded onto one DVD in three different time zones such as Japan, UK, and U.S.A. FIG. 26 shows three VOBs recorded in three different time zones: Japan, UK, and U.S.A. FIG. 26 indicates that VOB #1 was recorded in Japan at 12:00.00 on November 5 (indicated by the arrow kh1) by Japanese standard time; VOB #2 was recorded in the UK at 13:30.00 on November 5 (indicated by the arrow kh2) by the universal time; and VOB #3 was recorded in U.S.A. at 13:00.00 on November 5 (indicated by the arrow kh3) by the U.S.A. standard time. Judged from only these recording date/times, it appears that VOB #3 was recorded earlier than VOB #2 and that they are sorted into "VOB #1-VOB #3-VOB #2" in the time order. It is supposed here that the three VOBs are recorded onto a DVD 100 which is based on the Japanese standard time. In this case, in TM_ZONE of the DVD 100, TZ_TY is set to "0001", and TZ_OFFSET is set to "+9.0 H" that is a time differential indicating the Japanese standard time. For VOB #1, VOB_REC_TM in the DVD 100 is set to the recording date/time kh1 since it is represented by the Japanese standard time. In the case of VOB #3 recorded in U.S.A., a date/time to which VOB_REC_TM should be set is obtained by a calculation "(11/5 13:00.00) kh3-(-8.0 H)+9.0 H", which equals to "11/6 6:00.00" vr3. Similarly, in the case of VOB #2 recorded in the UK, a date/time to which VOB_REC_TM should be set is obtained by a calculation "(11/5 13:30.00) kh2-(0.0 H)+9.0 H", which equals to "11/5 22:30.00" vr2.

Figure 27:
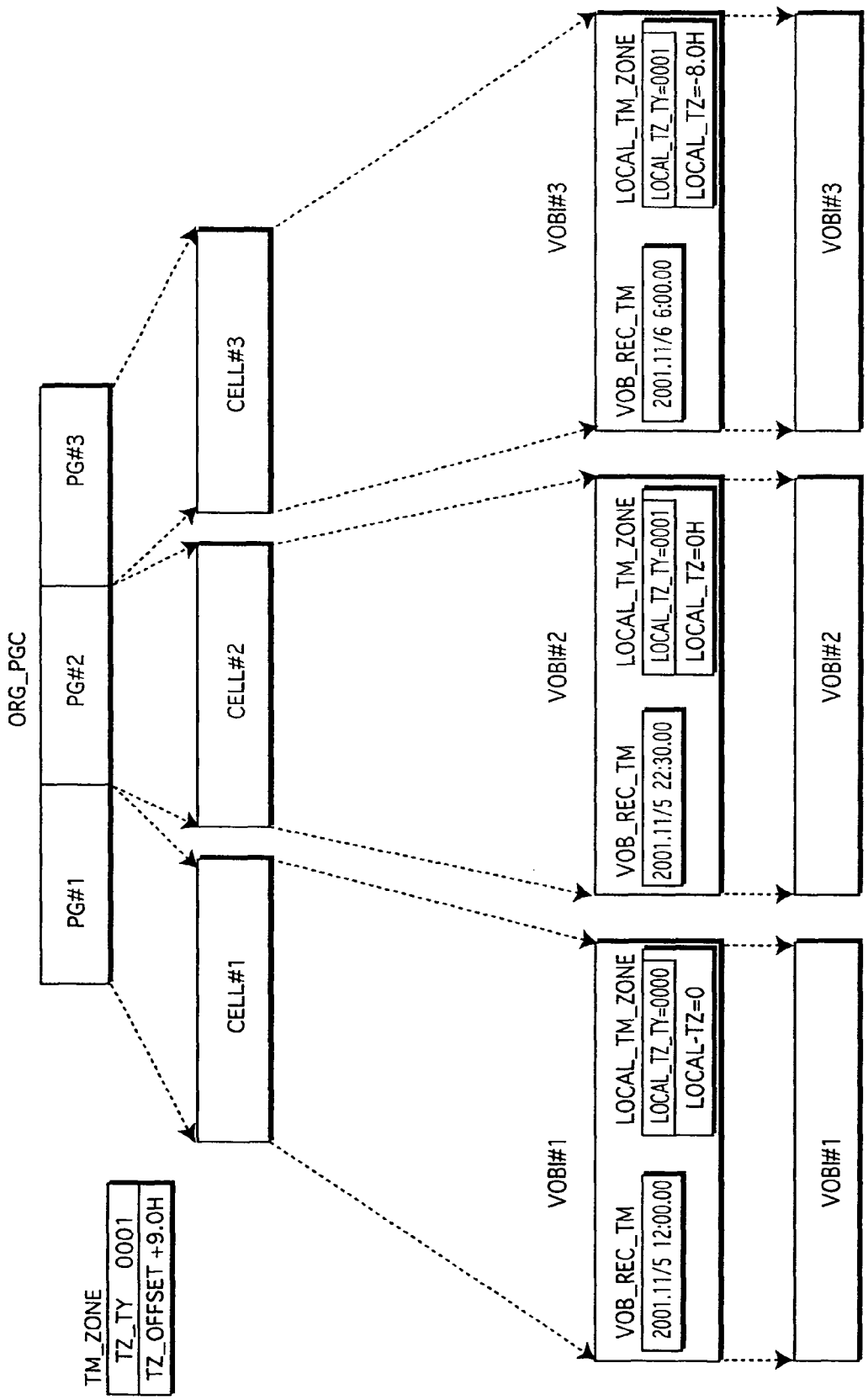
FIG. 27 shows VOBI that contains the VOB_REC_TMs obtained from FIG. 26.

FIG. 27 shows VOBI that contains the VOB_REC_TMs obtained from FIG. 26. The VOBI is divided into three playback units composed of vertical sequences: "VOB #1-VOBI #1-CELL #1-PG #1"; "VOB #2-VOBI #2-CELL #2-PG #2"; and "VOB #3-VOBI #3-CELL #3-PG #3". The playback units are arranged, from left to right, in the order of actual recording date/time. In LOCAL_TM_ZONE of VOB #3 recorded in U.S.A., LOCAL_TZ is set to "-8.0 H" and LOCAL_TZ_TY is set to "0001". In LOCAL_TM_ZONE of VOB #2 recorded in the UK, LOCAL_TZ is set to "0.0 H" and LOCAL_TZ_TY is set to "0001". This is because these time zones are different from the time zone (Japan) identified from TM_ZONE of the DVD 100. The ORG_PGCI is composed of PG #1-PG #3 in the order shown in FIG. 27, where PG #1-PG #3 correspond to VOB #1-VOB #3, respectively. As a result, when the DVD is played back, the three VOBs recorded in the three countries are played back in the order of the time written in VOB_REC_TM. Up to now, setting of VOB_REC_TM has been described. From now on, the playback apparatus that performs a "volume display" of the DVD 100 will be described.

Figure 28:
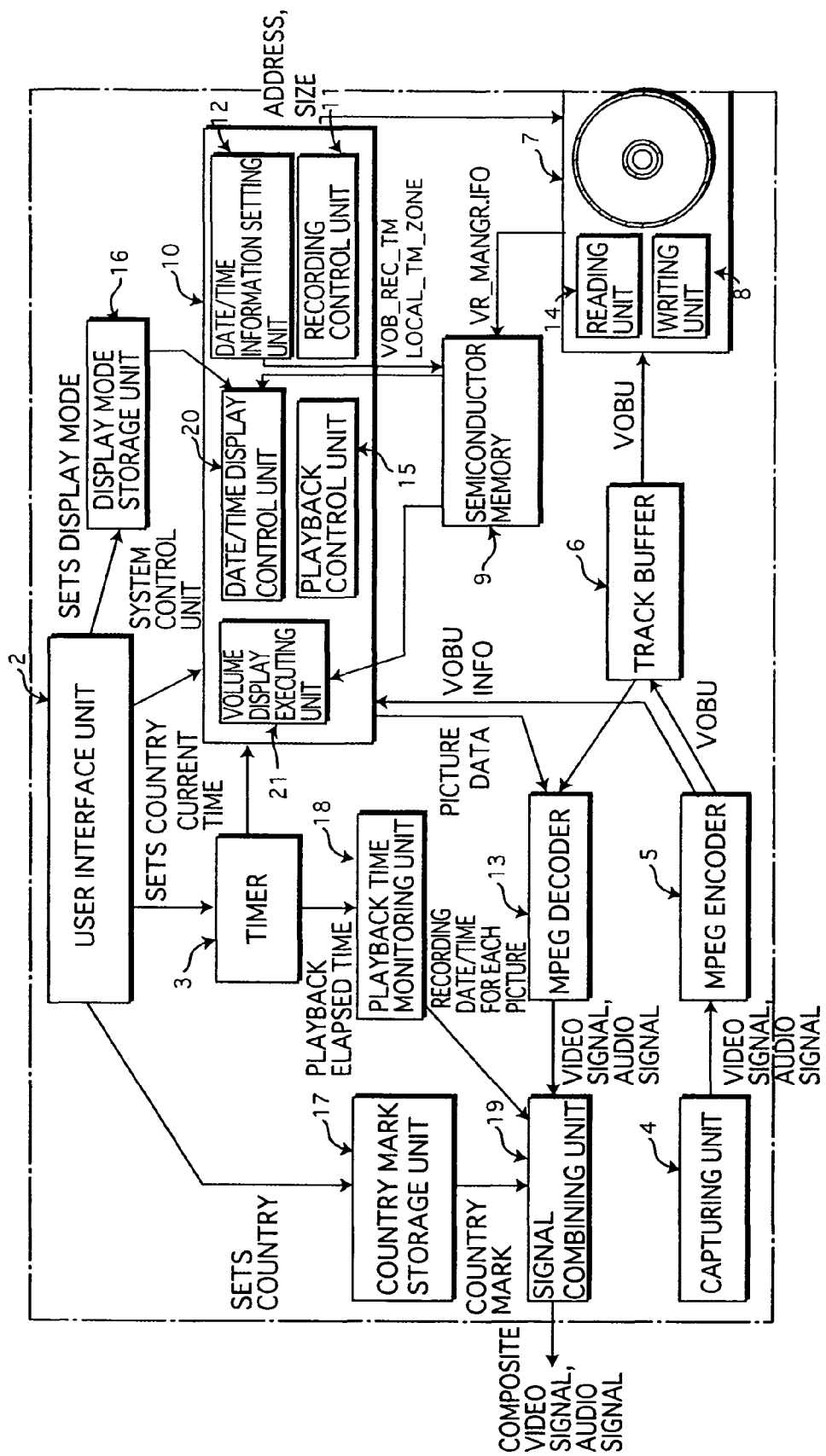
FIG. 28 shows the internal structure of the playback apparatus in Embodiment 4.

FIG. 28 shows the internal structure of the playback apparatus in Embodiment 4. The playback apparatus additionally contains a volume display executing unit 21, in comparison with the playback apparatus of Embodiment 3.

Figure 29:
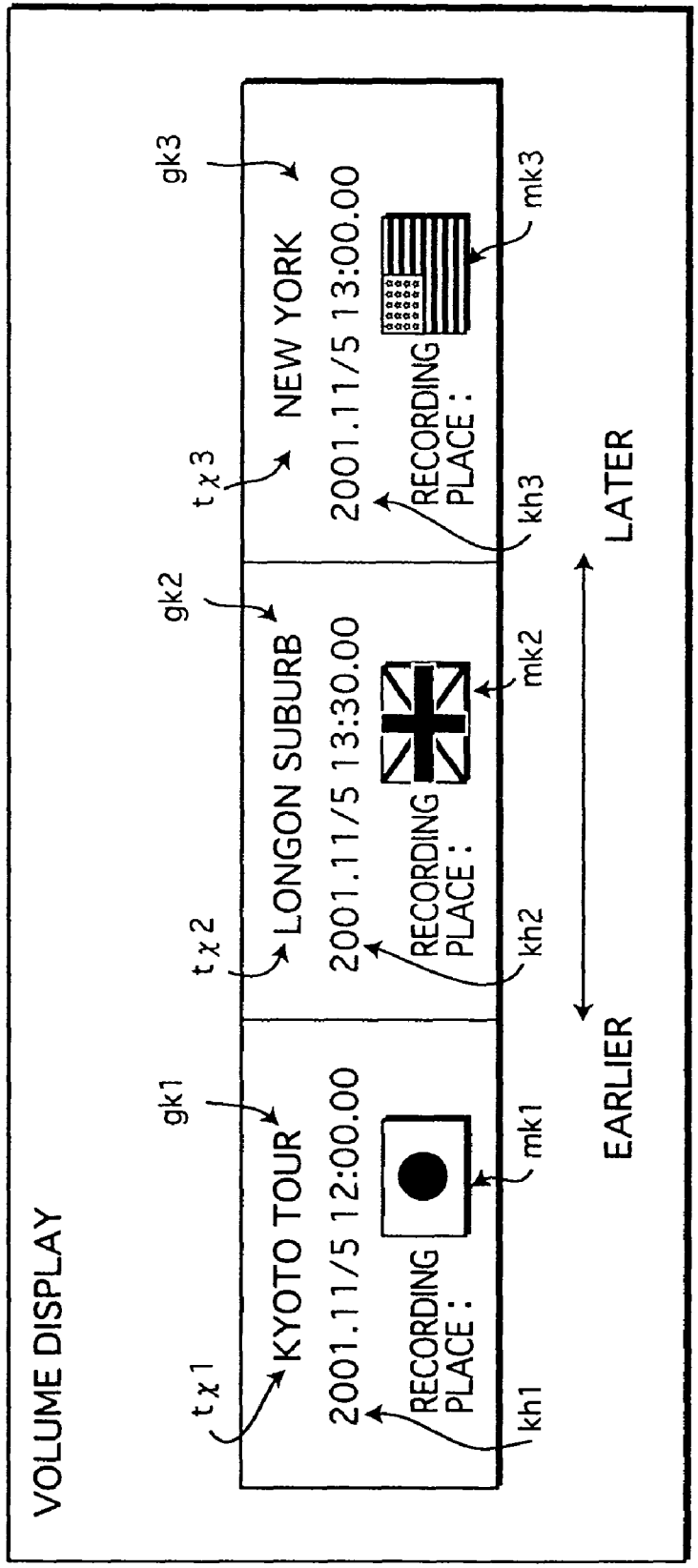
FIG. 29 shows an example of the volume display generated by the volume display executing unit 21.

The volume display executing unit 21 executes a "volume display" when the DVD is inserted into the playback apparatus. Note that in the present embodiment, the "volume display" refers to a sequential display of VOB-VOBI-CELL-PG that constitute ORG_PGCI. FIG. 29 shows an example of the volume display generated by the volume display executing unit 21. In FIG. 29, the graphic images gk1, gk2, and gk3 are OSD (On Screen Display) graphic images that represent sets of VOB-VOBI-CELL-PG, respectively. The graphic images contain text data tx1, tx2, and tx3 specified by IT_TXT_SRP in PGI, capturing times kh1, kh2, and kh3, and marks mk1, mk2, and mk3 indicating the capturing places (countries), respectively.

The capturing time of VOB #1, for which LOCAL_TZ_TY is set to "0000", is the same as the time set to VOB_REC_TM. In contrast, the capturing times of VOBs #2 and #3, for which LOCAL_TZ_TY is set to "0001", are the results of a calculation "VOB_REC_TM-TZ_OFFSET+LOCAL_TZ".

More specifically, the capturing time of VOB #2 (11/5 13:30) is the result of a calculation "11/5 22:30 (VOB_REC_TM)+0.0 H (LOCAL_TZ)-9.0 H (TZ_OFFSET) performed by the volume display executing unit 21. Also, the capturing time of VOB #3 (11/5 13:00) is the result of a calculation "11/6 6:00 (VOB_REC_TM)+(-8.0 H=LOCAL_TZ)-9.0 H (TZ_OFFSET) performed by the volume display executing unit 21. It should be noted here that these calculation results are off course the same as "11/5 13:30.00" kh2 and "11/5 13:00.00" kh3 shown in FIG. 26.

The volume display executing unit 21 then selects marks. For a VOB in which TZ_TY is set to "0001" and LOCAL_TZ_TY is set to "0000", the volume display executing unit 21 selects and displays a mark based on TZ_OFFSET. For a VOB in which TZ_TY is set to "0001" and LOCAL_TZ_TY is set to "0001" (in the present example, VOBs #2 and #3), the volume display executing unit 21 selects and displays a mark corresponding to a country with a standard time which is different from the universal time by the value in LOCAL_TZ.

As shown in FIG. 29, the graphic image gk1 has a mark indicating Japan since TZ_OFFSET in the DVD 100 indicates the Japanese standard time, and the graphic images gk2 and gk3 have marks respectively indicating UK and U.S.A. since LOCAL_TZ of VOBs #2 and #3 indicate the universal time and the U.S.A. standard time, respectively.

As described above, the present embodiment displays a list of VOBs recorded on a DVD that have been sorted in the order of the time written in VOB_REC_TM. This facilitates the user's arrangement of the contents of the DVD.

Embodiment 5

Embodiment 4 disclosed displaying of a VOB list in accordance with ORG_PGCI. Embodiment 5 relates to displaying of a list of VOBs contained in PlayLists. First, UD_PGCIT will be described in detail with reference to FIG. 30.

Figure 30:
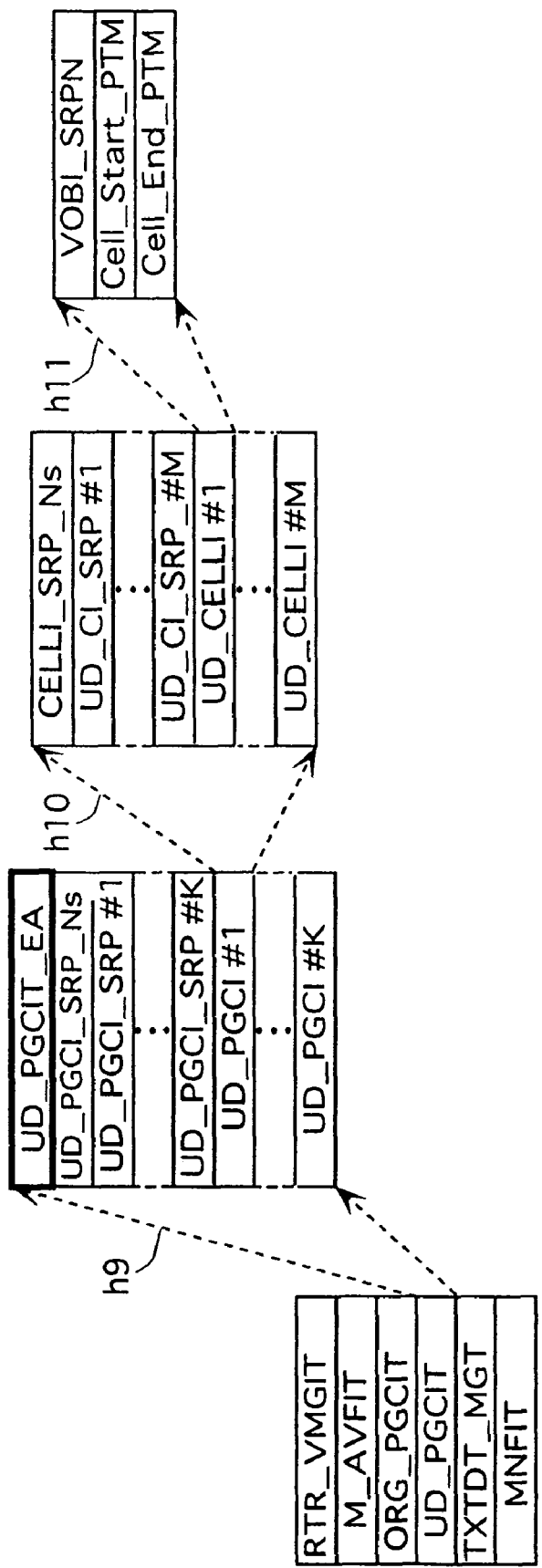
FIG. 30 shows the internal structure of UD_PGCIT.

As indicated by a dotted leader line h9 in FIG. 30, the UD_PGCIT (User-Defined Program Chain Table) includes: UD_PGCIT_EA indicating the effective length of the UD_PGCIT; UD_PGCI_SRP_Ns indicating the number of UD_PGCI_SRPs; UD_PGCI_SRP #1 . . . #K being search pointers pointing to UD_PGCIs on a one-to-one basis; and UD_PGCI #1 . . . #K being user-defined PGC information. The UD_PGCI specifies a user-defined playback order referred to as PlayList (PL). As indicated by a dotted leader line h10 in FIG. 30, each UD_PGCI includes: CELLI_SRP_Ns indicating the number of UD_CI_SRPs; UD_CI_SRP #1 . . . #M being search pointers pointing to UD_CELLIs (UD_CIs) on a one-to-one basis; and UD_CELLI (User-Defined Cell Information) #1 . . . #M defining playback section cells constituting a PL. The CELLI in UD_PGCI has the same construction as CELLI in ORG_PGI. As indicated by a dotted leader line h11 in FIG. 30, each UD_CELLI includes: VOBI_SRPN being a search pointer pointing to a VOBI in the VOB corresponding to the CELL; CELL_Start_PTM being a time code indicating the start point of the CELL; and CELL_End_PTM being a time code indicating the end point of the CELL.

Figure 31:
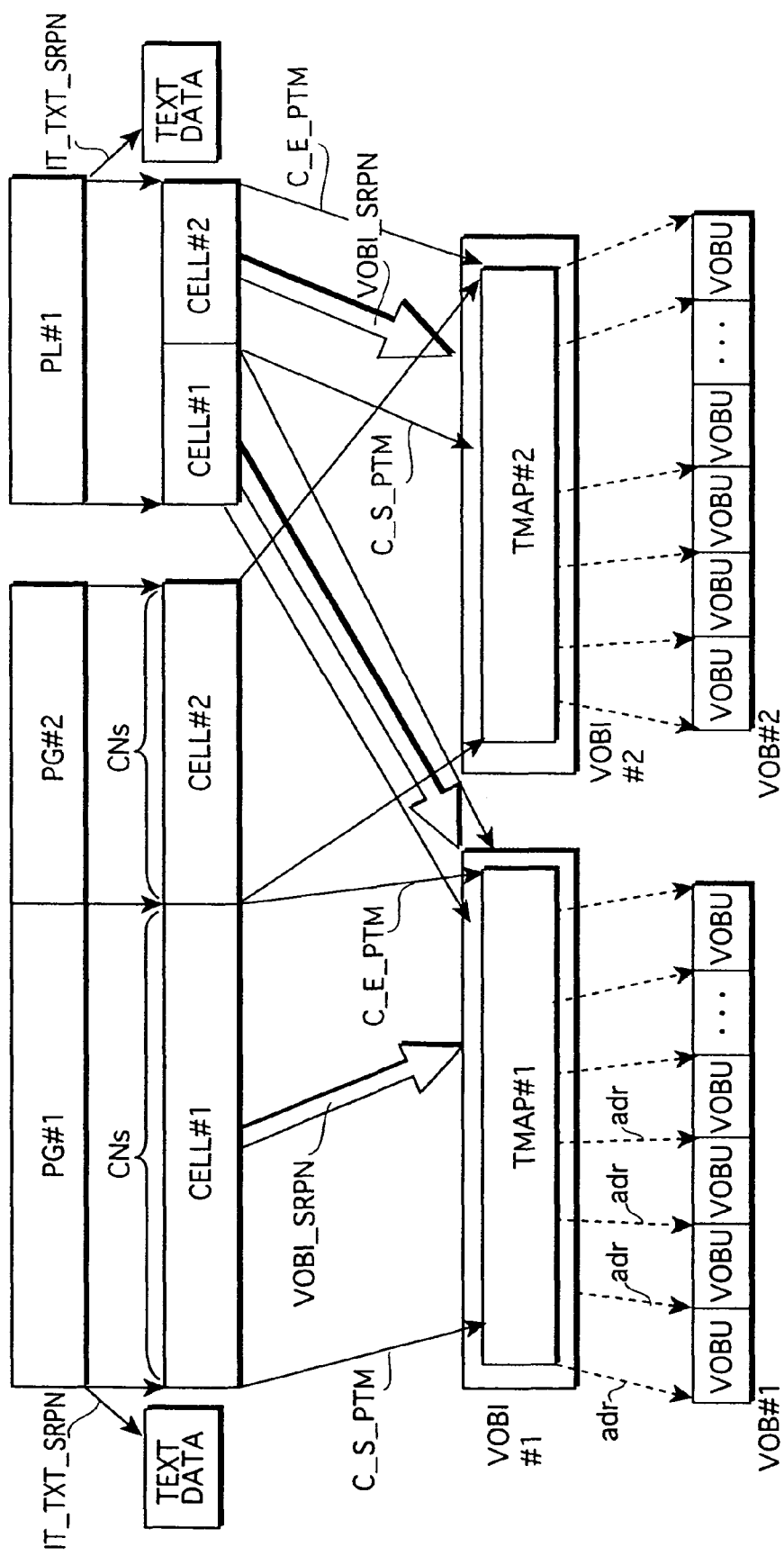
FIG. 31 shows a PL defined in correspondence with the VOBs and TMAPIs shown in FIG. 30.

FIG. 31 shows a PL defined in correspondence with the VOBs and TMAPIs shown in FIG. 30. As shown in FIG. 31, VOBI_SRPN for CELL #1 contained in PL #1 points to TMAP #1 contained in VOBI #1. Also, a pair of CELL_Start_PTM (C_S_PTM in FIG. 31) and CELL_End_PTM (C_E_PTM in FIG. 31) indicates a portion of VOB #1 corresponding to CELL #1 contained in PL #1. The IT_TXT_SRPN contained in a PL indicates text data corresponding to the PL.

The RTR_VMGI in Embodiment 5 contains PL_SRPT (PlayList Search Pointer Table) which is used to jump to a PlayList, where it is presumed that n PlayLists are recorded on one DVD.

Figure 32:
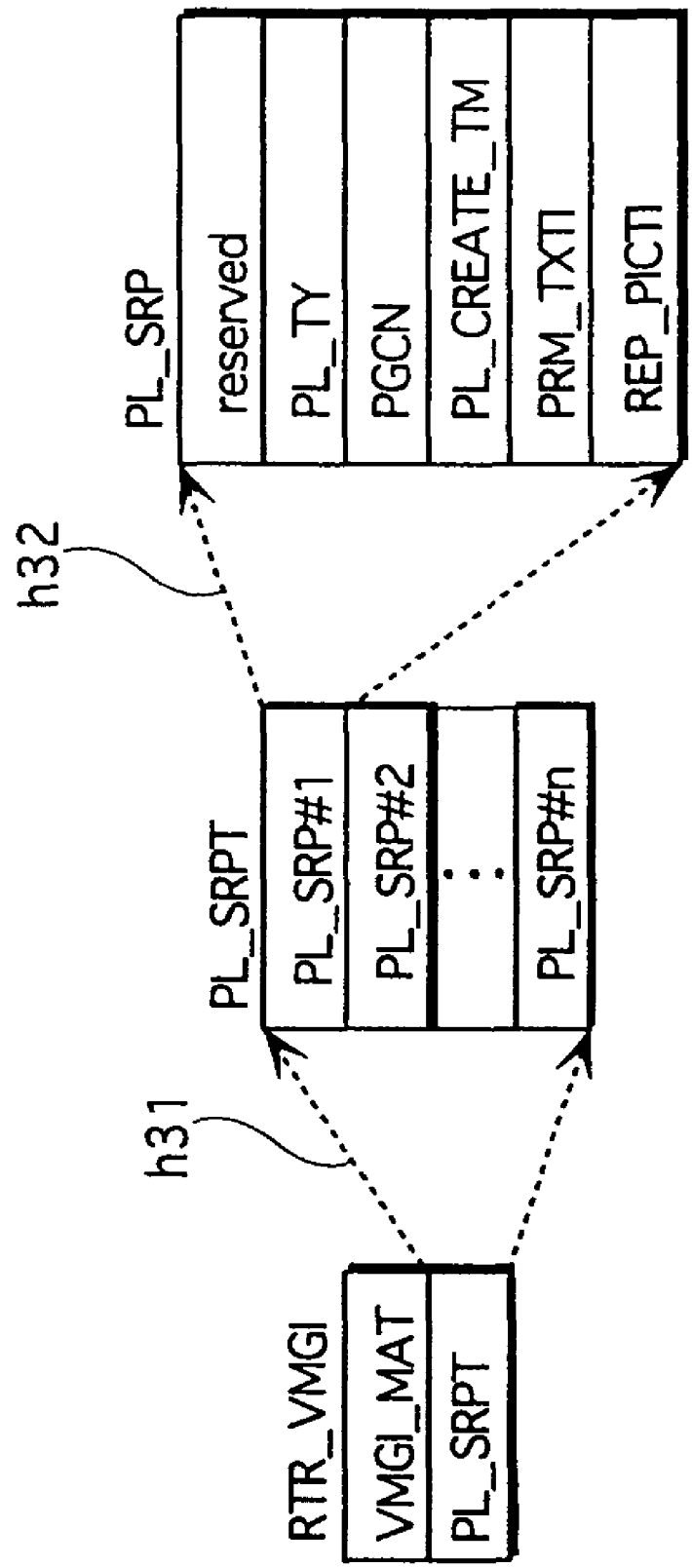
FIG. 32 shows the internal structure of RTR_VMGI in Embodiment 5.

FIG. 32 shows the internal structure of RTR_VMGI in Embodiment 5. As indicated by the dotted arrow h31, the PL_SRPT includes n PL_SRPs. As indicated by the dotted arrow h32, each PL_SRP includes: a reserved area; PL_TY (PlayList Type) indicating the type of the PlayList which is divided into three types based on whether the PlayList is composed of (1) only moving pictures, (2) only still pictures, or (3) moving pictures and still pictures; PGCN (PGC Number) being a PGC number corresponding to the PlayList; PL_CREATE_TM indicating the year, month, day, hour, minute, and second when the PlayList was defined; PRM_TXTI in which text information indicating the contents of the PlayList; and REP_PICTI in which information on an image that is representative of the PlayList is written.

A plurality of PlayLists can be recorded on one DVD, while it is defined that only one ORG_PGCI can be recorded on one DVD. When a plurality of PlayLists are recorded on a DVD, there will be a demand for a convenient way to see the contents of the PlayLists at a glance.

Figure 33:
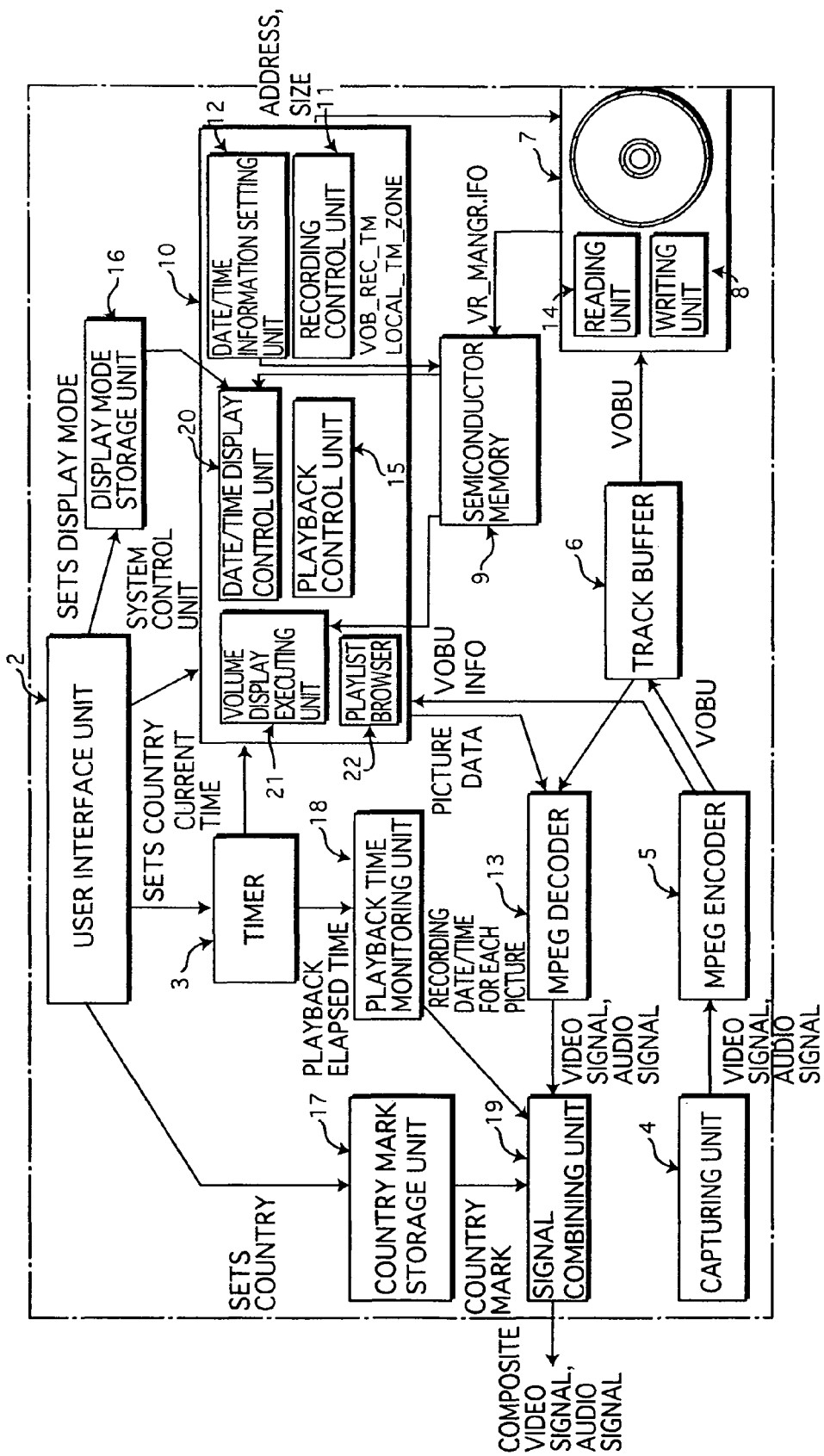
FIG. 33 shows the internal structure of the playback apparatus in Embodiment 5.

Now, the playback apparatus in the present embodiment will be described. FIG. 33 shows the internal structure of the playback apparatus in the present embodiment. The playback apparatus in the present embodiment is the same as that in Embodiment 4 except that it additionally has a PlayList browser 22.

Figure 34:
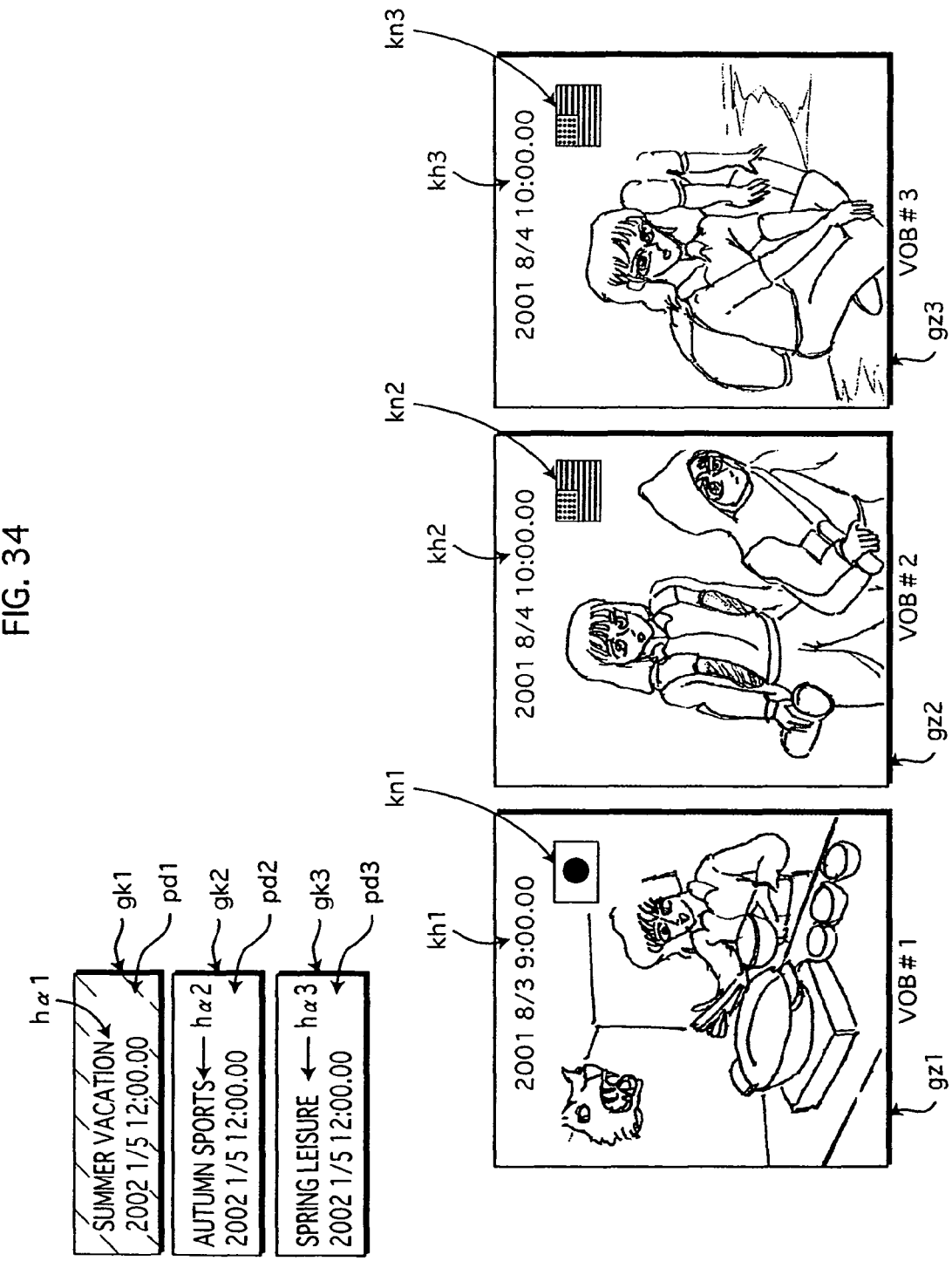
FIG. 34 shows a menu screen displaying a list of the plurality of PlayLists recorded on the DVD.

The PlayList browser 22, immediately after a DVD is inserted into the playback apparatus, displays a list of PlayLists recorded on the DVD. FIG. 34 shows a menu screen displaying a list of the plurality of PlayLists recorded on the DVD. In FIG. 34, the graphic images gk1, gk2, and gk3 are OSD graphic images that represent the PlayLists recorded on the DVD. The graphic images contain titles hα1, hα2, and hα3 and editing date/times pd1, pd2, and pd3, respectively. The editing date/times pd1, pd2, and pd3 are generated from PL_CREATE_TM in PL_SRP. The titles hα1, hα2, and hα3 text data written in PRM_TXTI in PL_SRP. The PlayList browser 22 brings one of the graphic images into focus in accordance with an input via a remote control. At the same time, the PlayList browser 22 displays images corresponding to the PlayList in focus. The images gz1, gz2, and gz3 are generated from the picture data in the VOBs specified by the PlayList in focus. As shown in FIG. 34, recording date/times kh1, kh2, and kh3 and marks kn1, kn2, and kn3 are superimposed on the images gz1, gz2, and gz3, respectively. The recording date/times kh1, kh2, and kh3 are generated from VOB_REC_TM for the VOBs. The marks kn1, kn2, and kn3 indicate the countries in which the VOBs were recorded. They give the viewers an at-a-glance picture of when and where the VOBs contained in the PlayList were recorded.

As described above, when a plurality of PlayLists are recorded on a DVD, the present embodiment gives the viewers an at-a-glance picture of when and where the VOBs contained in the PlayLists were recorded. This facilitates reviewing of editing results.

Note that LOCAL_TM_ZONE unique to PL_CREATE_TM may be provided in the reserved area in PL_SRP. The PL_CREATE_TM is date/time information indicating the date/time when the PlayList was defined, and is based on the time zone specified by TZ_OFFSET in TM_ZONE. However, a PlayList edited in a time zone different from that specified by TZ_OFFSET may be recorded on the DVD. To deal with this, LOCAL_TM_ZONE is set for each PL_SRP.

Embodiment 6

Figure 35A:
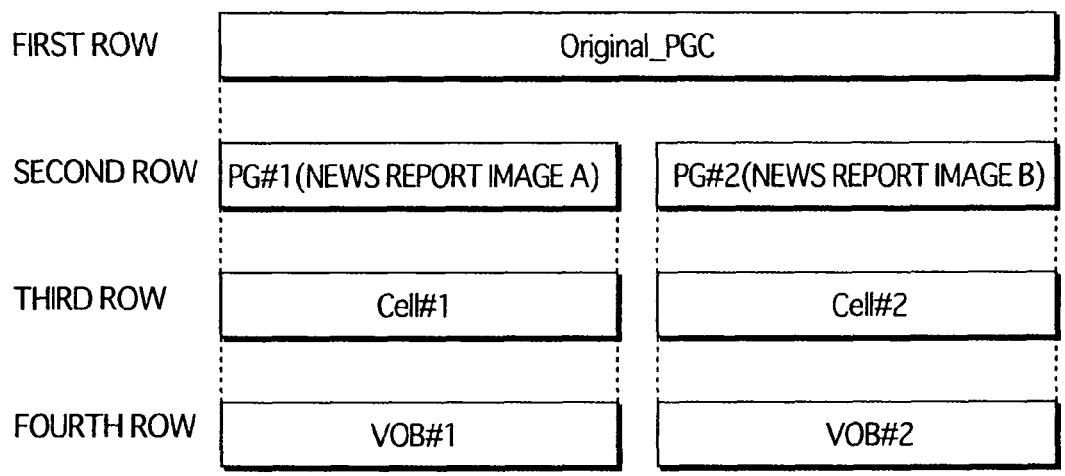
FIGS. 35A and 35B show how VOB portions are specified when VOBs are partially deleted.
Figure 35B:
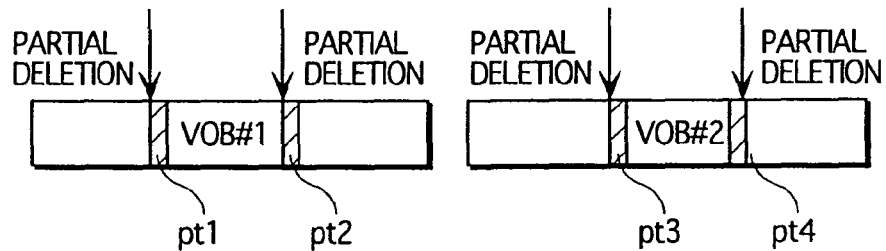

Embodiment 6 relates to how VOB_REC_TM and LOCAL_TM_ZONE should be set for a VOB when the VOB is edited. FIGS. 35A and 35B show how VOB portions are specified when VOBs are partially deleted. FIG. 35A shows that two news report images A and B captured in two counties with different time zones are recorded on a DVD as VOBs #1 and #2, as indicated in the fourth row in the figure. The VOBs #1 and #2 are managed as cells as indicated in the third row, recorded as PGs as indicated in the second row, and the two PGs are combined to form an ORG_PGC indicated in the first row.

Figure 36:
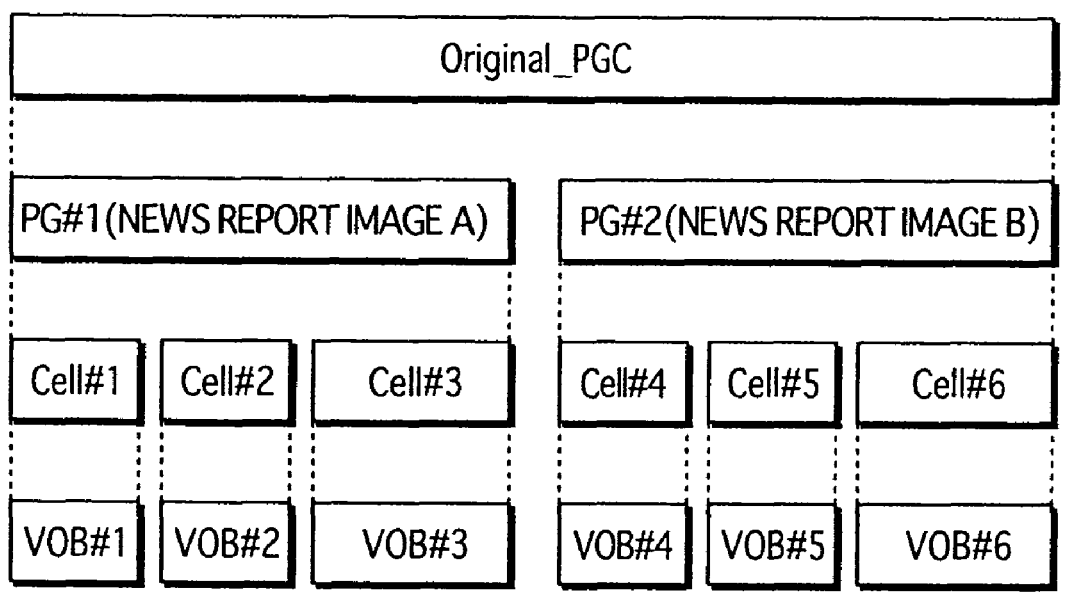
FIG. 36 shows VOBs before and after the partial deletions.

It is supposed here that after the VOBs, cells, and PGs of the news report images A and B are recorded onto the DVD, the portions pt1, pt2, pt3, and pt4 of VOBs #1 and #2 are specified as portions to be deleted, as indicated by FIG. 35B. After this deletion is completed, the old VOB #1 is divided into three new VOBs #1 to #3, and the old VOB #2 is divided into three new VOBs #4 to #6, as shown in FIG. 36. This VOB division leads to a cell division. That is to say, the old cell #1 is divided into three new cells #1 to #3, and the old cell #2 is divided into three new cells #4 to #6. However, the relation between the cells and the PGs does not change. For example, the news report image A that was managed as PG #1 containing one cell (the old cell #1) and one VOB (the old VOB #1) before the division is managed as PG #1 containing three cells (the new cells #1-#3) and three VOBs (the new VOBs #1-#3) after the division.

According to the above-described Embodiment 6, even if a VOB is deleted partially by editing, the management of images is facilitated since PG is used as a unit for managing recorded images.

Figure 37A:
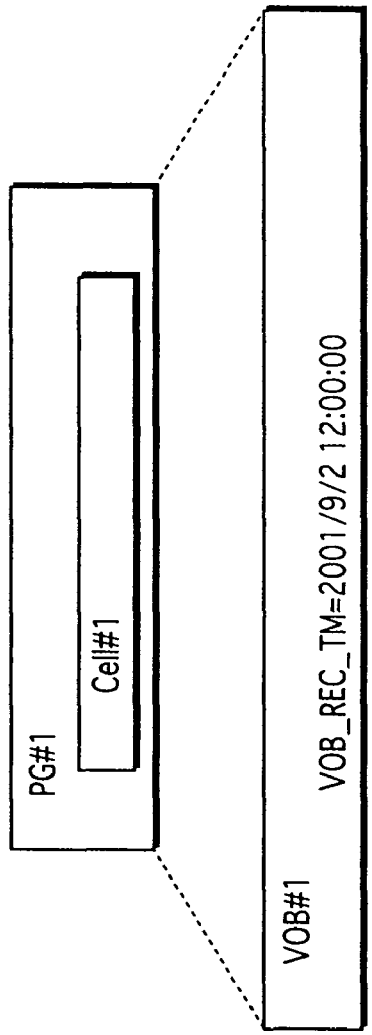
FIGS. 37A and 37B show how VOB_REC_TM and LOCAL_TM_ZONE are set for a new VOB that is created after a middle portion of the old VOB is deleted.
Figure 37B:
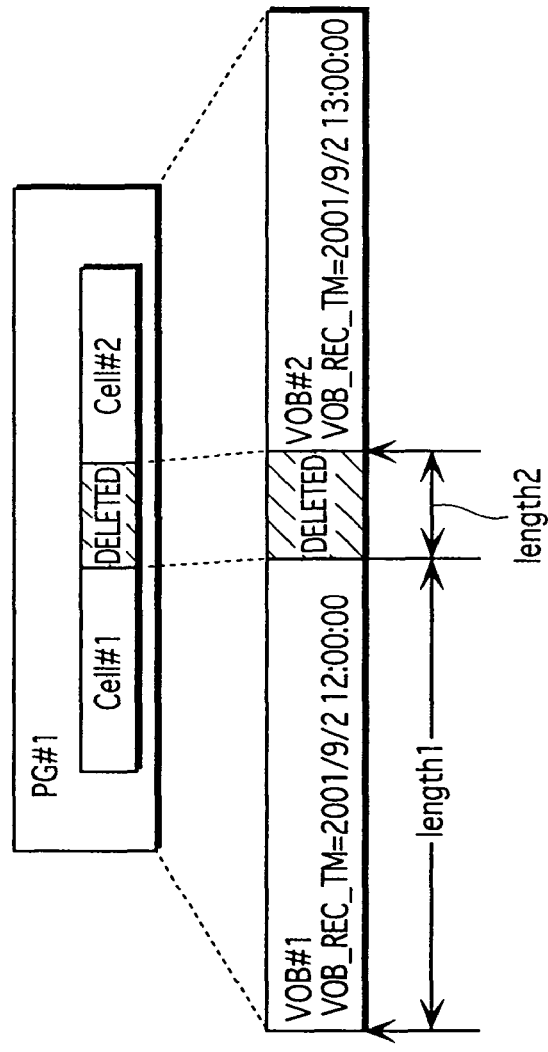

Now, how VOBI is set after a corresponding VOB is partially deleted. FIGS. 37A and 37B show how VOB_REC_TM and LOCAL_TM_ZONE are set for a new VOB that is created after a middle portion of the old VOB is deleted. In case the starting portion of a VOB is deleted, VOB_REC_TM is updated to a time obtained by performing a calculation "time period of the deleted portion+former VOB_REC_TM". The application of this rule to the present case results as follows. The VOB_REC_TM of the new VOB #2 is obtained by performing a calculation "VOB_REC_TM of new VOB #1+Length 1+Length 2", where Length 1 represents a time period between the start of the new VOB #1 and the start of the deleted middle portion, and Length 2 represents a time period of the deleted portion. For example, if the old or new VOB #1 was recorded at 12:00:00 on Sep. 2, 2001, and if "Length 1+Length 2" equals to 1:00:00 H, the VOB_REC_TM of VOB #2 is "2001/9/2 13:00:00". The date/time information in VOB_REC_TM conveys time in units of seconds at the minimum. As a result, if a portion is deleted in units of video frames or video fields that are more minute than video frames, the VOB_REC_TM cannot express the starting point of the new VOB #2 accurately. To deal with this problem, a fraction of the VOB_REC_TM is written in VOB_REC_TM_SUB in VOBI for the new VOB #2 in units of video frames or video fields.

When LOCAL_TZ_TY and LOCAL_TZ are set in the VOBI for the old VOB #1, the same LOCAL_TZ_TY and LOCAL_TZ are set in the VOBI for the new VOB #2.

As described above, even if a new VOB is obtained as a result of editing a VOB that was recorded in a time zone different from a time zone specified by TZ_OFFSET in TM_ZONE, the same LOCAL_TM_ZONE is set to the new VOB as the old VOB. Accordingly, the present embodiment achieves the same time management as Embodiment 1.

Embodiment 7

Figure 38:
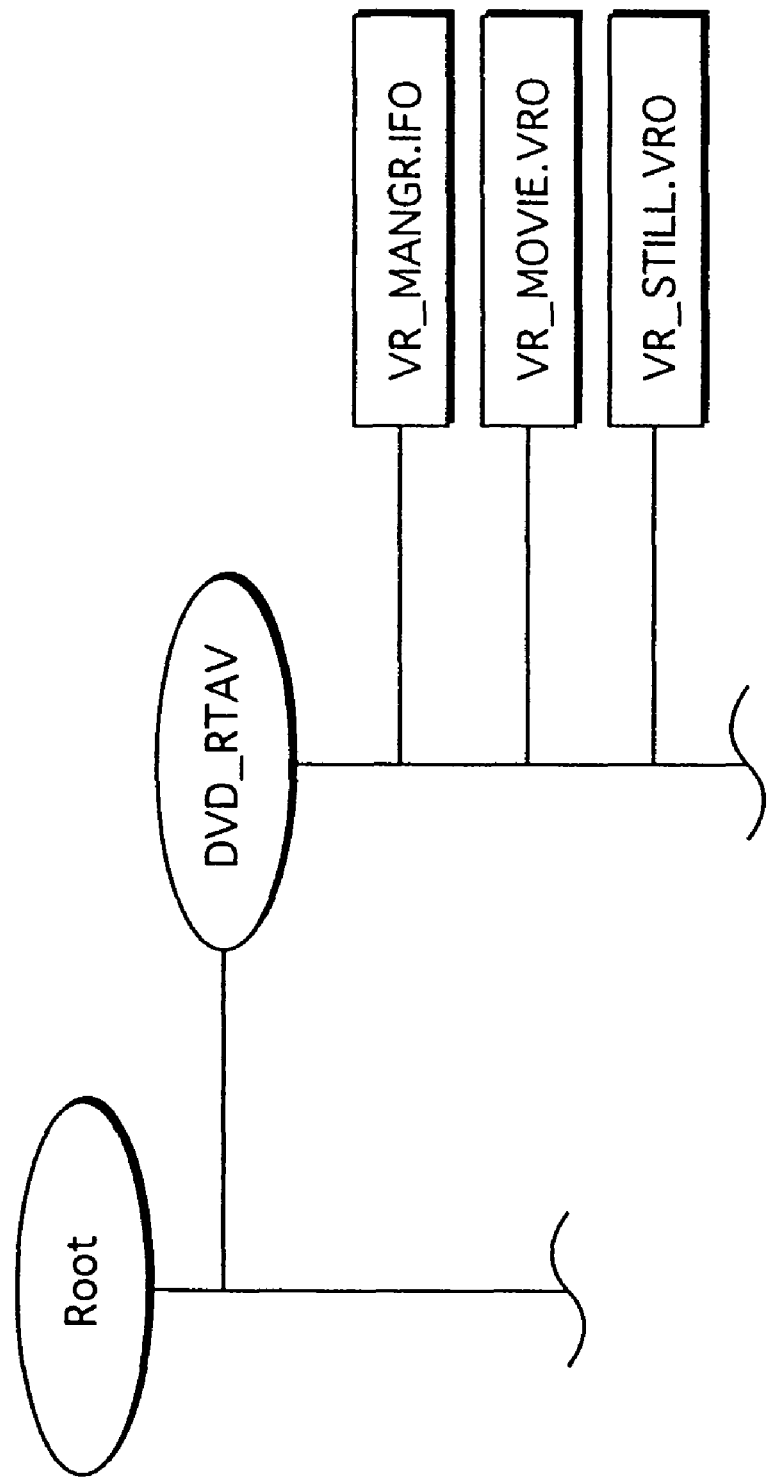
FIG. 38 shows the file system for DVDs on which VOBs containing still picture data (Still_VOBs) are recorded, as well as VOBs containing moving-picture data.
Figure 39:
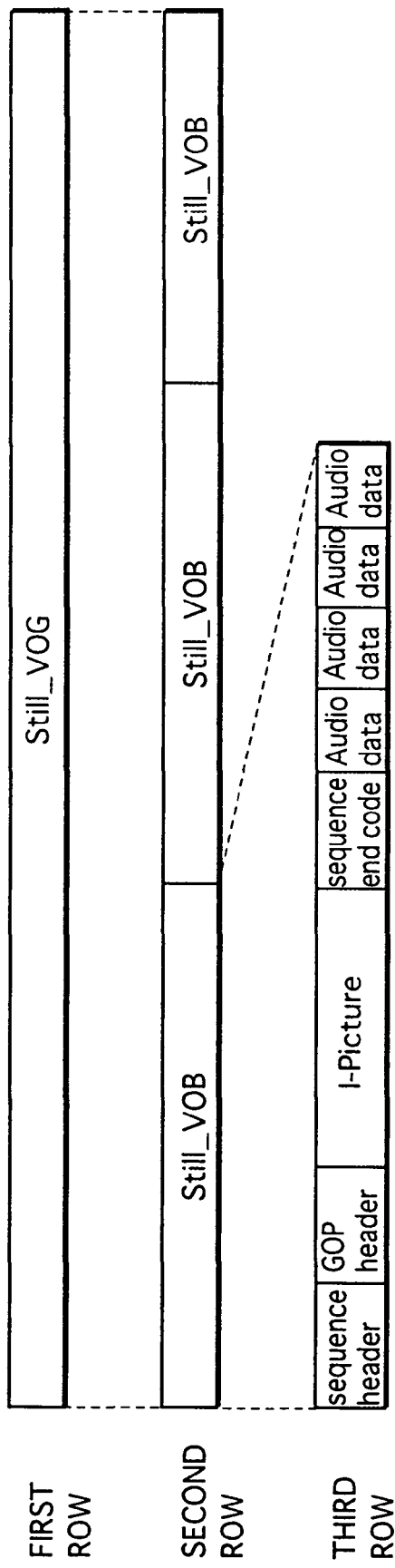
FIG. 39 shows hierarchical representation of Still_VOBs contained in a VR_STILL.VRO.

Embodiments 1-6 have dealt with VOBs recorded on a DVD that contain moving-picture data. Embodiment 7, relates to an improvement in the case where date/time information is added to VOBs containing still picture data. FIG. 38 shows the file system for DVDs on which VOBs containing still picture data (hereinafter referred to as Still_VOBs) are recorded, as well as VOBs containing moving-picture data. The difference between this file system and the file system shown in FIG. 1 is that it contains VR_STILL.VRO. The VR_STILL.VRO is a file that contains Still_VOBs. FIG. 39 shows hierarchical representation of Still_VOBs contained in a VR_STILL.VRO. One Still_VOB in FIG. 39 corresponds to one still picture. As shown in the third row of FIG. 39, each Still_VOB is composed of: a sequence header; a GOP header; an I-Picture (Intra Picture); a sequence end code; and a plurality of pieces of Audio data. The sequence end code is used to suspend the operation of the MPEG decoder. The operation of the MPEG decoder contained in a DVD player is suspended immediately after it decodes the sequence end code, and the most recently decoded picture is kept to be displayed. This provides a playback operation that makes the user feel as if the user is leafing through a book page by page. Note that the Audio data is dispensable for Still_VOBs. This is because Still_VOBs may not contain address data or that the address data of Still_VOBs may be stored as dubbing data in a different file.

The Still_VOG (Video Object Group) shown in the first row of FIG. 39 is composed of up to 64 Still_VOBs that have the same image attribute. The Still_VOG is information unit to which playback control information is assigned. The management file has a construction in which the playback control information is assigned in units of Still_VOGs.

Figure 40:
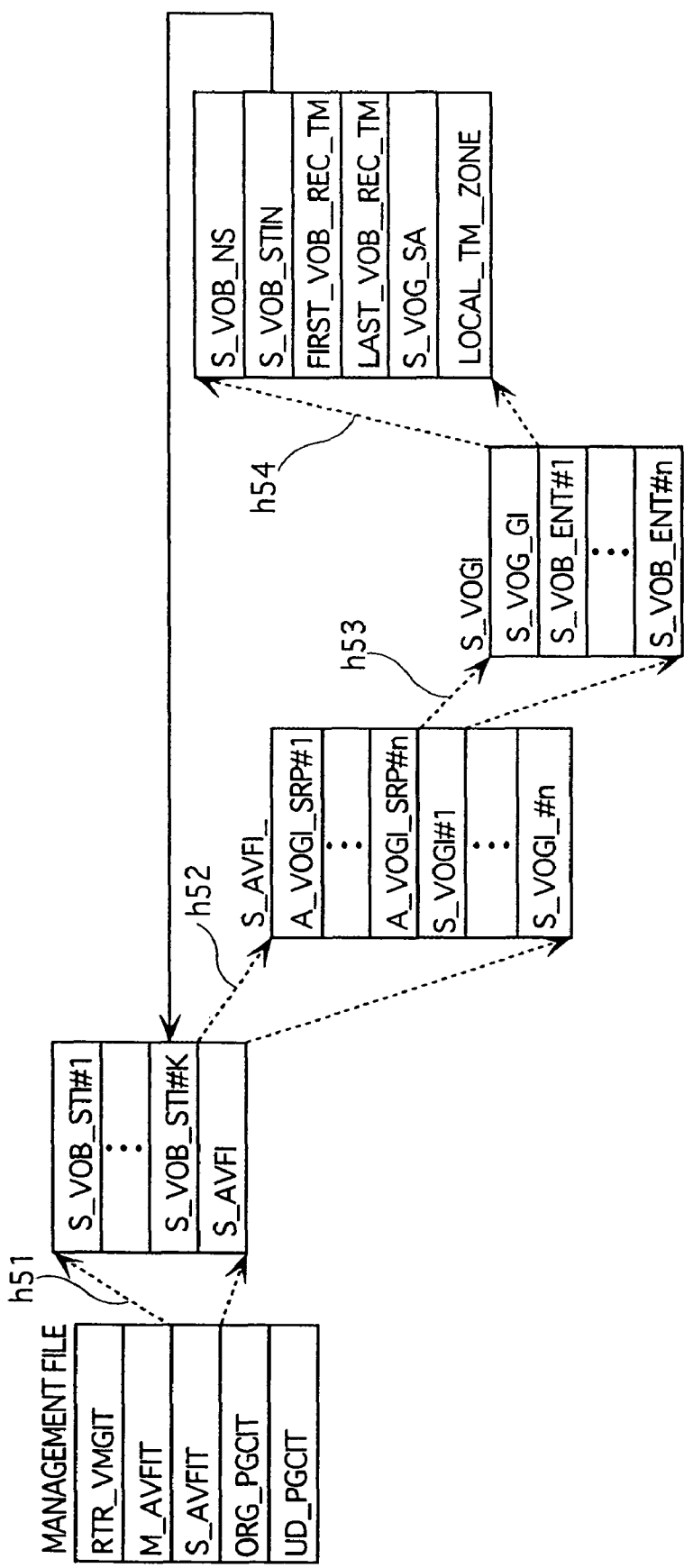
FIG. 40 shows the internal structure of the management file in Embodiment 7.

Now, the internal structure of the management file will be described. FIG. 40 shows the internal structure of the management file in Embodiment 7. The management file in Embodiment 7 is characterized by a newly added S_AVFI table.

The S_AVFI table, as indicated by the dotted arrow h51, includes: S_VOB_STI #1 . . . #k; and S_AVFI.

The S_VOB_STI #1 . . . #k are stream attribute information that indicates (a) a video attribute (compression method, aspect ratio, NTSC/PAL, line 21 information, etc.) of picture data contained in each Still_VOB and (b) an audio attribute (compression method, the number of channels, frequency, etc.) of audio data contained in each Still_VOB.

The S_AVFI, as indicated by the dotted arrow h52, includes: S_VOGI_SRP (Search Pointer) #1 . . . #n that are search pointers pointing to S_VOGIs on a one-to-one basis; and S_VOGI #1 . . . #n.

The S_VOGI, as indicated by the dotted arrow h53, includes: S_VOG_GI being playback control information on Still_VOG; and S_VOB_ENT #1 . . . #m that are entry information on each of the Still_VOBs contained in the Still_VOG.

The S_VOB_ENT is entry information that indicates a type of each Still_VOB in the Still_VOG, and more specifically, indicates whether the Still_VOB is a still picture without audio, with audio, or with dubbing audio.

The S_VOG_GI, as indicated by the dotted arrow h54, includes: S_VOB_Ns indicating the number of Still_VOBs contained in the Still_VOG; S_VOB_STIN (Stream Information Number) indicating an S_VOB_STI referred to by the present S_VOGI among the plurality of S_VOB_STINs; FIRST_VOB_REC_TM indicating the date/time when the first Still_VOB in the Still_VOG was recorded; LAST_VOB_REC_TM indicating the date/time when the last Still_VOB in the Still_VOG was recorded; S_VOG_SA (Start Address) being the starting address of the Still_VOG in the RTR_STO.VRO file; LOCAL_TM_ZONE specifying, as a local zone, a time zone in which the Still_VOG was recorded.

The reason why the LOCAL_TM_ZONE is provided in the Still_VOG is as follows. The FIRST_VOB_REC_TM and the LAST_VOB_REC_TM are date/time information on Still_VOBs contained in the Still_VOG, and are based on a time zone specified by TZ_OFFSET in TM_ZONE. However, a Still_VOG captured in a different time zone from that specified by TZ_OFFSET may be recorded on the DVD. To deal with this, LOCAL_TM_ZONE is set in S_VOG_GI for each Still_VOG.

The ORG_PGCI table in Embodiment 7 differs from that in Embodiment 1 in that it contains CELL information on the still picture cells.

Figure 41:
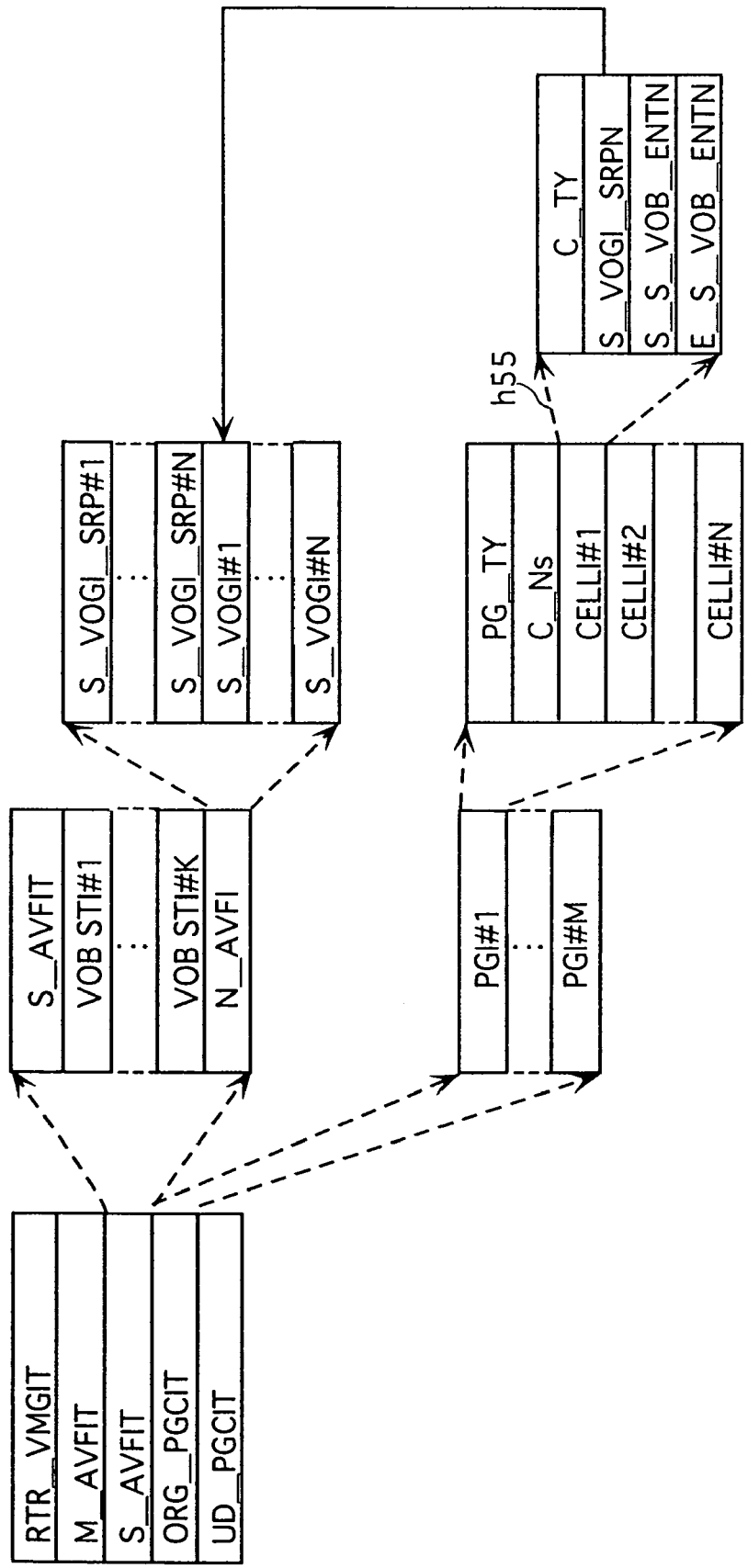
FIG. 41 shows the internal structure of S_AVFIT.

The still picture cell, as indicated by the dotted arrow h55 in FIG. 41, includes: C_TY indicating that the present cell is a still picture cell; S_VOGI_SRPN specifying, among a plurality of pieces of video object information, one piece that corresponds to the present still picture cell; S_S_VOB_ENTN; and E_S_VOB_ENTN. The S_S_VOB_ENTN and E_S_VOB_ENTN respectively indicate the start and end of a sequence of Still_VOBs in the Still_VOG corresponding to the S_VOGI, thereby indicating the Still_VOBs contained in the still picture cell.

The S_VOGI_SRPN specifies an S_VOGI, thereby specifying Still_VOG corresponding to the cell.

Figure 42:
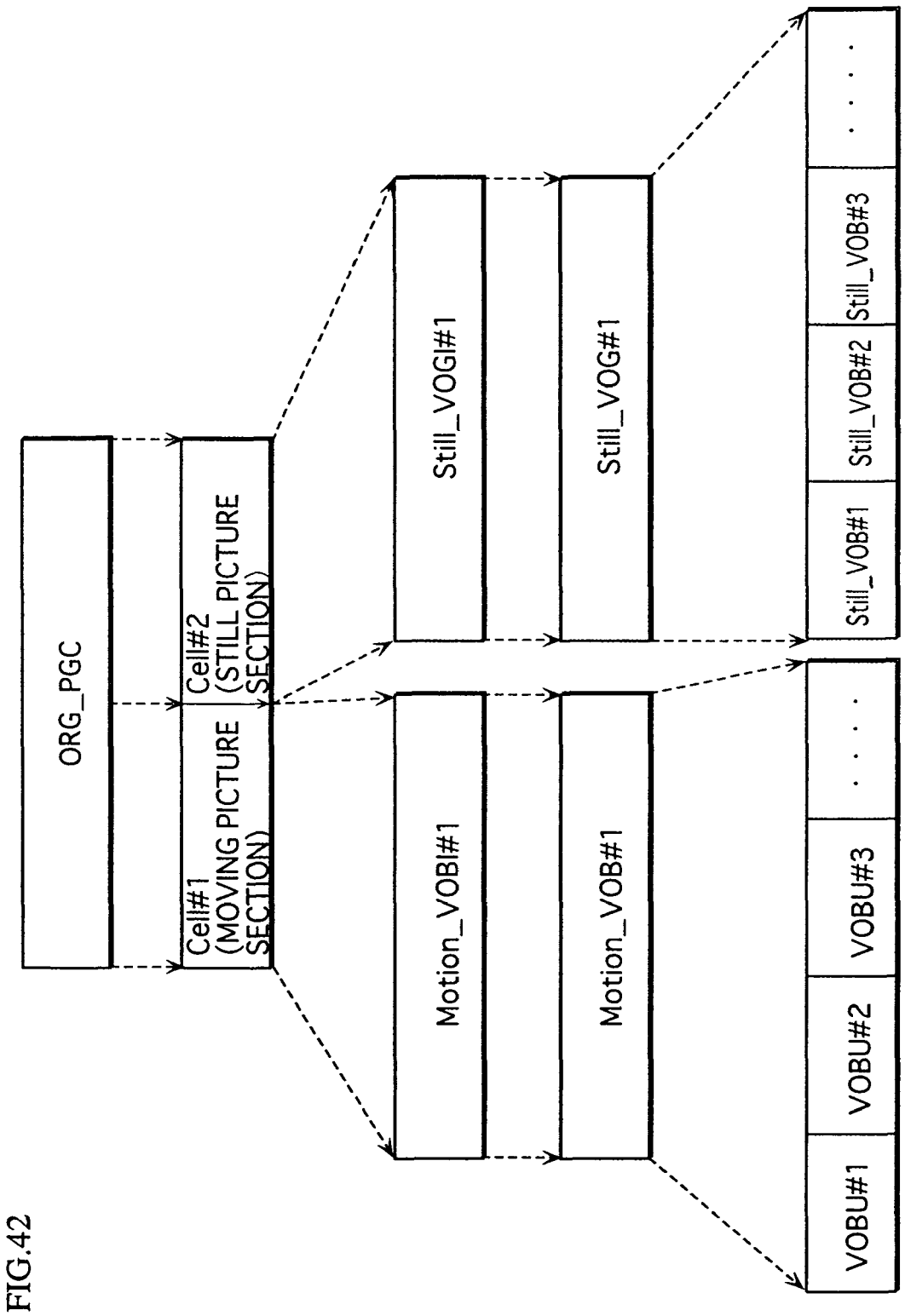
FIG. 42 shows an ORG_PGCI that contains information on a moving-picture section (CELL #1) and a still picture section (CELL #2).

As described above, the present embodiment uses ORG_PGCI to manage still picture cells that constitute still picture sections. As described in Embodiment 1, the ORG_PGCI manages moving-picture cells. Accordingly, it is possible for Embodiment 7 to manage both moving-picture cells and still picture cells. FIG. 42 shows an ORG_PGCI that contains information on a moving-picture section (CELL #1) and a still picture section (CELL #2).

When moving-picture cells and still picture cells are arranged in series, VOBs and Still_VOGs are arranged in chronological order that is determined based on a comparison of FIRST_VOB_REC_TM and LAST_VOB_REC_TM of Still_VOGs and VOB_REC_TM of VOBs. The FIRST_VOB_REC_TM and LAST_VOB_REC_TM of Still_VOGs are based on a time zone specified by TM_ZONE as is the case with VOB_REC_Tm of VOBs. This eliminates the fear that VOBs and Still_VOGs are improperly arranged because of different time zones in which they are recorded. Also, when the data is played back or a list of the contents is displayed, a recording date/time based on a time zone in which the data was recorded may be displayed by using LOCAL_TZ_TY or LOCAL_TZ in LOCAL_TM_ZONE. This provides the same effects as Embodiment 1.

The above-described embodiments are thought to provide the best effects at this point of time. However, the present invention can be varied in many ways and retain the essence of the invention. The following are examples of such variations of the present invention.

(A) The recording apparatus and playback apparatus described in Embodiments 2 and 3 are characterized by the operation procedures of the date/time information setting unit 12 and the date/time display control unit 20. These characteristic procedures are achieved by the programs stored in the recording apparatus and playback apparatus (see the flowcharts shown in FIGS. 21 and 24). These programs therefore can be executed separately from the recording apparatus and playback apparatus. It is also possible to record these programs onto a computer-readable recording medium and transfer or loan the recording medium so that the programs can be executed separately. The programs can be distributed or transferred via a network and can be executed.

There are other characteristics that can be achieved by programs. These programs can also be executed separately from the recording apparatus and playback apparatus.

(B) In Embodiments 1-7, DVD and DVD-RW which conform to the DVD-VIDEO RECORDING and on which moving picture data or still picture data can be recorded are used as examples of recording mediums. However, the recording mediums may have any physical structure in so far as moving picture data or still picture data can be recorded thereon. For example, phase-change type optical discs such as DVD-RW, PD, DVD+RW, and CD-RW may be used. The following recording mediums can also be used: (i) the "write-once" type optical discs such as CD-R and DVD-R; (ii) the magneto-optical storage type optical discs such as MO (Magneto-Optical disc), MD-DAT (Mini Disc Data), and iD format; (iii) the removable hard disc drives such as ORB, Jaz, SparQ, SyJet, EZFley, micro drive; (iv) magnetic recording discs such as floppy disks, SuperDisk, Zip, and Click!; (v) the flash memory cards such as SD memory card, compact flash card, smart media, memory stick, multimedia card, PCM-CIA card; and (vi) HD (High Density)-DVD that is planned to be standardized.

(C) In the above embodiments, it is presumed that the recording apparatus 1 is a camcorder. However, the recording apparatus 1 may be a stay-at-home DVD recorder such as DMR-E20 made by Panasonic.

The recording apparatus 1 may be a personal computer on which a digital image editing program such as MotionDV STUDIO or DVD MovieAlbum is installed and which is connected to a drive apparatus via an interface conforming to SCSI, IDE, or IEEE1394.

(D) In the above embodiments, it is described that video streams and audio streams are multiplexed into VOBs. However, sub-picture streams or control information may be multiplexed into VOBs as well, where the sub-picture streams are obtained by performing the run-length compression on text data such as subtitles.

(E) In the above embodiments, picture data is played back in units of video frames. In such a case, the relationship between frames and pictures is represented as "1 frame=1 picture". However, the relationship may be, for example, "1.5 frame=1 picture" which results from compression of the images captured in film intended to be played back at a rate of 24 frames/second.

(F) In the above embodiments, moving picture data is recorded onto an optical disc in a format conforming to the DVD-VIDEO RECORDING standard. However, moving picture data may be recorded in other formats.

(G) In the above embodiments, moving picture VOBs and still picture VOBs are arranged in chronological order of the recording date/time. However, the VOBs may be arranged in reversed chronological order.

(H) In the above embodiments, VOBs on DVDs are arranged in the order of recording date/time. This is a rule unique to the present application document. In reality, VOBs can be arranged in another order. For example, an image editing software program can be used to place a VOB captured one month before at a position immediately before a VOB captured two days before. However, such a case is rather exceptional since this is achieved only when the user intentionally edits the VOB arrangement on DVDs. As a result, in the present application document, it is presumed that VOBs on DVDs are arranged in the order of recording date/time.

(I) In the above embodiments, a recording date/time is defined as a time when a capturing unit of the recording apparatus starts capturing an image. However, the recording date/time may be defined differently in so far as it can be accepted by the user. For example, the recording date/time may be a time when the recording apparatus starts receiving a broadcast program and recording it onto a DVD, or may be a time when the recording apparatus starts receiving images form an external apparatus.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A recording apparatus for writing a video object onto a recording medium on which basic time zone information specifying a basic time zone is written, the recording apparatus comprising:
   a timer operable to measure a time based on a predetermined time zone;
   a converting unit operable to, if the basic time zone does not match the predetermined time zone, convert the time measured by the timer into a time based on the basic time zone;
   a writing unit operable to, if the basic time zone does not match the predetermined time zone, write management information for the video object onto the recording medium, the management information containing a flag indicating that the basic time zone and the predetermined time zone do not match, recording time information showing the conversion-result time, and local time zone information specifying the predetermined time zone as a local time zone; and a control unit operable to divide, as editing, the video object written onto the recording medium into a former video object and a latter video object, wherein the writing unit is operable to write management information for the latter video object onto the recording medium, the management information for the latter video object includes a value of the flag and the local time zone information that are the same as values of the flag and the local time zone information in the management information for the video object before the division, and the management information for the latter video object includes a value of the recording time information obtained by modifying a value of the recording time information for the former video object, based on a playback time length of the former video object.

2. The recording apparatus of claim 1, wherein when the video object is divided into the former video object and the latter video object by deleting a middle portion of the video object, the value of the recording time information in the management information for the latter video object is obtained by modifying the value of the recording time information for the former video object, based on the playback time length of the former video object and a time length of the deleted middle portion.

3. A control apparatus for inclusion in a recording apparatus having a writing unit and a timer, wherein the writing unit writes a video object onto a recording medium on which basic time zone information has been recorded, and the time measures a time based on a predetermined time zone, the basic time zone information specifying a basic time zone, the control apparatus being operable to convert the time measured by the timer into a time based on the basic time zone if the basic time zone does not match the predetermined time zone, and control the writing unit to write management information in correspondence with the video object onto the recording medium, the management information containing: a flag indicating that the basic time zone and the predetermined time zone do not match; recording time information showing the conversion-result time; and local time zone information specifying the predetermined time zone as a local time zone.

* * * * *